(12) United States Patent
Huang

(10) Patent No.: US 12,306,465 B2
(45) Date of Patent: May 20, 2025

(54) OPTICAL LENS ASSEMBLY AND HEAD-MOUNTED DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 394 days.

(21) Appl. No.: 17/735,199

(22) Filed: May 3, 2022

(65) Prior Publication Data

US 2023/0080616 A1    Mar. 16, 2023

(30) Foreign Application Priority Data

Aug. 25, 2021    (TW) ................... 110131549

(51) Int. Cl.
| | |
|---|---|
| G02B 9/60 | (2006.01) |
| G02B 1/00 | (2006.01) |
| G02B 3/04 | (2006.01) |
| G02B 27/01 | (2006.01) |

(52) U.S. Cl.
CPC ............. G02B 9/60 (2013.01); G02B 1/002 (2013.01); G02B 3/04 (2013.01); G02B 27/0172 (2013.01)

(58) Field of Classification Search
CPC .............. G02B 9/64; G02B 9/62; G02B 9/60
See application file for complete search history.

(56) References Cited

U.S. PATENT DOCUMENTS

| | | |
|---|---|---|
| 8,422,145 B2 | 4/2013 | Ise et al. |
| 8,953,257 B1 | 2/2015 | Chen |
| 9,057,868 B1 | 6/2015 | Chung et al. |
| 9,201,218 B2 | 12/2015 | Noda et al. |
| 9,223,117 B2 | 12/2015 | Chen et al. |
| 10,488,633 B2 | 11/2019 | Matsumoto |
| 10,802,251 B2 | 10/2020 | Lin et al. |
| 2011/0149415 A1 | 6/2011 | Jeong |
| 2013/0229718 A1 | 9/2013 | Tsai et al. |
| 2014/0098430 A1 | 4/2014 | Chou |
| 2014/0177076 A1 | 6/2014 | Hsu et al. |
| 2014/0218584 A1 | 8/2014 | Liou et al. |
| 2014/0218809 A1 | 8/2014 | Tsai et al. |
| 2014/0285710 A1 | 9/2014 | Chen et al. |
| 2015/0286035 A1 | 10/2015 | Lin et al. |
| 2016/0062084 A1 | 3/2016 | Chen et al. |

(Continued)

FOREIGN PATENT DOCUMENTS

| | | |
|---|---|---|
| CN | 201508432 U | 6/2010 |
| CN | 104914558 A | 9/2015 |

(Continued)

*Primary Examiner* — Christopher Stanford
*Assistant Examiner* — Journey F Sumlar
(74) *Attorney, Agent, or Firm* — McClure, Qualey & Rodack, LLP

(57) ABSTRACT

An optical lens assembly includes five lens elements, the five lens elements are, in order from a magnification side to a reduction side: a first lens element, a second lens element, a third lens element, a fourth lens element and a fifth lens element. Each of the five lens elements has an m-side surface facing towards the magnification side and an r-side surface facing towards the reduction side. The m-side surface of the second lens element is concave in a paraxial region thereof. At least one surface of at least one of the five lens elements includes at least one inflection point.

27 Claims, 24 Drawing Sheets

(56) References Cited

U.S. PATENT DOCUMENTS

| | | |
|---|---|---|
| 2016/0062105 A1 | 3/2016 | Kawamura et al. |
| 2016/0223792 A1 | 8/2016 | Tang et al. |
| 2016/0223793 A1 | 8/2016 | Tang et al. |
| 2016/0259148 A1 | 9/2016 | Tang et al. |
| 2016/0259149 A1 | 9/2016 | Tang et al. |
| 2017/0329110 A1 | 11/2017 | Shih |
| 2020/0166734 A1 | 5/2020 | Chung |
| 2020/0371323 A1 | 11/2020 | Chern et al. |
| 2020/0409037 A1 | 12/2020 | Kuo et al. |
| 2022/0003969 A1 | 1/2022 | Zhang et al. |

FOREIGN PATENT DOCUMENTS

| | | |
|---|---|---|
| CN | 106680974 A | 5/2017 |
| CN | 106707497 A | 5/2017 |
| CN | 107024766 A | 8/2017 |
| CN | 210720853 U | 6/2020 |
| CN | 111624740 A | 9/2020 |
| CN | 211826694 U | 10/2020 |
| CN | 112859288 A | 5/2021 |
| CN | 112965204 A | 6/2021 |
| JP | 07104180 A | 4/1995 |
| JP | 2014182380 A | 9/2014 |
| TW | 201348736 A | 12/2013 |
| TW | 201741711 A | 12/2017 |
| TW | 201819975 A | 6/2018 |
| TW | I710816 B | 11/2020 |
| WO | 2010113717 A1 | 10/2010 |
| WO | 2013175783 A1 | 11/2013 |
| WO | 2016110883 A1 | 7/2016 |
| WO | 2021102749 A1 | 6/2021 |
| WO | 2022044675 A1 | 3/2022 |
| WO | 2022228189 A1 | 11/2022 |

OPTICAL LENS ASSEMBLY AND HEAD-MOUNTED DEVICE

RELATED APPLICATIONS

This application claims priority to Taiwan Application Serial Number 110131549, filed Aug. 25, 2021, which is herein incorporated by reference.

BACKGROUND

Technical Field

The present disclosure relates to an optical lens assembly. More particularly, the present disclosure relates to a compact optical lens assembly applicable to head-mounted devices.

Description of Related Art

With rapid developments of technology, applications of electronic devices equipped with optical lens assemblies increase, and new specifications for optical lens assemblies have diversified. However, in a conventional optical lens assembly, it is hard to balance among image quality, sensitivity, aperture size, volume or field of view. Thus, there is a demand for an optical lens assembly that meets the aforementioned needs.

SUMMARY

According to one aspect of the present disclosure, an optical lens assembly includes five lens elements, the five lens elements being, in order from a magnification side to a reduction side, a first lens element, a second lens element, a third lens element, a fourth lens element and a fifth lens element. Each of the five lens elements has an m-side surface facing towards the magnification side and an r-side surface facing towards the reduction side. The m-side surface of the second lens element is concave in a paraxial region thereof. At least one surface of at least one of the five lens elements includes at least one inflection point. The optical lens assembly further includes an aperture stop. When an axial distance between the aperture stop and an r-side conjugate surface is SL, a curvature radius of the m-side surface of the second lens element is R3, a curvature radius of the r-side surface of the second lens element is R4, an axial distance between the m-side surface of the first lens element and the r-side conjugate surface is TL, a central thickness of the second lens element is CT2, a central thickness of the third lens element is CT3, a central thickness of the fourth lens element is CT4, a minimum central thickness of the five lens elements of the optical lens assembly is CTmin, an axial distance between the r-side surface of the fifth lens element and the r-side conjugate surface is BL, an effective diameter of the aperture stop of the optical lens assembly is Ds, a maximum image height of the optical lens assembly is ImgH, an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following conditions are satisfied: $(R3+R4)/(R3-R4)<0.50$; $0.98<SL/TL<2.50$; $0.65<CT2/CT4<4.50$; $1.60<CT3/CTmin<10.0$; $0.55<CT3/BL$; $0.70<Ds/ImgH<3.0$; and $0.25<T12/(T23+T34+T45)<9.0$.

According to one aspect of the present disclosure, an optical lens assembly includes five lens elements, the five lens elements being, in order from a magnification side to a reduction side, a first lens element, a second lens element, a third lens element, a fourth lens element and a fifth lens element. Each of the five lens elements has an m-side surface facing towards the magnification side and an r-side surface facing towards the reduction side. The m-side surface of the second lens element is concave in a paraxial region thereof. The m-side surface of the third lens element is convex in a paraxial region thereof. At least one of the m-side surface and the r-side surface of at least one lens element of the optical lens assembly includes at least one inflection point. The optical lens assembly further includes an aperture stop. When an axial distance between the aperture stop and an r-side conjugate surface is SL, a curvature radius of the m-side surface of the second lens element is R3, a curvature radius of the r-side surface of the second lens element is R4, an axial distance between the m-side surface of the first lens element and the r-side conjugate surface is TL, a central thickness of the first lens element is CT1, a central thickness of the second lens element is CT2, a central thickness of the third lens element is CT3, a central thickness of the fourth lens element is CT4, a central thickness of the fifth lens element is CT5, an axial distance between the first lens element and the second lens element is T12, a maximum among each axial distance between adjacent lens elements of the optical lens assembly is ATmax, a maximum distance between an optically effective area of the m-side surface of the first lens element and an optical axis is Y11, and a maximum distance between an optically effective area of the r-side surface of the fifth lens element and the optical axis is Y52, the following conditions are satisfied: $(R3+R4)/(R3-R4)<0.25$; $0.98<SL/TL<2.50$; $0.40<CT2/CT4<9.0$; $0<CT1/CT3<1.50$; $1.20<CT3/CT5<9.0$; $0.90<CT2/T12<5.0$; $0.45<T12/ATmax\le1.0$; and $0.45<Y11/Y52<2.0$.

According to one aspect of the present disclosure, a head-mounted device includes a display system, the display system includes two sides, and each of the two sides includes a projecting module and an image transmitting module. Each of the projecting modules includes at least one projection lens assembly. The projection lens assembly includes the optical lens assembly of the aforementioned aspect and an image source.

According to one aspect of the present disclosure, a head-mounted device includes a light field display system. The light field display system includes two sides. Each of the two sides includes a projecting module and an image transmitting module. Each of the projecting modules includes at least three projection lens assemblies. Each of the projection lens assemblies includes an optical lens assembly and an image source. The optical lens assembly includes at least three lens elements, the three lens elements including, in order from a magnification side to a reduction side, a first lens element and a last lens element. Each of the lens elements has an m-side surface facing towards the magnification side and an r-side surface facing towards the reduction side. At least one of the lens elements of each of the optical lens assemblies is made of plastic material and has a surface being aspheric. Each of the optical lens assemblies further includes an aperture stop. When an axial distance between the aperture stop and the r-side conjugate surface is SL, an axial distance between the m-side surface of the first lens element and the r-side surface of the last lens element is TD, an f-number of the optical lens assembly is Fno, and an axial distance between the m-side surface of the first lens element and the r-side conjugate surface is TL, the following conditions are satisfied: 0.50 mm<TD<50.0 mm; 0.80<Fno<2.50; and 0.95<SL/TL<4.0.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
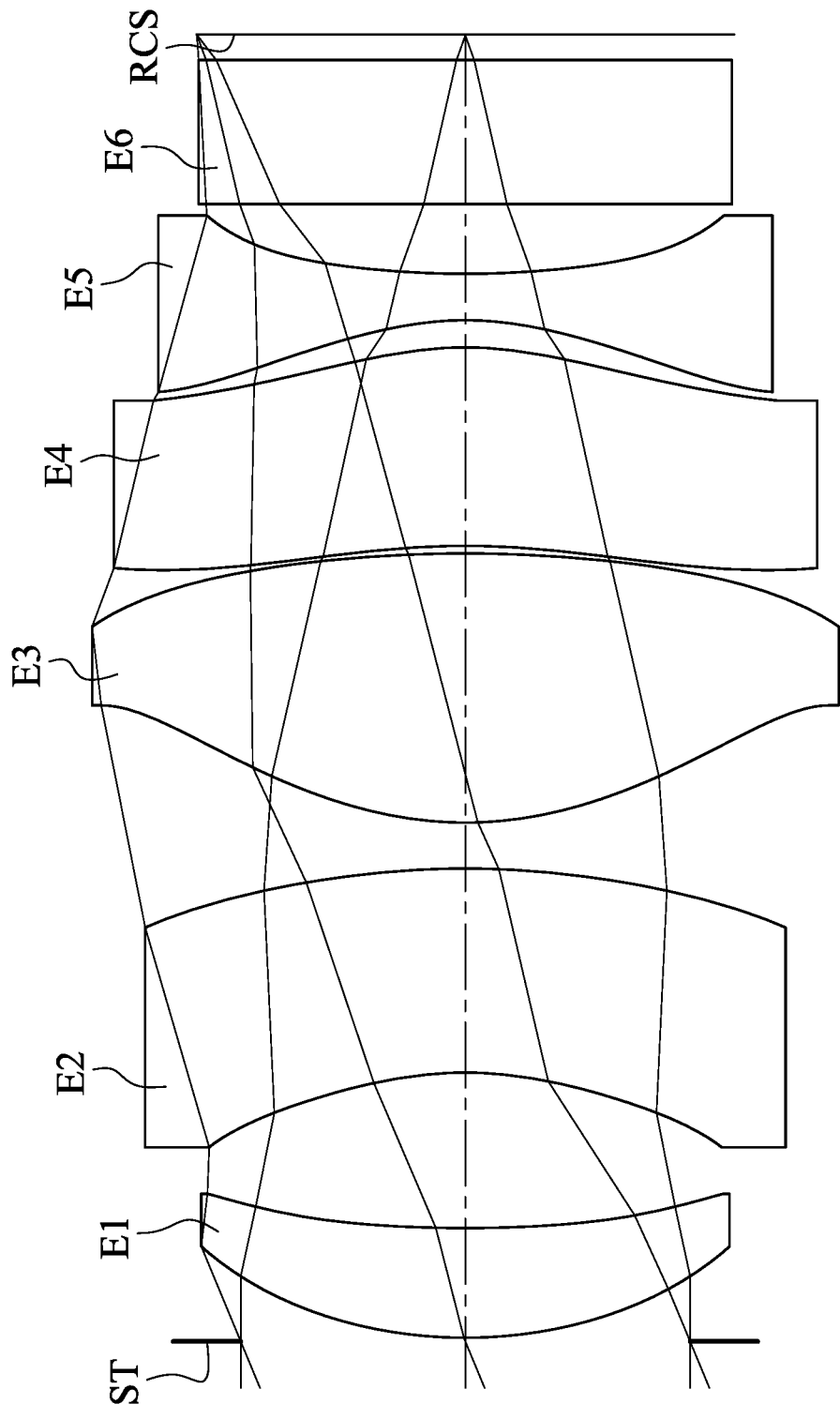
FIG. 1 is a schematic view of an optical lens assembly according to the 1st embodiment of the present disclosure.

With rapid developments of stereoscopic display technology, and overcome the discomfort as the display device is unable to simulate the muscular contraction and the eye movement in stereopsis with conventional stereoscopic displays, the industry adopts light fields to improve the visual experience of the observer. However, in order to limit the device size of the existing light field technology, an optical lens assembly with a smaller size and larger aperture is designed to achieve a better stereoscopic display in a limited space.

The present disclosure provides an optical lens assembly which includes five lens elements, the five lens elements are, in order from a magnification side to a reduction side, a first lens element, a second lens element, a third lens element, a fourth lens element and a fifth lens element. Each of the five lens elements has an m-side surface facing towards the magnification side and an r-side surface facing towards the reduction side. The fifth lens element can be a last lens element of the optical lens assembly, but the present disclosure is not limited thereto.

The first lens element can have positive refractive power, so that it is favorable for moving the aperture stop towards the magnification side so as to receive more light for enhancing image illuminance. The m-side surface of the first lens element can be convex in a paraxial region thereof and the r-side surface of the first lens element can be convex in a paraxial region thereof. Therefore, it is favorable for preventing excessive curvature of a single surface by balancing refractive power on the surfaces of the lens element.

The second lens element can have negative refractive power, so that it is favorable for receiving light from a large field of view and also optimizing the light of different wavelengths. The m-side surface of the second lens element can be concave in a paraxial region thereof, so that it is favorable for enlarging the field of view. The r-side surface of the second lens element can be convex in a paraxial region thereof, so that it is favorable for preventing total reflection by restricting the incident angle of light.

The third lens element can have positive refractive power, so that it is favorable for providing significant converging power in the optical lens assembly so as to prevent excessive total track length. The m-side surface of the third lens element can be convex in a paraxial region thereof, which is favorable for controlling the light path of the optical lens assembly so as to reduce the angle between the chief ray and the r-side conjugate surface. The r-side surface of the third lens element can be convex in a paraxial region thereof, which is favorable for enhancing the image quality by increasing the symmetry of the optical lens assembly.

The fourth lens element can have negative refractive power, so that it is favorable for enhancing the image quality by balancing aberrations generated from the third lens element. The m-side surface of the fourth lens element can be concave in a paraxial region thereof, which is favorable for providing enhancements with the third lens element. The r-side surface of the fourth lens element can be convex in a paraxial region thereof, which is favorable for balancing aberrations of the optical lens assembly.

The fifth lens element can have negative refractive power, so that it is favorable for balancing the field of view of the optical lens assembly to meet the practical specifications of the device. The r-side surface of the fifth lens element can be concave in a paraxial region thereof. Therefore, it is favorable for adjusting the back focal length of the optical lens assembly so as to avoid the overly large volume of the optical lens assembly.

At least one of the m-side surface or the r-side surface of the at least one lens element of the optical lens assembly includes at least one inflection point. Therefore, it is favorable for adjusting off-axis aberrations and also avoiding the reduction of off-axis image illumination. In detail, at least one surface of the third lens element can include at least one inflection point, which is favorable for reducing the stray light by controlling the refractive angle. At least one surface of the fourth lens element can include at least one inflection point, which is favorable for correcting coma aberrations and astigmatism. At least one surface of the fifth lens element can include at least one inflection point, which is favorable for correcting distortion.

The optical lens assembly can further include an aperture stop. When an axial distance between the aperture stop and the r-side conjugate surface is SL, and an axial distance between the m-side surface of the first lens element and the r-side conjugate surface is TL, the following condition is satisfied: 0.95<SL/TL<4.0. Therefore, it is favorable for fully utilizing light so as to increase image illumination. Further, the following condition can be satisfied: 0.98<SL/TL<2.50. Moreover, the following condition can be satisfied: 1.0 SL/TL<1.80.

When a curvature radius of the m-side surface of the second lens element is R3, and a curvature radius of the r-side surface of the second lens element is R4, the following condition is satisfied: (R3+R4)/(R3−R4)<0.50. Therefore, it is favorable for moving the aperture towards the magnification side so as to meet the mechanical design of the electronic device. Further, the following condition can be satisfied: (R3+R4)/(R3−R4)<0.25. Furthermore, the following condition can be satisfied: −10.0<(R3+R4)/(R3−R4)<0.25. Moreover, the following condition can be satisfied: −10.0<(R3+R4)/(R3−R4)<0. Moreover, the following condition can be satisfied: −10.0<(R3+R4)/(R3−R4)<−1.0.

When a central thickness of the second lens element is CT2, and a central thickness of the fourth lens element is CT4, the following condition is satisfied: 0.40<CT2/CT4<9.0. Therefore, it is favorable for balancing the central thicknesses of the second lens element and the fourth lens element so as to increase the yield rate. Further, the following condition can be satisfied: 0.65<CT2/CT4<4.50. Moreover, the following condition can be satisfied: 0.85<CT2/CT4<2.50.

When a central thickness of the third lens element is CT3, and a minimum central thickness of the five lens elements of the optical lens assembly is CTmin, the following condition is satisfied: 1.60<CT3/CTmin<10.0. Therefore, it is favorable for providing the main refractive power of the optical lens assembly by arranging the third lens element with sufficient thickness. Further, the following condition can be satisfied: 2.20<CT3/CTmin<7.0. Moreover, the following condition can be satisfied: 3.80<CT3/CTmin<7.0.

When the central thickness of the third lens element is CT3, and an axial distance between the r-side surface of the fifth lens element and the r-side conjugate surface is BL, the following condition is satisfied: 0.55<CT3/BL. Therefore, it is favorable for avoiding the overly large volume of the device by controlling the back focal length of the optical lens assembly effectively.

When an effective diameter of the aperture stop of the optical lens assembly is Ds, and a maximum image height of the optical lens assembly is ImgH, the following condition is satisfied: 0.70<Ds/ImgH<3.0. Therefore, it is favorable for enhancing the image illumination by effectively enlarging the passing range of the light of the optical lens assembly. Further, the following condition can be satisfied: 1.0<Ds/ImgH<2.0.

When an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following condition is satisfied: 0.25<T12/(T23+T34+T45)<9.0. Therefore, it is favorable for reducing the angle between the chief ray and the r-side conjugate surface by providing sufficient adjusting space for the light path between the first lens element and the second lens element. Further, the following condition can be satisfied: 0.45<T12/(T23+T34+T45)<4.0.

When a central thickness of the first lens element is CT1, and the central thickness of the third lens element is CT3, the following condition is satisfied: 0<CT1/CT3<1.50. Therefore, it is favorable for preventing excessive central thickness of the first lens element which would limit the field of view. Further, the following condition can be satisfied: 0.25<CT1/CT3<0.90.

When the central thickness of the third lens element is CT3, and a central thickness of the fifth lens element is CT5, the following condition is satisfied: 1.20<CT3/CT5<9.0. Therefore, it is favorable for enhancing the controlling ability of the third lens element in the optical lens assembly and performing the fifth lens element as a lens element for correction so as to correct off-axis aberrations. Further, the following condition can be satisfied: 3.0<CT3/CT5<7.0.

When the central thickness of the second lens element is CT2, and the axial distance between the first lens element and the second lens element is T12, the following condition is satisfied: 0.90<CT2/T12<5.0. Therefore, it is favorable for balancing the ratio between the second lens element and the occupied space of the second lens element, and also favorable for satisfying the manufacturability and the yield rate. Further, the following condition can be satisfied: 1.0<CT2/T12<3.0.

When the axial distance between the first lens element and the second lens element is T12, and a maximum among each axial distance between adjacent lens elements of the optical lens assembly is ATmax, the following condition is satisfied: 0.45<T12/ATmax≤1.0. Therefore, it is favorable for adjusting the light path by providing sufficient space between the first lens element and the second lens element. Further, the following condition can be satisfied: 0.60<T12/ATmax≤1.0. Moreover, the following condition can be satisfied: 0.80<T12/ATmax≤1.0.

When a maximum distance between an optical effective region of the m-side surface of the first lens element and an optical axis is Y11, and a maximum distance between an optical effective region of the r-side surface of the fifth lens element and the optical axis is Y52, the following condition is satisfied: 0.45<Y11/Y52<2.0. Therefore, it is favorable for folding the light path of the optical lens assembly so as to reduce the angle between the chief ray and the r-side conjugate surface. Further, the following condition can be satisfied: 0.65<Y11/Y52<1.50.

When a vertical distance between an inflection point closest to the optical axis on one of the m-side or r-side surfaces of the third lens element and the optical axis is Yc3, and a focal length of the optical lens assembly is f, the following condition is satisfied: 0.05<Yc3/f<5.0. Therefore, it is favorable for correcting the field curvature so as to provide compactness and a flatter Petzval Surface of the optical lens assembly. Further, when a vertical distance between an inflection point closest to the optical axis on one of the m-side or r-side surfaces of the fourth lens element and the optical axis is Yc4, and the focal length of the optical lens assembly is f, the following condition can be satisfied: 0.05<Yc4/f<5.0. Moreover, when a vertical distance between an inflection point closest to the optical axis on one of the m-side or r-side surfaces of the last lens element and the optical axis is Yc5, and the focal length of the optical lens assembly is f, the following condition can be satisfied: 0.05<Yc5/f<5.0. Therefore, it is favorable for further correcting field curvature so as to meet the compactness.

When a minimum Abbe number of the lens elements of the optical lens assembly is Vdmin, the following condition is satisfied: 5.0<Vdmin<21.0. Therefore, it is favorable for correcting chromatic aberrations of the optical lens assembly. Further, the following condition can be satisfied: 5.0<Vdmin<20.0.

When a maximum refractive index of the lens elements of the optical lens assembly is Nmax, the following condition is satisfied: 1.70<Nmax<1.80. Therefore, it is favorable for enhancing the controlling ability of the aforementioned lens elements of the optical lens assembly so as to achieve good image quality in the limited space.

When an f-number of the optical lens assembly is Fno, the following condition is satisfied: 0.80<Fno<2.0. Therefore, it is favorable for controlling the amount of the light passing through of the optical lens assembly so as to enhance the image illumination. Further, the following condition can be satisfied: 0.80<Fno<2.50. Moreover, the following condition can be satisfied: 0.80<Fno<1.85.

One surface of the third lens element can include a maximum effective diameter among the m-side surfaces and the r-side surfaces of all the lens elements of the optical lens assembly. Therefore, the symmetry of the optical lens assembly can be enhanced by balancing the size of the lens elements on the magnification side and the reduction side thereof.

When an Abbe number of the fifth lens element is V5, the following condition is satisfied: 10.0<V5<50.0. Therefore, it is favorable for enhancing the controlling ability for the light path of the fifth lens element so as to balance aberrations of the optical lens assembly. Further, the following condition can be satisfied: 10.0<V5<25.0. Moreover, the following condition can be satisfied: 10.0<V5<20.0.

When the focal length of the optical lens assembly is f, a focal length of the first lens element is f1, a focal length of the second lens element is f2, and a focal length of the third lens element is f3, the following condition is satisfied: 0.10<(|f/f1|+|f/f2|)/|f/f3|<1.70. Therefore, it is favorable for controlling the refractive power arrangement of the magnification side of the optical lens assembly so as to enhance the functionality of the third lens element.

When a maximum of chief ray angles of the optical lens assembly is CRAmax, the following condition is satisfied: 0 degree≤CRAmax<22.0 degrees. Therefore, it is favorable for reducing the angle between the chief ray and the r-side conjugate surface so as to ensure the off-axis image illumination.

At least one lens element of the optical lens assembly can be made of plastic material and has a surface being aspheric. Therefore, the manufacturing cost can be reduced effectively and the optical lens assembly can be more flexible to design so as to optimize off-axis aberrations and enhance the productivity. Further, at least three lens elements of the optical lens assembly can be made of plastic material.

At least one lens element of the optical lens assembly can be made of glass material. Therefore, it is favorable for enhancing the thermal tolerance of the optical lens assembly so as to adapt to different environmental conditions.

An absolute value of the focal length of the third lens element is a minimum among absolute values of focal lengths of the lens elements of the optical lens assembly. Therefore, it is favorable for correcting aberrations by enhancing the symmetry of the refractive power of the optical lens assembly.

The axial distance between the first lens element and the second lens element is the maximum among each axial distance of adjacent lens elements of the optical lens assembly. Therefore, it is favorable for controlling the light from a large field of view light so as to enlarge the passing range of the light.

When an axial distance between the m-side surface of the first lens element and the r-side surface of the last lens element is TD, the following condition is satisfied: 0.50 mm<TD<50.0 mm. Therefore, it is favorable for ensuring the compactness of the optical lens assembly so as to be applied to various electronic devices. Further, the following condition can be satisfied: 1.0 mm<TD<30.0 mm. Furthermore, the following condition can be satisfied: 2.0 mm<TD<15.0 mm. Moreover, the following condition can be satisfied: 3.0 mm<TD<9.0 mm.

When the axial distance between the m-side surface of the first lens element and the r-side surface of the last lens element is TD, and a sum of central thicknesses of the lens elements of the optical lens assembly is ΣCT, the following condition is satisfied: 1.0<TD/ΣCT<1.40. Therefore, it is favorable for enhancing the space utilization and the compactness of the optical lens assembly.

When the effective diameter of the aperture stop of the optical lens assembly is Ds, and the axial distance between the m-side surface of the first lens element and the r-side surface of the last lens element is TD, the following condition is satisfied: 0.45<Ds/TD<1.0. Therefore, the amount of the light passing through of the optical lens assembly can be increased, and the size of the entire optical lens assembly can be controlled at the same time.

At least three lens elements of each of the optical lens assemblies can have an Abbe number greater than 10.0 and less than 50.0. Therefore, it is favorable for ensuring the material of the lens elements in the optical lens assembly with sufficient controlling ability of the light path so as to balance the focusing positions of the light with different wavelengths and avoid the overlapping image. Further, at least four lens elements of the optical lens assemblies can have an Abbe number greater than 10.0 and less than 50.0.

Each of the aforementioned features of the optical lens assembly can be utilized in various combinations for achieving the corresponding effects.

It should be noted that, when the optical lens assembly is a projection lens assembly, the r-side conjugate surface is an image source; when the optical lens assembly is an imaging lens assembly, the r-side conjugate surface is an image surface.

According to the optical lens assembly of the present disclosure, the lens elements thereof can be made of glass or plastic materials. When the lens elements are made of glass materials, the distribution of the refractive power of the optical lens assembly may be more flexible to design. The glass lens element can either be made by grinding or molding. When the lens elements are made of plastic materials, manufacturing costs can be effectively reduced. Furthermore, surfaces of each lens element can be arranged to be spherical or aspheric (ASP), since the aspheric surface of the lens element is easy to form a shape other than a spherical surface so as to have more controllable variables for eliminating aberrations thereof, and to further decrease the required amount of lens elements in the optical lens assembly. Therefore, the total track length of the optical lens assembly can also be reduced. The aspheric surfaces may be formed by a plastic injection molding method, a glass molding method or other manufacturing methods.

According to the optical lens assembly of the present disclosure, additives can be selectively added into any one (or more) material of the lens elements so as to change the transmittance of the lens element in a particular wavelength range. Therefore, the stray light and chromatic aberration can be reduced. For example, the additives can have the absorption ability for the light in a wavelength range of 600 nm-800 nm in the optical lens assembly so as to reduce extra red light or infrared light, or the additives can have the absorption ability for the light in a wavelength range of 350 nm-450 nm in the optical lens assembly so as to reduce blue light or ultraviolet light. Therefore, additives can prevent the image from interfering by the light in a particular wavelength range. Furthermore, the additives can be homogeneously mixed with the plastic material, and the lens elements can be made by the injection molding method. Moreover, the additives can also be the coating film disposed on the surface of the lens element.

According to the optical lens assembly of the present disclosure, when a surface of a lens element is aspheric, it indicates that entire optical effective region of the surface of the lens element or a part thereof is aspheric.

According to the optical lens assembly of the present disclosure, when the lens elements have surfaces being convex and the convex surface position is not defined, it indicates that the aforementioned surfaces of the lens elements can be convex in the paraxial region thereof. When the lens elements have surfaces being concave and the concave surface position is not defined, it indicates that the aforementioned surfaces of the lens elements can be concave in the paraxial region thereof. In the optical lens assembly of the present disclosure, if the lens element has positive refractive power or negative refractive power, or the focal length of the lens element, all can be referred to the refractive power, or the focal length, in the paraxial region of the lens element.

According to the optical lens assembly of the present disclosure, an inflection point is a point on a lens surface with a curvature changing from positive to negative or from negative to positive.

According to the optical lens assembly of the present disclosure, the r-side conjugate surface thereof, based on the corresponding image sensor, can be flat or curved. In particular, the r-side conjugate surface can be a concave curved surface facing towards the object side. Furthermore, when the optical lens assembly of the present disclosure is an imaging optical system, the optical lens assembly can selectively include at least one image correcting element (such as a field flattener) inserted between the lens element closest to the r-side conjugate surface and the r-side conjugate surface, thus the effect of correcting image aberrations (such as field curvature) can be achieved. The optical properties of the aforementioned image correcting element, such as curvature, thickness, refractive index, position, surface shape (convex or concave, spherical or aspheric, diffraction surface and Fresnel surface, etc.) can be adjusted corresponding to the demands of the imaging apparatus. Generally, a preferred configuration of the image correcting element is to dispose a thin plano-concave element having a concave surface toward the object side on the position closed to the r-side conjugate surface.

According to the optical lens assembly of the present disclosure, the optical lens assembly can include at least one stop, such as an aperture stop, a glare stop or a field stop, for eliminating the stray light and thereby improving the image resolution thereof.

According to the optical lens assembly of the present disclosure, the aperture stop can be configured as a front stop or a middle stop, wherein the front stop indicates that the aperture stop is disposed between a magnification side and the first lens element, and the middle stop indicates that the aperture stop is disposed between the first lens element and the r-side conjugate surface. When the aperture stop is a front stop, a longer distance between an exit pupil of the optical lens assembly and the r-side conjugate surface can be obtained, and thereby obtains a telecentric effect and improves the image-sensing efficiency of the image sensor, such as CCD or CMOS. The middle stop is favorable for enlarging the field of view of the optical lens assembly and thereby provides a wider field of view for the same.

According to the optical lens assembly of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incoming light or the exposure time of the image can be controlled by the aperture control unit to enhance the image moderation ability. In addition, the aperture control unit can be the aperture stop of the optical lens assembly according to the present disclosure, so as to moderate the image quality by changing f-number such as changing the depth of field or the exposure speed.

According to the optical lens assembly of the present disclosure, the optical lens assembly can be applied to 3D (three-dimensional) image capturing applications, in products such as digital cameras, mobile devices, digital tablets, smart TVs, surveillance systems, motion sensing input devices, driving recording systems, rearview camera systems, wearable devices, and unmanned aerial vehicles, and other electronic imaging products.

According to the present disclosure, a head-mounted device is provided and includes a display system. The display system can include two sides, each side of the display system includes a projecting module and an image transmission module. Each projecting module includes at least one projection lens assembly, and the projection lens assembly can include the aforementioned optical lens assembly and an image source.

According to the present disclosure, a head-mounted device is provided and includes a light field display system. The light field display system can include two sides, each side of the light field display system includes a projecting module and an image transmission module. Each projecting module includes at least three projection lens assemblies, and each projection lens assembly can include an optical lens assembly and an image source. The optical lens assembly includes at least three lens elements, in order from a magnification side to a reduction side, a first lens element and a last lens element. Each of the lens elements has an m-side surface facing towards the magnification side and an r-side surface facing towards the reduction side. At least one lens element of the optical lens assembly is made of plastic material and has a surface being aspheric. Each optical lens assembly of the head-mounted device can be the aforementioned optical lens assembly or the optical lens assembly which meets any aforementioned condition, but is not limited thereto.

Each projecting module can include at least three projecting modules, the projecting modules can provide information with different focusing positions, so that it is favorable for allowing user to adapt different distances of the image more naturally. Further, each projecting module can also include a single projection lens assembly, and the present disclosure is not limited thereto.

In the head-mounted device, the image transmission module can be a waveguide element, so that it is favorable for transmitting the image in a limited space so as to achieve a lightweight device. Further, the image transmission module can be a light path folding element, and the present disclosure is not limited thereto.

Each projection lens assembly can include an element with a meta surface. Therefore, it is favorable for controlling the light path in the excessive small space. In detail, the meta surface has an optical design structure which is able to control the light and electro-magnetic wave properties (such as phase, amplitude and polarization, etc.) in a secondary wavelength standard. The optical design structure can expand the modulation range of the refractive index effectively and has an ultra-thin volume at the same time, in detail, the meta surface can be on a meta lens element.

Further, a number of the projection lens assemblies of the projecting module of the light field display system is at least 5 and at most 15. Therefore, it is favorable for balancing the lightweight of the device and the image quality of the light field.

The aforementioned image source can be DLP or LCD, and the present disclosure is not limited thereto. Therefore, sufficient illumination and higher quality of projection images can be provided.

According to the above description of the present disclosure, the following specific embodiments are provided for further explanation.

1st Embodiment

Figure 2:
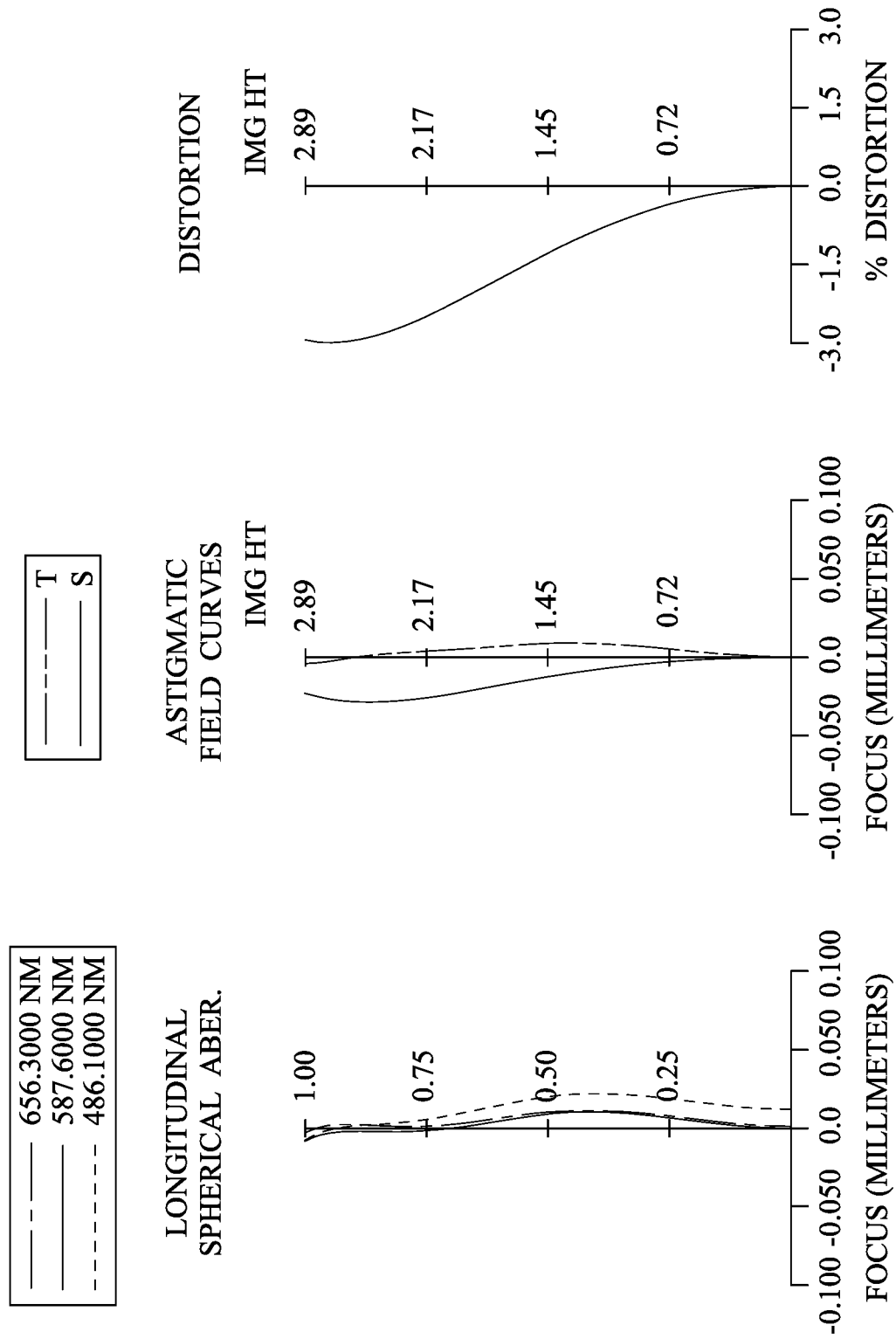
FIG. 2 shows spherical aberration curves, astigmatic field curves and a distortion curve of the optical lens assembly according to the 1st embodiment.

FIG. 1 is a schematic view of an optical lens assembly 1 according to the 1st embodiment of the present disclosure. FIG. 2 shows spherical aberration curves, astigmatic field curves and a distortion curve of the optical lens assembly 1 according to the 1st embodiment. In FIG. 1, the optical lens assembly 1 includes, in order from a magnification side to a reduction side, an aperture stop ST, a first lens element E1, a second lens element E2, a third lens element E3, a fourth lens element E4, a fifth lens element E5, a filter E6 and an r-side conjugate surface RCS. The optical lens assembly 1 includes five lens elements (E1, E2, E3, E4, E5) without additional one or more lens elements inserted between the first lens element E1 and the fifth lens element E5.

The first lens element E1 with positive refractive power has an m-side surface being convex in a paraxial region thereof and an r-side surface being concave in a paraxial region thereof. The first lens element E1 is made of plastic material, and has the m-side surface and the r-side surface being both aspheric. Further, the r-side surface of the first lens element E1 includes an inflection point.

The second lens element E2 with negative refractive power has an m-side surface being concave in a paraxial region thereof and an r-side surface being convex in a paraxial region thereof. The second lens element E2 is made of plastic material, and has the m-side surface and the r-side surface being both aspheric.

The third lens element E3 with positive refractive power has an m-side surface being convex in a paraxial region thereof and an r-side surface being convex in a paraxial region thereof. The third lens element E3 is made of glass material, and has the m-side surface and the r-side surface being both aspheric. Further, the m-side surface of the third lens element E3 includes an inflection point.

The fourth lens element E4 with positive refractive power has an m-side surface being concave in a paraxial region thereof and an r-side surface being convex in a paraxial region thereof. The fourth lens element E4 is made of glass material, and has the m-side surface and the r-side surface being both aspheric. Further, the m-side surface of the fourth lens element E4 includes an inflection point, and the r-side surface of the fourth lens element E4 includes an inflection point.

The fifth lens element E5 with negative refractive power has an m-side surface being concave in a paraxial region thereof and an r-side surface being concave in a paraxial region thereof. The fifth lens element E5 is made of plastic material, and has the m-side surface and the r-side surface being both aspheric. Further, the m-side surface of the fifth lens element E5 includes an inflection point.

The filter E6 is made of glass material, which is located between the fifth lens element E5 and the r-side conjugate surface RCS, and will not affect the focal length of the optical lens assembly 1.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i}(Ai) \times (Y^i),$$

where,
X is the displacement in parallel with an optical axis from the intersection point of the aspheric surface and the optical axis to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient.

In the optical lens assembly 1 according to the 1st embodiment, when a focal length of the optical lens assembly 1 is f, an f-number of the optical lens assembly 1 is Fno, and half of a maximal field of view of the optical lens assembly 1 is HFOV, these parameters have the following values: f=7.20 mm; Fno=1.49; and HFOV=22.5 degrees.

In the optical lens assembly 1 according to the 1st embodiment, when a refractive index of the first lens element E1 is N1, a refractive index of the second lens element E2 is N2, a refractive index of the third lens element E3 is N3, a refractive index of the fourth lens element E4 is N4, a refractive index of the fifth lens element E5 is N5, and a maximum refractive index of the lens elements of the optical lens assembly 1 is Nmax, the following condition is satisfied: Nmax=1.744; wherein, according to the 1st embodiment, N1=1.544, N2=1.686, N3=1.744, N4=1.744, N5=1.669, that is, the maximum refractive index of the lens elements of the optical lens assembly 1 Nmax can be N3, N4.

In the optical lens assembly 1 according to the 1st embodiment, when an Abbe number of the first lens element E1 is V1, an Abbe number of the second lens element E2 is V2, an Abbe number of the third lens element E3 is V3, an Abbe number of the fourth lens element E4 is V4, an Abbe number of the fifth lens element E5 is V5, and a minimum Abbe number of the lens elements of the optical lens assembly 1 is Vdmin, the following conditions are satisfied: V5=19.5; and Vdmin=18.4; wherein, according to the 1st embodiment, V1=56.0, V2=18.4, V3=44.8, V4=44.8, V5=19.5, that is, the minimum Abbe number of the lens elements of the optical lens assembly 1 Vdmin can be V2.

In the optical lens assembly 1 according to the 1st embodiment, when a central thickness of the first lens element E1 is CT1, a central thickness of the second lens element E2 is CT2, a central thickness of the third lens element E3 is CT3, a central thickness of the fourth lens element E4 is CT4, a central thickness of the fifth lens element E5 is CT5, a minimum central thickness of the five lens elements of the optical lens assembly 1 is CTmin, a sum of central thicknesses of the lens elements of the optical lens assembly 1 is ΣCT, an axial distance between the first lens element E1 and the second lens element E2 is T12, an axial distance between the second lens element E2 and the third lens element E3 is T23, an axial distance between the third lens element E3 and the fourth lens element E4 is T34, an axial distance between the fourth lens element E4 and the fifth lens element E5 is T45, a maximum among each axial distance between adjacent lens elements of the optical lens assembly 1 is ATmax, an axial distance between the r-side surface of the fifth lens element E5 and the r-side conjugate surface RCS is BL, and an axial distance between the m-side surface of the first lens element E1 and an r-side surface of the last lens element is TD (that is, the axial distance between the m-side surface of the first lens element E1 and the r-side surface of the fifth lens element E5 in the 1st embodiment), the following conditions are satisfied: CT1/CT3=0.41; CT2/T12=1.31; CT2/CT4=1.03; T12/ATmax=1.00; CT3/CT5=5.80; CT3/BL=1.12; CT3/CTmin=5.80; T12/(T23+T34+T45)=1.93; and TD/ΣCT=1.29; wherein the axial distance of the adjacent lens elements is the axial distance between two adjacent lens surface of two adjacent lens elements; ΣCT=CT1+CT2+CT3+CT4+CT5.

In the optical lens assembly 1 according to the 1st embodiment, when a curvature radius of the m-side surface of the second lens element E2 is R3, and a curvature radius of the r-side surface of the second lens element E2 is R4, the following condition is satisfied: (R3+R4)/(R3−R4)=−2.66.

In the optical lens assembly 1 according to the 1st embodiment, when the focal length of the optical lens assembly 1 is f, a focal length of the first lens element E1 is f1, a focal length of the second lens element E2 is f2, and a focal length of the third lens element E3 is f3, the following condition is satisfied: (|f/f1|+|f/f2|)/|f/f3|=0.69.

In the optical lens assembly 1 according to the 1st embodiment, when a maximum distance between an optical effective region of the m-side surface of the first lens element E1 and the optical axis is Y11, and a maximum distance between an optical effective region of the r-side surface of the fifth lens element E5 and the optical axis is Y52, the following condition is satisfied: Y11/Y52=1.02.

In the optical lens assembly 1 according to the 1st embodiment, when an axial distance between the aperture stop ST and the r-side conjugate surface RCS is SL, and an axial distance between the m-side surface of the first lens element E1 and the r-side conjugate surface RCS is TL, the following condition is satisfied: SL/TL=1.00.

In the optical lens assembly 1 according to the 1st embodiment, when the axial distance between the m-side surface of the first lens element E1 and the r-side surface of the last lens element is TD (that is, the axial distance between the m-side surface of the first lens element E1 and the r-side surface of the fifth lens element E5), the following condition is satisfied: TD=11.47 mm.

In the optical lens assembly 1 according to the 1st embodiment, when an effective diameter of the aperture stop of the optical lens assembly 1 is Ds, a maximum image height of the optical lens assembly 1 is ImgH, and the axial distance between the m-side surface of the first lens element E1 and the r-side surface of the last lens element is TD (that is, the axial distance between the m-side surface of the first lens element E1 and the r-side surface of the fifth lens element E5), the following conditions are satisfied: Ds/ImgH=1.67; and Ds/TD=0.42.

In the optical lens assembly 1 according to the 1st embodiment, when a maximum of chief ray angles of the optical lens assembly 1 is CRAmax, the following condition is satisfied: CRAmax=20.12 degrees.

In the optical lens assembly 1 according to the 1st embodiment, when a vertical distance between the inflection point closest to the optical axis on one of the m-side or r-side surfaces of the third lens element and the optical axis is Yc3 (that is, the vertical distance between the inflection point of the m-side surface of the third lens element E3 which closest to the optical axis and the optical axis), a vertical distance between an inflection point closest to the optical axis on one of the m-side or r-side surfaces of the fourth lens element E4 and the optical axis is Yc4 (that is, the vertical distance between the inflection point of the r-side surface of the fourth lens element E4 which closest to the optical axis and the optical axis), a vertical distance between the inflection point closest to the optical axis on one of the m-side or r-side surfaces of the last lens element and the optical axis is Yc5 (that is, the vertical distance between the inflection point of the m-side surface of the fifth lens element E5 which closest to the optical axis and the optical axis), and the focal length of the optical lens assembly is f, the following conditions are satisfied: Yc3/f=0.39; Yc4/f=0.23; and Yc5/f=0.29.

The detailed optical data of the 1st embodiment are shown in Table 1A and the aspheric surface data are shown in Table 1B below.

TABLE 1A

1st Embodiment
f = 7.20 mm, Fno = 1.49, HFOV = 22.5 deg.

| Surface # | | Curvature Radius | | Thickness | Material | Index | Abbe # | Focal Length |
|---|---|---|---|---|---|---|---|---|
| 0 | m-side surface | Plano | | Infinity | | | | |
| 1 | Ape. Stop | Plano | | 0.040 | | | | |
| 2 | Lens 1 | 5.0735 | ASP | 1.182 | Plastic | 1.544 | 56.0 | 13.49 |
| 3 | | 15.0961 | ASP | 1.675 | | | | |
| 4 | Lens 2 | −4.0940 | ASP | 2.200 | Plastic | 1.686 | 18.4 | −13.31 |

TABLE 1A-continued

1st Embodiment
f = 7.20 mm, Fno = 1.49, HFOV = 22.5 deg.

| Surface # | | Curvature Radius | | Thickness | Material | Index | Abbe # | Focal Length |
|---|---|---|---|---|---|---|---|---|
| 5 | | −9.0412 | ASP | 0.495 | | | | |
| 6 | Lens 3 | 4.0896 | ASP | 2.900 | Glass | 1.744 | 44.8 | 4.61 |
| 7 | | −14.7341 | ASP | 0.080 | | | | |
| 8 | Lens 4 | −8.8752 | ASP | 2.140 | Glass | 1.744 | 44.8 | 7.76 |
| 9 | | −3.8569 | ASP | 0.294 | | | | |
| 10 | Lens 5 | −3.3891 | ASP | 0.500 | Plastic | 1.669 | 19.5 | −3.75 |
| 11 | | 10.1976 | ASP | 0.750 | | | | |
| 12 | Filter | Plano | | 1.553 | Glass | 1.517 | 64.2 | |
| 13 | | Plano | | 0.275 | | | | |
| 14 | RCS | Plano | | — | | | | |

Reference wavelength is 587.6 nm (d-line).

TABLE 1B

Aspheric Coefficients

| Surface # | 2 | 3 | 4 | 5 | 6 |
|---|---|---|---|---|---|
| k= | 1.36233E+00 | 3.30213E+00 | 7.37851E−01 | −9.58290E+00 | −6.36020E−01 |
| A4= | −5.22944E−04 | 2.17221E−03 | 1.11821E−02 | 3.61571E−04 | −2.52127E−03 |
| A6= | 3.35889E−05 | 5.19009E−05 | −7.64336E−04 | −1.43893E−04 | 6.43877E−05 |
| A8= | −8.61267E−06 | −1.11390E−06 | 5.59240E−05 | 4.37979E−06 | −7.12840E−06 |
| A10= | −5.80182E−07 | −1.64723E−06 | −1.10579E−06 | −3.06043E−08 | −5.42391E−08 |

| Surface # | 7 | 8 | 9 | 10 | 11 |
|---|---|---|---|---|---|
| k= | 3.74816E+00 | −1.47550E+01 | −8.85363E+00 | −8.57687E+00 | 2.53039E+00 |
| A4= | 1.38451E−04 | 1.30830E−03 | 2.51155E−03 | −3.30949E−03 | −1.52152E−03 |
| A6= | −2.86022E−05 | 6.18647E−05 | −4.67159E−05 | 4.36369E−04 | 6.04991E−04 |
| A8= | −9.63938E−07 | −2.64509E−06 | −2.56676E−06 | −4.04854E−07 | 1.23911E−05 |
| A10= | −2.70136E−08 | −2.30979E−08 | 1.14017E−07 | −1.30023E−06 | −6.79964E−08 |
| A12= | | | | 5.64343E−08 | −6.80000E−08 |

In Table 1A, the curvature radius, the thickness and the focal length are shown in millimeters (mm). Surface numbers 0-14 represent the surfaces sequentially arranged from the magnification side to the reduction side along the optical axis. The refractive indices are measured under the reference wavelength. In Table 1B, k represents the conic coefficient of the equation of the aspheric surface profiles. A4-A12 represent the aspheric coefficients ranging from the 4th order to the 12th order. The tables presented below for each embodiment correspond to schematic parameter and aberration curves of each embodiment, and term definitions of the tables are the same as those in Table 1A and Table 1B of the 1st embodiment. Therefore, an explanation in this regard will not be provided again.

Furthermore, please refer to the following Table 1C, in the optical lens assembly 1 according to the 1st embodiment, when a vertical distance between the inflection point closest to the optical axis on each of m-side or r-side surfaces of the first lens element E1 to the fifth lens element E5 and the optical axis is Yc, and the focal length of the optical lens assembly 1 is f, the following conditions are satisfied:

TABLE 1C

Yc/f

| | First lens element | Second lens element | Third lens element | Fourth lens element | Fifth lens element |
|---|---|---|---|---|---|
| M-side surface | — | — | 0.39 | 0.24 | 0.29 |

TABLE 1C-continued

Yc/f

| | First lens element | Second lens element | Third lens element | Fourth lens element | Fifth lens element |
|---|---|---|---|---|---|
| R-side surface | 0.36 | — | — | 0.23 | — |

2nd Embodiment

Figure 3:
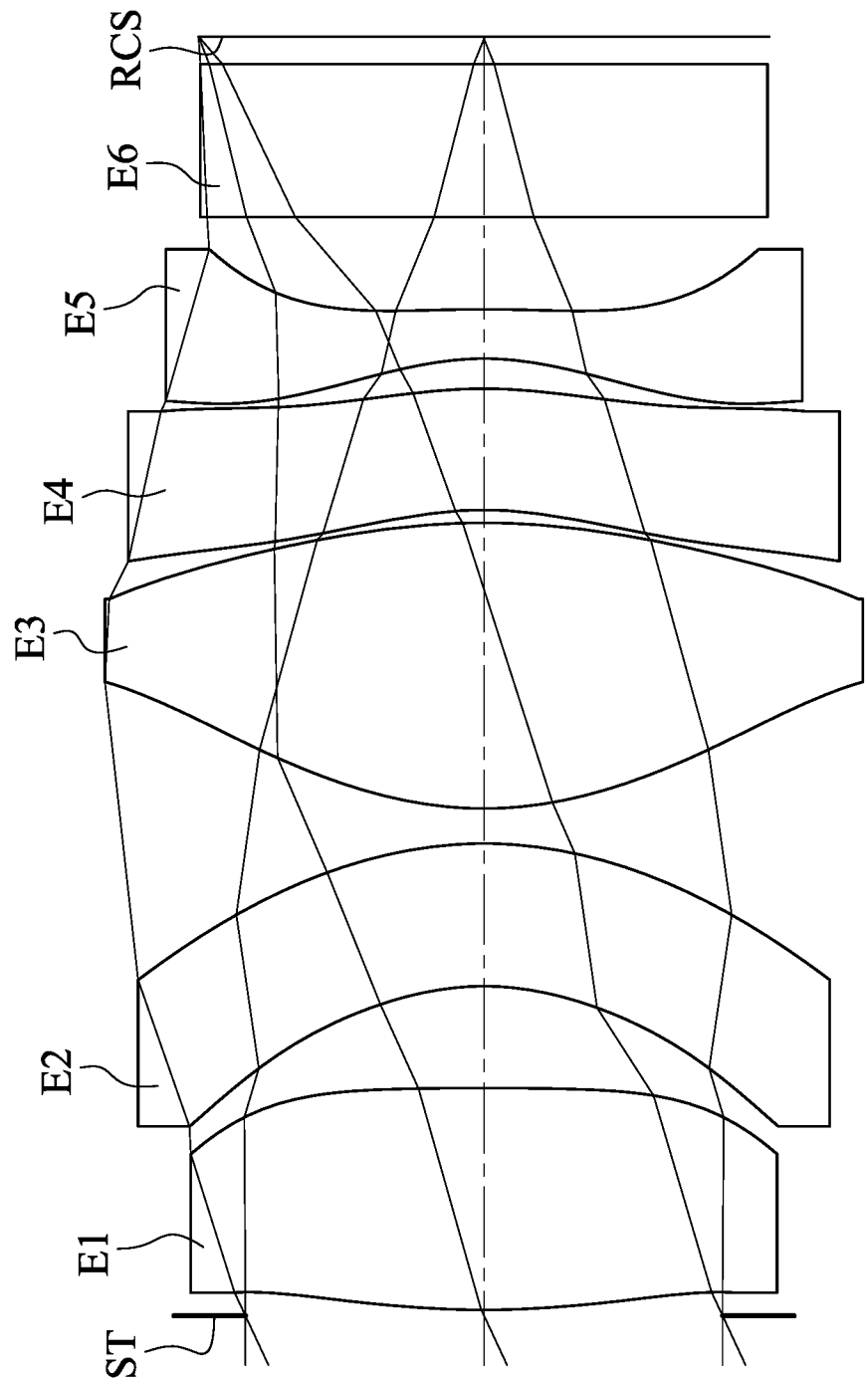
FIG. 3 is a schematic view of an optical lens assembly according to the 2nd embodiment of the present disclosure.
Figure 4:
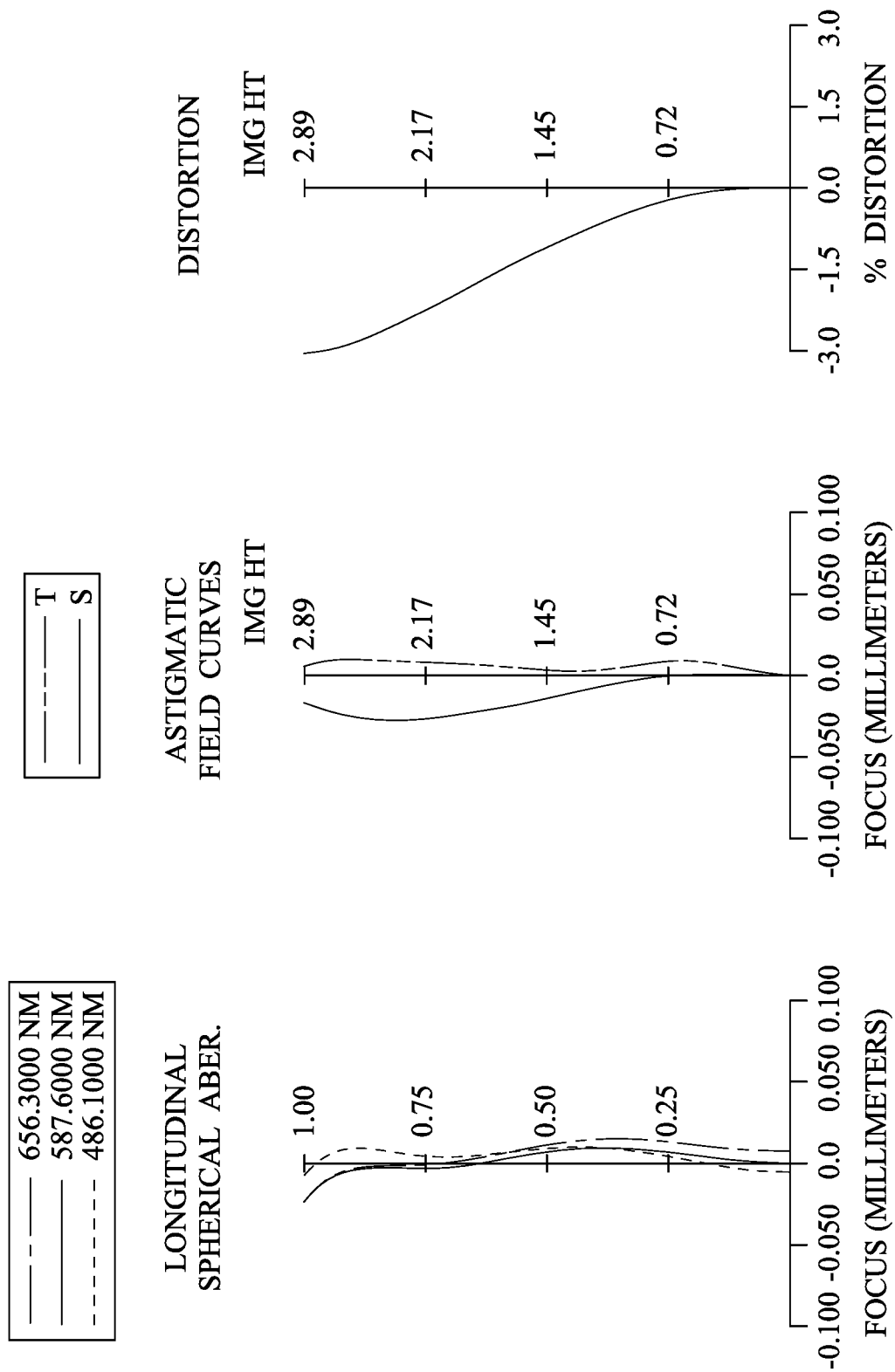
FIG. 4 shows spherical aberration curves, astigmatic field curves and a distortion curve of the optical lens assembly according to the 2nd embodiment.

FIG. 3 is a schematic view of an optical lens assembly 2 according to the 2nd embodiment of the present disclosure. FIG. 4 shows spherical aberration curves, astigmatic field curves and a distortion curve of the optical lens assembly 2 according to the 2nd embodiment. In FIG. 3, the optical lens assembly 2 includes, in order from a magnification side to a reduction side, an aperture stop ST, a first lens element E1, a second lens element E2, a third lens element E3, a fourth lens element E4, a fifth lens element E5, a filter E6 and an r-side conjugate surface RCS. The optical lens assembly 2 includes five lens elements (E1, E2, E3, E4, E5) without additional one or more lens elements inserted between the first lens element E1 and the fifth lens element E5.

The first lens element E1 with positive refractive power has an m-side surface being convex in a paraxial region thereof and an r-side surface being convex in a paraxial region thereof. The first lens element E1 is made of plastic material, and has the m-side surface and the r-side surface being both aspheric. Further, the m-side surface of the first lens element E1 includes an inflection point.

The second lens element E2 with negative refractive power has an m-side surface being concave in a paraxial region thereof and an r-side surface being convex in a paraxial region thereof. The second lens element E2 is made of plastic material, and has the m-side surface and the r-side surface being both aspheric. Further, the m-side surface of the second lens element E2 includes an inflection point.

The third lens element E3 with positive refractive power has an m-side surface being convex in a paraxial region thereof and an r-side surface being convex in a paraxial region thereof. The third lens element E3 is made of glass material, and has the m-side surface and the r-side surface being both aspheric. Further, the m-side surface of the third lens element E3 includes an inflection point.

The fourth lens element E4 with negative refractive power has an m-side surface being concave in a paraxial region thereof and an r-side surface being convex in a paraxial region thereof. The fourth lens element E4 is made of plastic material, and has the m-side surface and the r-side surface being both aspheric. Further, the m-side surface of the fourth lens element E4 includes three inflection points, and the r-side surface of the fourth lens element E4 includes two inflection points.

The fifth lens element E5 with negative refractive power has an m-side surface being concave in a paraxial region thereof and an r-side surface being convex in a paraxial region thereof. The fifth lens element E5 is made of plastic material, and has the m-side surface and the r-side surface being both aspheric. Further, the m-side surface of the fifth lens element E5 includes two inflection points, and the r-side surface of the fifth lens element E5 includes an inflection point.

The filter E6 is made of glass material, which is located between the fifth lens element E5 and the r-side conjugate surface RCS, and will not affect the focal length of the optical lens assembly 2.

The detailed optical data of the 2nd embodiment are shown in Table 2A and the aspheric surface data are shown in Table 2B below.

TABLE 2A

2nd Embodiment
f = 6.41 mm, Fno = 1.32, HFOV = 25.0 deg.

| Surface # |  | Curvature Radius |  | Thickness | Material | Index | Abbe # | Focal Length |
|---|---|---|---|---|---|---|---|---|
| 0 | m-side surface | Plano |  | Infinity |  |  |  |  |
| 1 | Ape. Stop | Plano |  | 0.060 |  |  |  |  |
| 2 | Lens 1 | 9.4417 | ASP | 2.251 | Plastic | 1.544 | 56.0 | 15.38 |
| 3 |  | −67.3738 | ASP | 1.034 |  |  |  |  |
| 4 | Lens 2 | −2.8426 | ASP | 1.449 | Plastic | 1.686 | 18.4 | −24.81 |
| 5 |  | −4.1200 | ASP | 0.355 |  |  |  |  |
| 6 | Lens 3 | 3.8918 | ASP | 2.900 | Glass | 1.744 | 44.8 | 3.85 |
| 7 |  | −7.3899 | ASP | 0.130 |  |  |  |  |
| 8 | Lens 4 | −3.8342 | ASP | 1.232 | Plastic | 1.660 | 20.4 | −50.97 |
| 9 |  | −4.8804 | ASP | 0.305 |  |  |  |  |
| 10 | Lens 5 | −2.9066 | ASP | 0.500 | Plastic | 1.669 | 19.5 | −5.60 |
| 11 |  | −13.8845 | ASP | 0.936 |  |  |  |  |
| 12 | Filter | Plano |  | 1.553 | Glass | 1.517 | 64.2 |  |
| 13 |  | Plano |  | 0.279 |  |  |  |  |
| 14 | RCS | Plano |  | — |  |  |  |  |

Reference wavelength is 587.6 nm (d-line).

TABLE 2B

Aspheric Coefficients

| Surface # | 2 | 3 | 4 | 5 | 6 |
|---|---|---|---|---|---|
| k= | 2.69465E−01 | −5.00000E+01 | −4.07134E−01 | −3.23567E+00 | −7.55472E−01 |
| A4= | −2.60023E−03 | −4.85442E−03 | 1.32763E−02 | −1.18168E−03 | −3.32218E−03 |
| A6= | −2.22426E−04 | −3.96751E−04 | −1.82770E−03 | −2.10877E−04 | 1.00965E−04 |
| A8= | 1.41756E−05 | −1.97815E−05 | 1.24765E−04 | 2.15218E−05 | −1.11426E−05 |
| A10= | −2.90722E−06 | 3.12640E−06 | 8.94330E−08 | −5.83658E−07 | 2.67597E−07 |

| Surface # | 7 | 8 | 9 | 10 | 11 |
|---|---|---|---|---|---|
| k= | −4.27335E+00 | −9.93159E+00 | −2.48707E+01 | −7.28358E+00 | −5.00000E+01 |
| A4= | 1.25562E−03 | 4.74200E−03 | 4.87100E−03 | 2.88877E−03 | 1.91976E−02 |
| A6= | −2.42892E−05 | −1.10760E−04 | −4.24343E−05 | 3.99758E−04 | −1.54631E−03 |
| A8= | −6.75155E−06 | −1.36755E−05 | −1.88180E−05 | −8.34473E−06 | 1.32600E−04 |
| A10= | 2.49787E−07 | −5.95415E−08 | −1.08326E−06 | −1.44277E−06 | 8.91826E−06 |
| A12= |  | 3.89677E−08 | 1.04657E−07 | −6.47163E−08 | −2.31736E−06 |
| A14= |  |  |  | 5.08240E−09 | 9.10358E−08 |

In the 2nd embodiment, the equation of the aspheric surface is the same as 1st embodiment. Further, the definition of the parameters of the following table is the same as 1st embodiment, and will not be defined again.

Moreover, in the following Table 2C, these parameters can be calculated from Table 2A and Table 2B as the following values and satisfy the following conditions:

TABLE 2C

2nd Embodiment

| | | | |
|---|---|---|---|
| f [mm] | 6.41 | T12/(T23 + T34 + T45) | 1.31 |
| Fno | 1.32 | TD/ΣCT | 1.22 |
| HFOV [degrees] | 25.0 | (R3 + R4)/(R3 − R4) | −5.45 |
| Nmax | 1.744 | (|f/f1| + |f/f2|)/|f/f3| | 0.41 |
| V5 | 19.5 | Y11/Y52 | 0.91 |
| Vdmin | 18.4 | SL/TL | 1.00 |
| CT1/CT3 | 0.78 | TD [mm] | 10.16 |
| CT2/T12 | 1.40 | Ds/ImgH | 1.67 |
| CT2/CT4 | 1.18 | Ds/TD | 0.48 |
| T12/ATmax | 1.00 | CRAmax | 21.02 |
| CT3/CT5 | 5.80 | Yc3/f | 0.43 |
| CT3/BL | 1.05 | Yc4/f | 0.17 |
| CT3/CTmin | 5.80 | Yc5/f | 0.09 |

Further, the aforementioned Table 2C of the 2nd embodiment, a vertical distance between the inflection point closest to an optical axis on one of the m-side or r-side surfaces of the third lens element E3 and the optical axis is Yc3, a vertical distance between the inflection point closest to the optical axis on one of the m-side or r-side surfaces of the fourth lens element E4 and the optical axis is Yc4, and a vertical distance between the inflection point closest to the optical axis on one of the m-side or r-side surfaces of the fifth lens element E5 and the optical axis is Yc5.

Furthermore, please refer to the following Table 2D, in the optical lens assembly 2 according to the 2nd embodiment, when a vertical distance between the inflection point closest to the optical axis on each of m-side or r-side surfaces of the first lens element E1 to the fifth lens element E5 and the optical axis is Yc, and the focal length of the optical lens assembly 2 is f, the following conditions are satisfied:

TABLE 2D

Yc/f

| | First lens element | Second lens element | Third lens element | Fourth lens element | Fifth lens element |
|---|---|---|---|---|---|
| M-side surface | 0.24 | 0.44 | 0.43 | 0.21 | 0.21 |
| R-side surface | — | — | — | 0.17 | 0.09 |

3rd Embodiment

Figure 5:
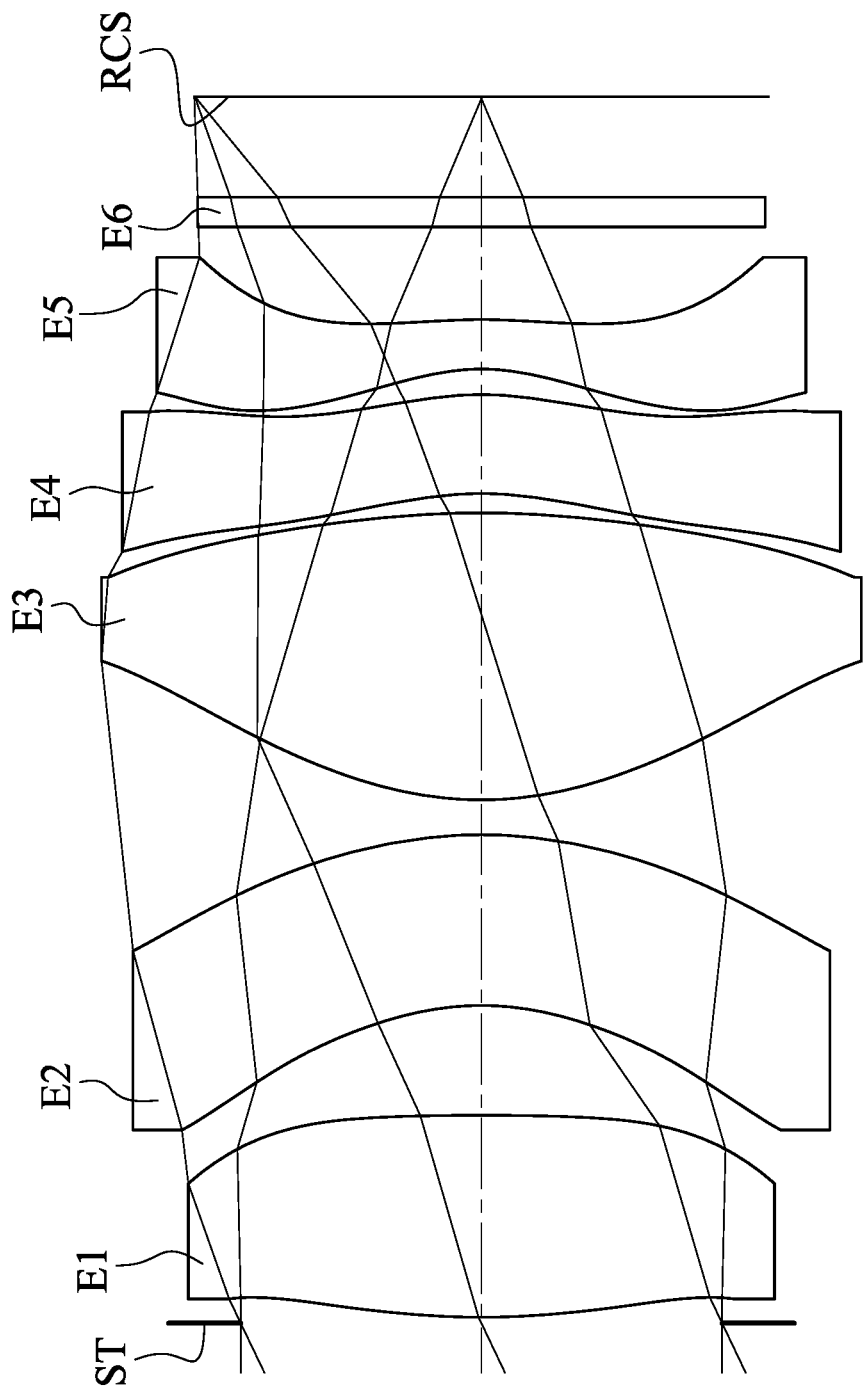
FIG. 5 is a schematic view of an optical lens assembly according to the 3rd embodiment of the present disclosure.
Figure 6:
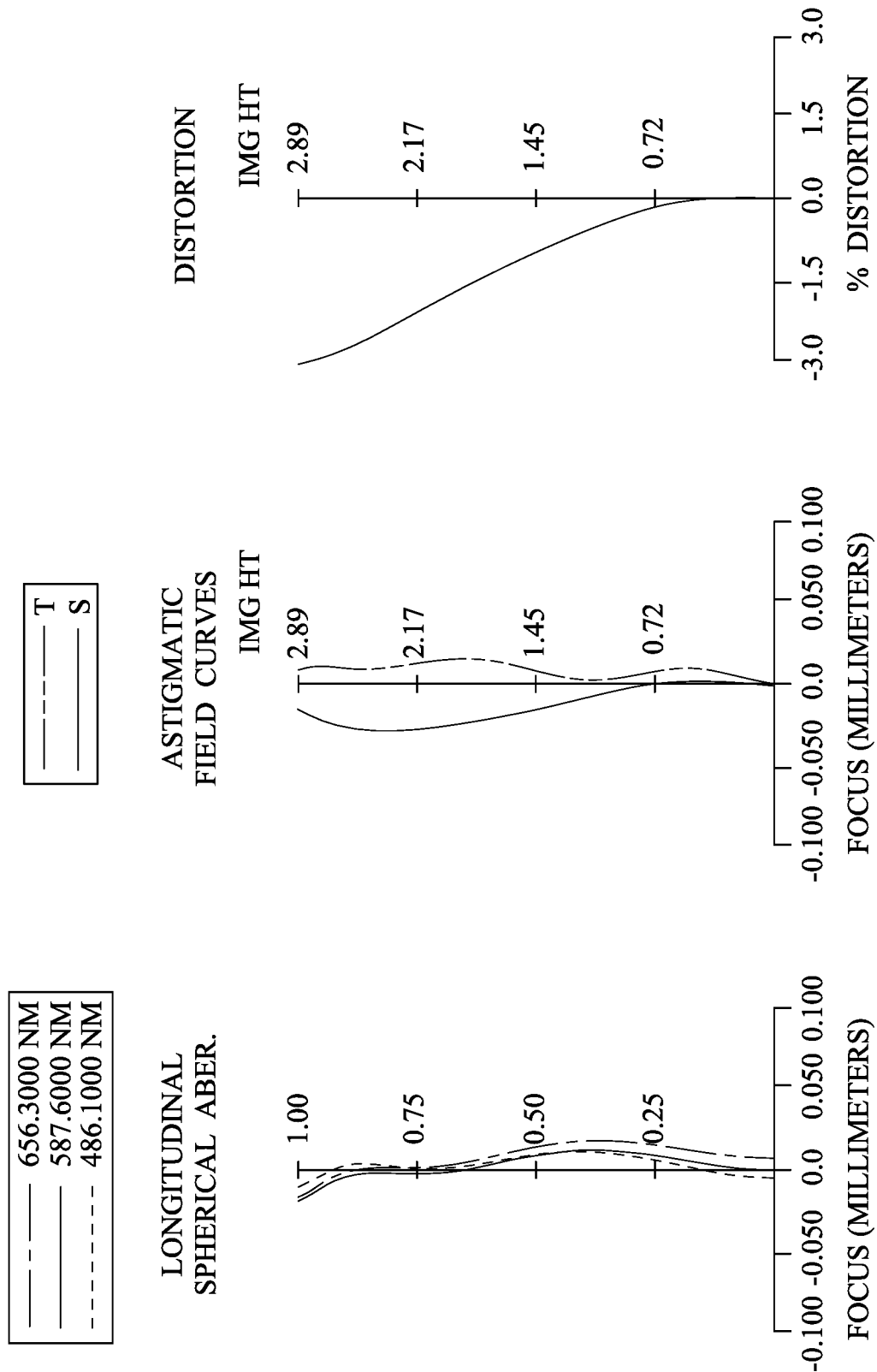
FIG. 6 shows spherical aberration curves, astigmatic field curves and a distortion curve of the optical lens assembly according to the 3rd embodiment.

FIG. 5 is a schematic view of an optical lens assembly 3 according to the 3rd embodiment of the present disclosure. FIG. 6 shows spherical aberration curves, astigmatic field curves and a distortion curve of the optical lens assembly 3 according to the 3rd embodiment. In FIG. 5, the optical lens assembly 3 includes, in order from a magnification side to a reduction side, an aperture stop ST, a first lens element E1, a second lens element E2, a third lens element E3, a fourth lens element E4, a fifth lens element E5, a filter E6 and an r-side conjugate surface RCS. The optical lens assembly 3 includes five lens elements (E1, E2, E3, E4, E5) without additional one or more lens elements inserted between the first lens element E1 and the fifth lens element E5.

The first lens element E1 with positive refractive power has an m-side surface being convex in a paraxial region thereof and an r-side surface being convex in a paraxial region thereof. The first lens element E1 is made of plastic material, and has the m-side surface and the r-side surface being both aspheric. Further, the m-side surface of the first lens element E1 includes an inflection point.

The second lens element E2 with negative refractive power has an m-side surface being concave in a paraxial region thereof and an r-side surface being convex in a paraxial region thereof. The second lens element E2 is made of plastic material, and has the m-side surface and the r-side surface being both aspheric. Further, the m-side surface of the second lens element E2 includes an inflection point, and the r-side surface of the second lens element E2 includes an inflection point.

The third lens element E3 with positive refractive power has an m-side surface being convex in a paraxial region thereof and an r-side surface being convex in a paraxial region thereof. The third lens element E3 is made of glass material, and has the m-side surface and the r-side surface being both aspheric. Further, the m-side surface of the third lens element E3 includes an inflection point.

The fourth lens element E4 with positive refractive power has an m-side surface being concave in a paraxial region thereof and an r-side surface being convex in a paraxial region thereof. The fourth lens element E4 is made of plastic material, and has the m-side surface and the r-side surface being both aspheric. Further, the m-side surface of the fourth lens element E4 includes three inflection points, and the r-side surface of the fourth lens element E4 includes two inflection points.

The fifth lens element E5 with negative refractive power has an m-side surface being concave in a paraxial region thereof and an r-side surface being convex in a paraxial region thereof. The fifth lens element E5 is made of plastic material, and has the m-side surface and the r-side surface being both aspheric. Further, the m-side surface of the fifth lens element E5 includes two inflection points, and the r-side surface of the fifth lens element E5 includes an inflection point.

The filter E6 is made of glass material, which is located between the fifth lens element E5 and the r-side conjugate surface RCS, and will not affect the focal length of the optical lens assembly 3.

The detailed optical data of the 3rd embodiment are shown in Table 3A and the aspheric surface data are shown in Table 3B below.

TABLE 3A

3rd Embodiment
f = 6.26 mm, Fno = 1.29, HFOV = 25.5 deg.

| Surface # | | Curvature Radius | | Thickness | Material | Index | Abbe # | Focal Length |
|---|---|---|---|---|---|---|---|---|
| 0 | m-side surface | Plano | | Infinity | | | | |
| 1 | Ape. Stop | Plano | | 0.060 | | | | |
| 2 | Lens 1 | 8.2660 | ASP | 2.041 | Plastic | 1.544 | 56.0 | 12.44 |

TABLE 3A-continued

3rd Embodiment
f = 6.26 mm, Fno = 1.29, HFOV = 25.5 deg.

| Surface # | | Curvature Radius | | Thickness | Material | Index | Abbe # | Focal Length |
|---|---|---|---|---|---|---|---|---|
| 3 | | −34.0321 | ASP | 1.110 | | | | |
| 4 | Lens 2 | −2.8508 | ASP | 1.725 | Plastic | 1.686 | 18.4 | −16.55 |
| 5 | | −4.7434 | ASP | 0.353 | | | | |
| 6 | Lens 3 | 3.6313 | ASP | 2.900 | Glass | 1.744 | 44.8 | 3.94 |
| 7 | | −10.0350 | ASP | 0.196 | | | | |
| 8 | Lens 4 | −3.5759 | ASP | 1.000 | Plastic | 1.660 | 20.4 | 24.93 |
| 9 | | −3.2641 | ASP | 0.259 | | | | |
| 10 | Lens 5 | −2.0909 | ASP | 0.500 | Plastic | 1.669 | 19.5 | −4.91 |
| 11 | | −6.3114 | ASP | 0.936 | | | | |
| 12 | Filter | Plano | | 0.300 | Glass | 1.517 | 64.2 | |
| 13 | | Plano | | 1.017 | | | | |
| 14 | RCS | Plano | | — | | | | |

Reference wavelength is 587.6 nm (d-line).

TABLE 3B

Aspheric Coefficients

| Surface # | 2 | 3 | 4 | 5 | 6 |
|---|---|---|---|---|---|
| k= | −2.97504E−01 | 8.55320E+00 | −3.88364E−01 | −3.02825E+00 | −8.22074E−01 |
| A4= | −2.51779E−03 | −3.54959E−03 | 1.62076E−02 | −3.18332E−05 | −3.84144E−03 |
| A6= | −3.27208E−04 | −7.34716E−04 | −2.47478E−03 | −3.32567E−04 | 1.97236E−04 |
| A8= | 1.56459E−05 | 2.52358E−05 | 2.32856E−04 | 3.21152E−05 | −1.69776E−05 |
| A10= | −4.02848E−06 | 1.14161E−06 | −4.54605E−06 | −7.92213E−07 | 3.85028E−07 |

| Surface # | 7 | 8 | 9 | 10 | 11 |
|---|---|---|---|---|---|
| k= | 1.18155E−01 | −9.89033E+00 | −1.42644E+01 | −6.72942E+00 | −5.00000E+01 |
| A4= | 1.36244E−03 | 6.98321E−03 | 9.43522E−03 | 9.83260E−03 | 2.21907E−02 |
| A6= | 7.24677E−05 | −3.81651E−04 | −1.30021E−04 | −4.56597E−04 | −1.92204E−03 |
| A8= | −2.00012E−05 | −1.40299E−05 | −2.86753E−05 | 5.79533E−05 | 1.26658E−04 |
| A10= | 7.24559E−07 | 5.18026E−07 | −2.31526E−06 | −5.45485E−07 | 5.77797E−06 |
| A12= | | 3.28264E−08 | 1.97999E−07 | −5.55728E−07 | −7.85330E−07 |
| A14= | | | | 2.46116E−08 | −1.40731E−08 |

In the 3rd embodiment, the equation of the aspheric surface is the same as 1st embodiment. Further, the definition of the parameters of the following table is the same as 1st embodiment, and will not be defined again.

Moreover, in the following Table 3C, these parameters can be calculated from Table 3A and Table 3B as the following values and satisfy the following conditions:

TABLE 3C

3rd Embodiment

| f [mm] | 6.26 | T12/(T23 + T34 + T45) | 1.37 |
|---|---|---|---|
| Fno | 1.29 | TD/ΣCT | 1.23 |
| HFOV [degrees] | 25.5 | (R3 + R4)/(R3 − R4) | −4.01 |
| Nmax | 1.744 | (|f/f1| + |f/f2|)/|f/f3| | 0.55 |
| V5 | 19.5 | Y11/Y52 | 0.89 |
| Vdmin | 18.4 | SL/TL | 1.00 |
| CT1/CT3 | 0.70 | TD [mm] | 10.08 |
| CT2/T12 | 1.55 | Ds/ImgH | 1.68 |
| CT2/CT4 | 1.73 | Ds/TD | 0.48 |
| T12/ATmax | 1.00 | CRAmax | 19.48 |
| CT3/CT5 | 5.80 | Yc3/f | 0.45 |
| CT3/BL | 1.29 | Yc4/f | 0.15 |
| CT3/CTmin | 5.80 | Yc5/f | 0.10 |

Further, the aforementioned Table 3C of the 3rd embodiment, a vertical distance between the inflection point closest to an optical axis on one of the m-side or r-side surfaces of the third lens element E3 and the optical axis is Yc3, a vertical distance between the inflection point closest to the optical axis on one of the m-side or r-side surfaces of the fourth lens element E4 and the optical axis is Yc4, and a vertical distance between the inflection point closest to the optical axis on one of the m-side or r-side surfaces of the fifth lens element E5 and the optical axis is Yc5.

Furthermore, please refer to the following Table 3D, the optical lens assembly 3 according to the 3rd embodiment, when a vertical distance between the inflection point closest to the optical axis on each of m-side or r-side surfaces of the first lens element E1 to the fifth lens element E5 and the optical axis is Yc, and the focal length of the optical lens assembly 3 is f, the following conditions are satisfied:

TABLE 3D

| | Yc/f | | | | |
|---|---|---|---|---|---|
| | First lens element | Second lens element | Third lens element | Fourth lens element | Fifth lens element |
| M-side surface | 0.25 | 0.40 | 0.45 | 0.19 | 0.17 |
| R-side surface | — | 0.50 | — | 0.15 | 0.10 |

4th Embodiment

Figure 7:
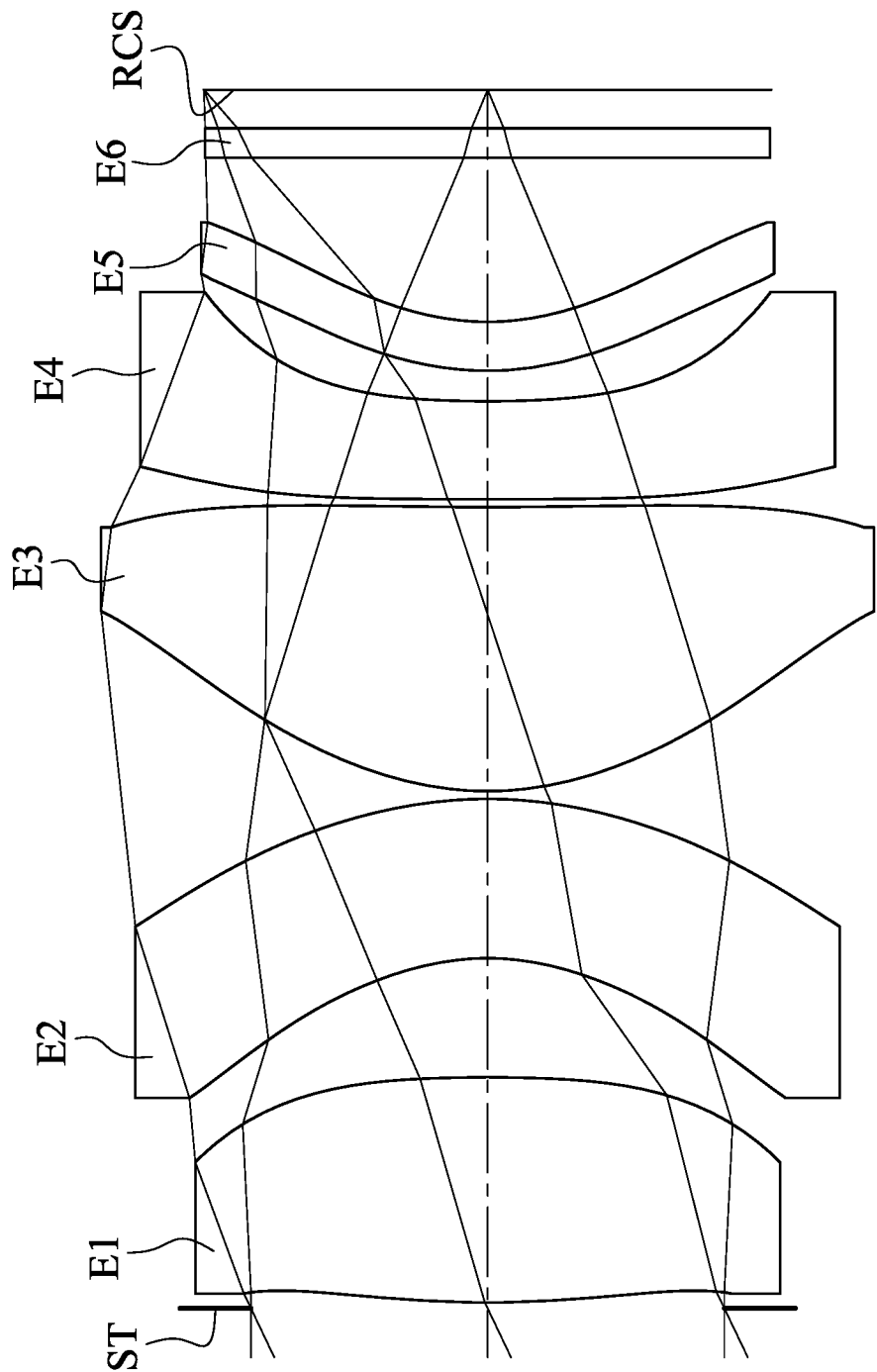
FIG. 7 is a schematic view of an optical lens assembly according to the 4th embodiment of the present disclosure.
Figure 8:
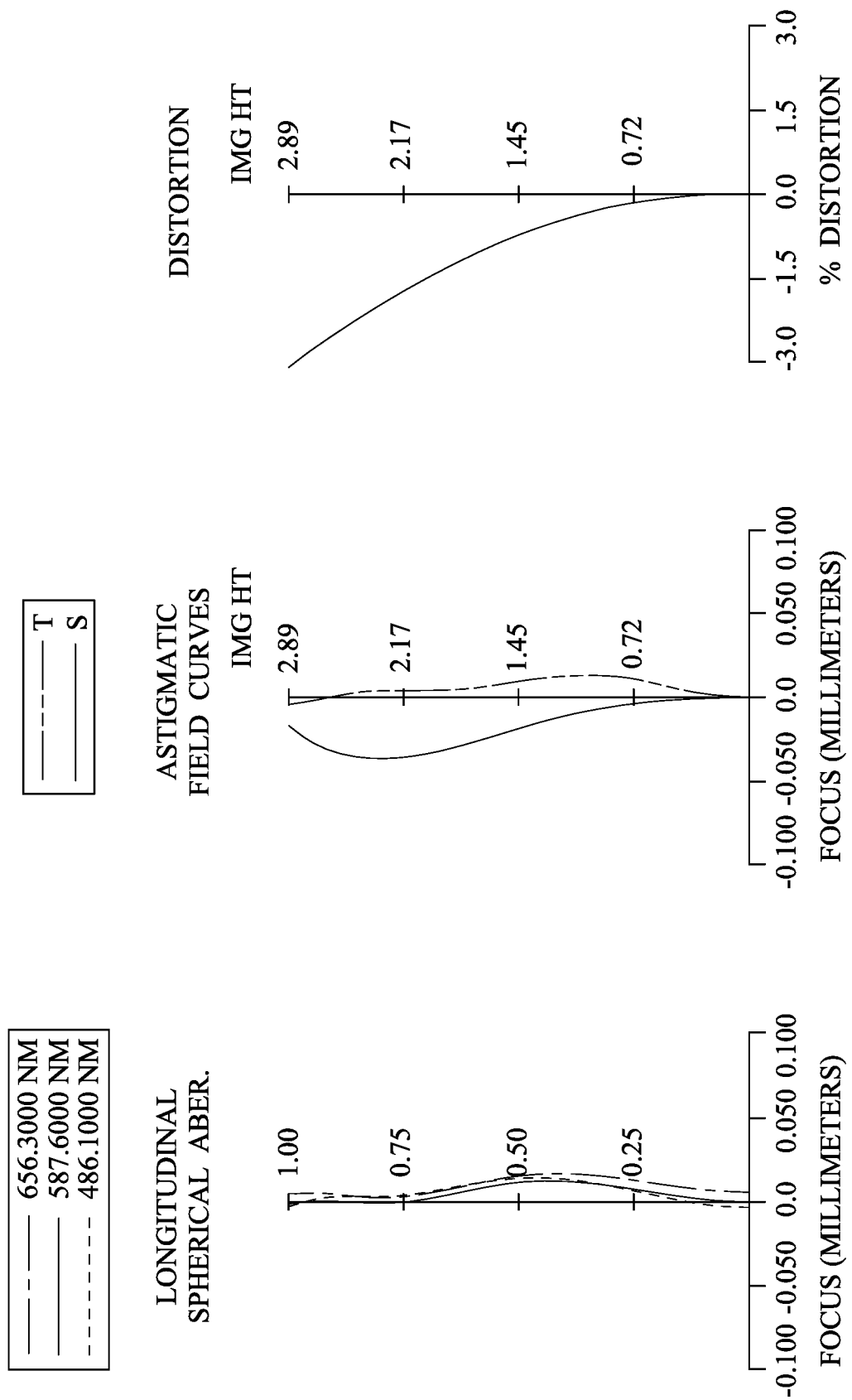
FIG. 8 shows spherical aberration curves, astigmatic field curves and a distortion curve of the optical lens assembly according to the 4th embodiment.

FIG. 7 is a schematic view of an optical lens assembly 4 according to the 4th embodiment of the present disclosure. FIG. 8 shows spherical aberration curves, astigmatic field curves and a distortion curve of the optical lens assembly 4 according to the 4th embodiment. In FIG. 7, the optical lens assembly 4 includes, in order from a magnification side to a reduction side, an aperture stop ST, a first lens element E1, a second lens element E2, a third lens element E3, a fourth lens element E4, a fifth lens element E5, a filter E6 and an r-side conjugate surface RCS. The optical lens assembly 4 includes five lens elements (E1, E2, E3, E4, E5) without additional one. or more lens elements inserted between the first lens element E1 and the fifth lens element E5.

The first lens element E1 with positive refractive power has an m-side surface being convex in a paraxial region thereof and an r-side surface being convex in a paraxial region thereof. The first lens element E1 is made of plastic material, and has the m-side surface and the r-side surface being both aspheric. Further, the m-side surface of the first lens element E1 includes an inflection point.

The second lens element E2 with negative refractive power has an m-side surface being concave in a paraxial region thereof and an r-side surface being convex in a paraxial region thereof. The second lens element E2 is made of plastic material, and has the m-side surface and the r-side surface being both aspheric. Further, the m-side surface of the second lens element E2 includes an inflection point.

The third lens element E3 with positive refractive power has an m-side surface being convex in a paraxial region thereof and an r-side surface being concave in a paraxial region thereof. The third lens element E3 is made of plastic material, and has the m-side surface and the r-side surface being both aspheric. Further, the m-side surface of the third lens element E3 includes an inflection point, and the r-side surface of the third lens element E3 includes an inflection point.

The fourth lens element E4 with negative refractive power has an m-side surface being convex in a paraxial region thereof and an r-side surface being concave in a paraxial region thereof. The fourth lens element E4 is made of plastic material, and has the m-side surface and the r-side surface being both aspheric. Further, the m-side surface of the fourth lens element E4 includes an inflection point.

The fifth lens element E5 with negative refractive power has an m-side surface being convex in a paraxial region thereof and an r-side surface being concave in a paraxial region thereof. The fifth lens element E5 is made of plastic material, and has the m-side surface and the r-side surface being both aspheric. Further, the m-side surface of the fifth lens element E5 includes two inflection points, and the r-side surface of the fifth lens element E5 includes an inflection point.

The filter E6 is made of glass material, which is located between the fifth lens element E5 and the r-side conjugate surface RCS, and will not affect the focal length of the optical lens assembly 4.

The detailed optical data of the 4th embodiment are shown in Table 4A and the aspheric surface data are shown in Table 4B below.

TABLE 4A

4th Embodiment
f = 6.26 mm, Fno = 1.30, HFOV = 25.5 deg.

| Surface # | | Curvature Radius | Thickness | Material | Index | Abbe # | Focal Length |
|---|---|---|---|---|---|---|---|
| 0 | m-side surface | Plano | Infinity | | | | |
| 1 | Ape. Stop | Plano | 0.060 | | | | |
| 2 | Lens 1 | 10.8265 | ASP 2.300 | Plastic | 1.544 | 56.0 | 12.14 |
| 3 | | −15.6761 | ASP 1.214 | | | | |
| 4 | Lens 2 | −2.6556 | ASP 1.627 | Plastic | 1.686 | 18.4 | −14.32 |
| 5 | | −4.5463 | ASP 0.080 | | | | |
| 6 | Lens 3 | 3.3275 | ASP 2.900 | Plastic | 1.620 | 60.3 | 5.62 |
| 7 | | 47.8469 | ASP 0.080 | | | | |
| 8 | Lens 4 | 298.5075 | ASP 1.000 | Plastic | 1.660 | 20.4 | −19.38 |
| 9 | | 12.2500 | ASP 0.312 | | | | |
| 10 | Lens 5 | 3.1942 | ASP 0.500 | Plastic | 1.669 | 19.5 | −47.76 |
| 11 | | 2.7217 | ASP 1.674 | | | | |
| 12 | Filter | Plano | 0.300 | Glass | 1.517 | 64.2 | |
| 13 | | Plano | 0.396 | | | | |
| 14 | RCS | Plano | — | | | | |

Reference wavelength is 587.6 nm (d-line).

TABLE 4B

Aspheric Coefficients

| Surface # | 2 | 3 | 4 | 5 | 6 |
|---|---|---|---|---|---|
| k= | 1.41673E+00 | 1.53968E+01 | −6.42876E−01 | −3.55478E+00 | −5.10679E−01 |
| A4= | −3.35820E−03 | −5.75313E−03 | 1.26891E−02 | −5.31819E−04 | −4.09647E−03 |
| A6= | −2.39839E−04 | −2.14634E−04 | −1.92840E−03 | −2.98077E−04 | 1.59361E−04 |
| A8= | 1.43279E−05 | 1.38322E−05 | 1.88479E−04 | 2.69671E−05 | −1.38860E−05 |
| A10= | −4.43210E−06 | −2.18132E−08 | −5.19851E−06 | −6.58759E−07 | 4.86436E−08 |

| Surface # | 7 | 8 | 9 | 10 | 11 |
|---|---|---|---|---|---|
| k= | −5.00000E+01 | −5.00000E+01 | 6.86372E+00 | −3.23970E−01 | −1.04308E+00 |
| A4= | −1.74209E−03 | 2.69797E−03 | 1.02873E−02 | −4.23713E−03 | −3.94995E−03 |
| A6= | 7.13284E−05 | −2.14183E−05 | 7.29058E−05 | −7.51821E−04 | −5.37391E−04 |
| A8= | −6.34888E−06 | −1.33513E−06 | −4.19581E−06 | 8.95222E−06 | −4.10180E−05 |
| A10= | 1.42844E−07 | −3.08932E−08 | −7.47669E−07 | 8.76339E−07 | 1.34328E−05 |
| A12= | | −7.37927E−09 | 5.69045E−08 | 9.20046E−08 | −8.84942E−07 |
| A14= | | | | 1.00941E−08 | 1.89283E−08 |

In the 4th embodiment, the equation of the aspheric surface is the same as 1st embodiment. Further, the definition of the parameters of the following table is the same as 1st embodiment, and will not be defined again.

Moreover, in the following Table 4C, these parameters can be calculated from Table 4A and Table 4B as the following values and satisfy the following conditions:

TABLE 4C

4th Embodiment

| f [mm] | 6.26 | T12/(T23 + T34 + T45) | 2.57 |
|---|---|---|---|
| Fno | 1.30 | TD/ΣCT | 1.20 |
| HFOV [degrees] | 25.5 | (R3 + R4)/(R3 − R4) | −3.81 |
| Nmax | 1.686 | (\|f/f1\| + \|f/f2\|)/\|f/f3\| | 0.86 |
| V5 | 19.5 | Y11/Y52 | 0.87 |
| Vdmin | 18.4 | SL/TL | 1.00 |
| CT1/CT3 | 0.79 | TD [mm] | 10.01 |
| CT2/T12 | 1.34 | Ds/ImgH | 1.67 |
| CT2/CT4 | 1.63 | Ds/TD | 0.48 |
| T12/ATmax | 1.00 | CRAmax | 20.03 |
| CT3/CT5 | 5.80 | Yc3/f | 0.16 |
| CT3/BL | 1.22 | Yc4/f | 0.53 |
| CT3/CTmin | 5.80 | Yc5/f | 0.31 |

Further, the aforementioned Table 4C of the 4th embodiment, a vertical distance between the inflection point closest to an optical axis on one of the m-side or r-side surfaces of the third lens element E3 and the optical axis is Yc3, a vertical distance between the inflection point closest to the optical axis on one of the m-side or r-side surfaces of the fourth lens element E4 and the optical axis is Yc4, and a vertical distance between the inflection point closest to the optical axis on one of the m-side or r-side surfaces of the fifth lens element E5 and the optical axis is Yc5.

Furthermore, please refer to the following Table 4D, in the optical lens assembly 4 according to the 4th embodiment, when a vertical distance between the inflection point closest to the optical axis on each of m-side or r-side surfaces of the first lens element E1 to the fifth lens element E5 and the optical axis is Yc, and the focal length of the optical lens assembly 4 is f, the following conditions are satisfied:

TABLE 4D

| | Yc/f | | | | |
|---|---|---|---|---|---|
| | First lens element | Second lens element | Third lens element | Fourth lens element | Fifth lens element |
| M-side surface | 0.22 | 0.42 | 0.50 | 0.53 | 0.32 |
| R-side surface | — | — | 0.16 | — | 0.31 |

5th Embodiment

Figure 9:
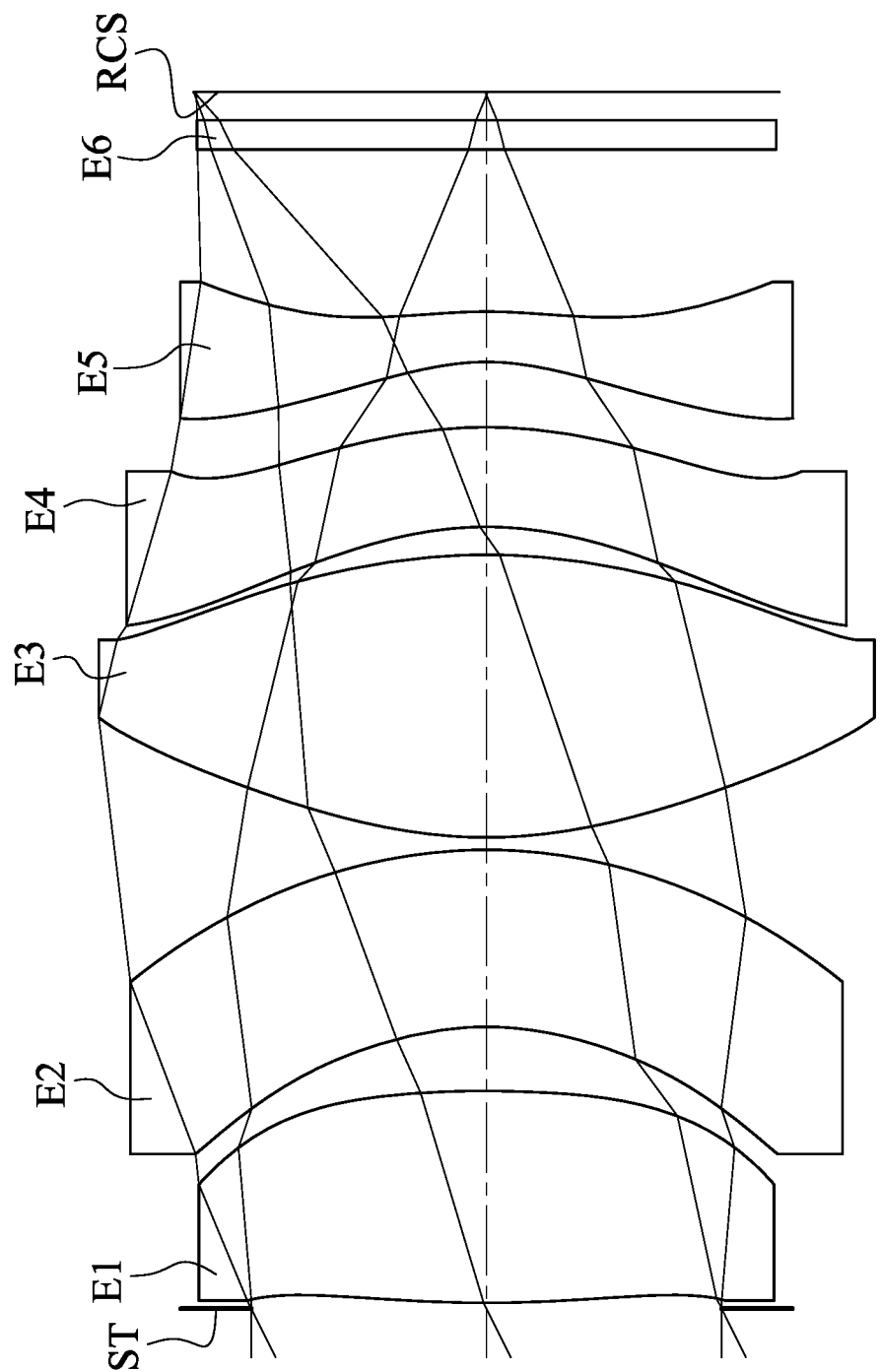
FIG. 9 is a schematic view of an optical lens assembly according to the 5th embodiment of the present disclosure.
Figure 10:
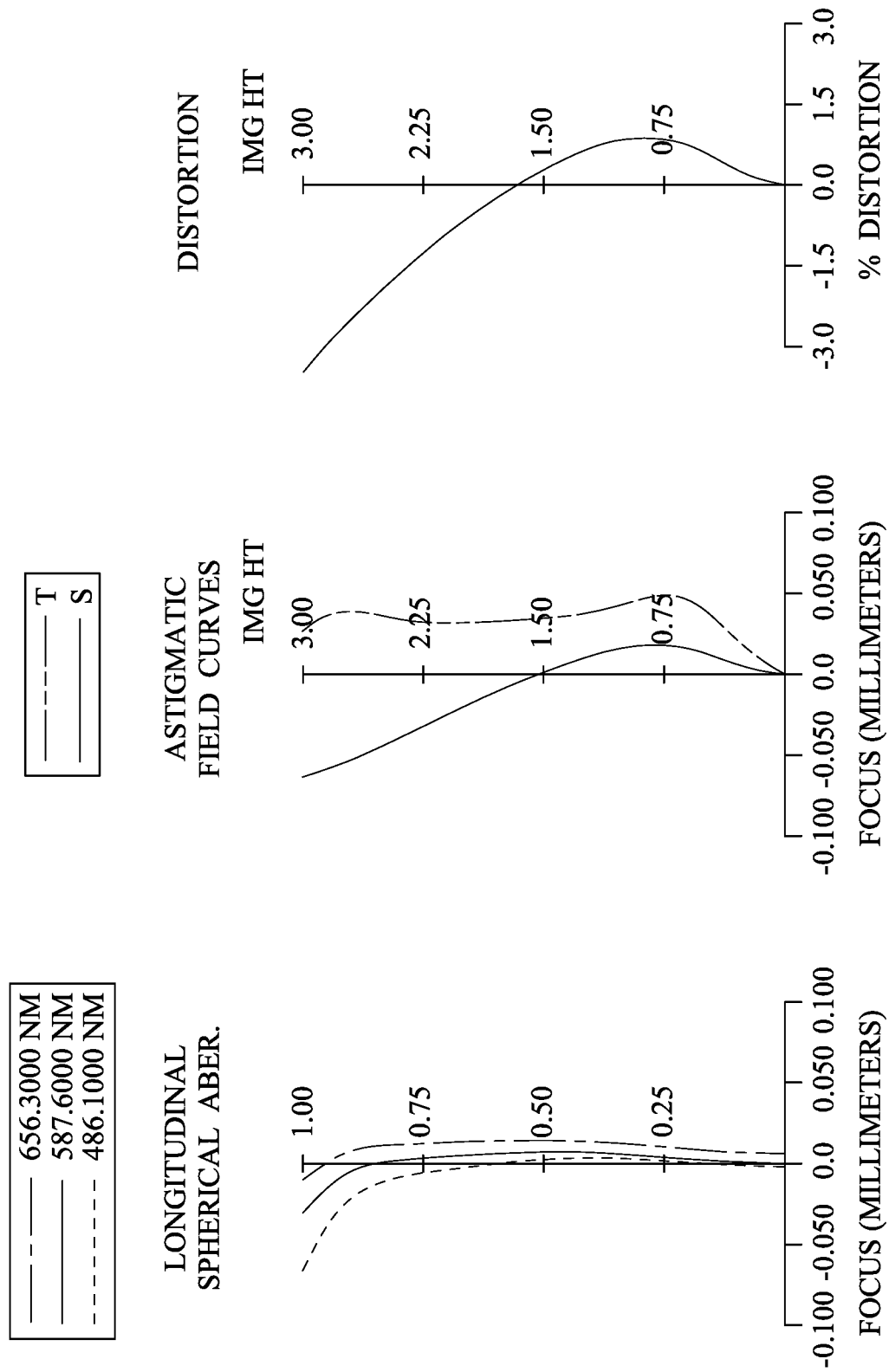
FIG. 10 shows spherical aberration curves, astigmatic field curves and a distortion curve of the optical lens assembly according to the 5th embodiment.

FIG. 9 is a schematic view of an optical lens assembly 5 according to the 5th embodiment of the present disclosure. FIG. 10 shows spherical aberration curves, astigmatic field curves and a distortion curve of the optical lens assembly 5 according to the 5th embodiment. In FIG. 9, the optical lens assembly 5 includes, in order from a magnification side to a reduction side, an aperture stop ST, a first lens element E1, a second lens element E2, a third lens element E3, a fourth lens element E4, a fifth lens element E5, a filter E6 and an r-side conjugate surface RCS. The optical lens assembly 5 includes five lens elements (E1, E2, E3, E4, E5) without additional one or more lens elements inserted between the first lens element E1 and the fifth lens element E5.

The first lens element E1 with positive refractive power has an m-side surface being convex in a paraxial region thereof and an r-side surface being convex in a paraxial region thereof. The first lens element E1 is made of plastic material, and has the m-side surface and the r-side surface being both aspheric. Further, the m-side surface of the first lens element E1 includes an inflection point.

The second lens element E2 with negative refractive power has an m-side surface being concave in a paraxial region thereof and an r-side surface being convex in a paraxial region thereof. The second lens element E2 is made of plastic material, and has the m-side surface and the r-side surface being both aspheric. Further, the m-side surface of the second lens element E2 includes an inflection point.

The third lens element E3 with positive refractive power has an m-side surface being convex in a paraxial region thereof and an r-side surface being convex in a paraxial region thereof. The third lens element E3 is made of glass material, and has the m-side surface and the r-side surface being both aspheric. Further, the r-side surface of the third lens element E3 includes an inflection point.

The fourth lens element E4 with negative refractive power has an m-side surface being concave in a paraxial region thereof and an r-side surface being convex in a paraxial region thereof. The fourth lens element E4 is made of plastic material, and has the m-side surface and the r-side surface being both aspheric. Further, the m-side surface of the fourth lens element E4 includes an inflection point, and the r-side surface of the fourth lens element E4 includes an inflection point.

The fifth lens element E5 with negative refractive power has an m-side surface being concave in a paraxial region thereof and an r-side surface being convex in a paraxial region thereof. The fifth lens element E5 is made of plastic material, and has the m-side surface and the r-side surface being both aspheric. Further, the m-side surface of the fifth lens element E5 includes an inflection point, and the r-side surface of the fifth lens element E5 includes an inflection point.

The filter E6 is made of glass material, which is located between the fifth lens element E5 and the r-side conjugate surface RCS, and will not affect the focal length of the optical lens assembly 5.

The detailed optical data of the 5th embodiment are shown in Table 5A and the aspheric surface data are shown in Table 5B below.

TABLE 5A

5th Embodiment
f = 6.26 mm, Fno = 1.30, HFOV = 26.4 deg.

| Surface # | | Curvature Radius | | Thickness | Material | Index | Abbe # | Focal Length |
|---|---|---|---|---|---|---|---|---|
| 0 | m-side surface | Plano | | Infinity | | | | |
| 1 | Ape. Stop | Plano | | 0.060 | | | | |
| 2 | Lens 1 | 12.9112 | ASP | 2.175 | Plastic | 1.544 | 56.0 | 11.39 |
| 3 | | −11.2002 | ASP | 0.656 | | | | |
| 4 | Lens 2 | −3.2096 | ASP | 1.817 | Plastic | 1.686 | 18.4 | −20.06 |
| 5 | | −5.1504 | ASP | 0.127 | | | | |
| 6 | Lens 3 | 4.9609 | ASP | 2.900 | Glass | 1.744 | 44.8 | 4.25 |
| 7 | | −6.5620 | ASP | 0.286 | | | | |
| 8 | Lens 4 | −3.7170 | ASP | 1.022 | Plastic | 1.660 | 20.4 | −31.04 |
| 9 | | −5.0373 | ASP | 0.670 | | | | |
| 10 | Lens 5 | −2.5198 | ASP | 0.516 | Plastic | 1.669 | 19.5 | −7.78 |
| 11 | | −5.2843 | ASP | 1.663 | | | | |
| 12 | Filter | Plano | | 0.300 | Glass | 1.517 | 64.2 | |
| 13 | | Plano | | 0.289 | | | | |
| 14 | RCS | Plano | | — | | | | |

Reference wavelength is 587.6 nm (d-line).

TABLE 5B

Aspheric Coefficients

| Surface # | 2 | 3 | 4 | 5 | 6 |
|---|---|---|---|---|---|
| k= | 1.31234E+01 | 7.26595E+00 | −3.08310E+00 | −1.79628E+00 | 1.39896E−01 |
| A4= | −4.00108E−03 | −2.03836E−03 | 2.11704E−03 | 3.00515E−04 | −4.72810E−03 |
| A6= | −4.68775E−04 | −1.06095E−03 | −1.62125E−03 | −2.81056E−04 | 1.75765E−04 |
| A8= | 3.49105E−05 | 7.87169E−05 | 1.38163E−04 | 2.36821E−05 | −9.49749E−06 |
| A10= | −4.59017E−06 | −1.93471E−06 | −2.97094E−06 | −8.17131E−07 | 2.10151E−07 |
| A12= | −2.87173E−07 | 1.29734E−08 | 1.36668E−08 | 6.41053E−09 | 1.82409E−10 |

| Surface # | 7 | 8 | 9 | 10 | 11 |
|---|---|---|---|---|---|
| k= | −4.62433E+00 | −9.18720E−01 | 9.96869E−01 | −6.84014E+00 | −5.00000E+01 |
| A4= | −9.43991E−04 | 5.45639E−03 | 2.80957E−03 | 5.32989E−03 | 2.06724E−02 |
| A6= | 9.30241E−05 | −1.13618E−04 | 6.54880E−04 | −2.16758E−04 | −2.30735E−03 |
| A8= | −8.70601E−06 | −6.30125E−07 | −1.23152E−05 | −1.19281E−05 | 1.07369E−04 |
| A10= | 4.92755E−07 | 6.04374E−07 | −2.83712E−06 | 1.08356E−06 | 8.83897E−06 |
| A12= | −5.77288E−10 | −1.65731E−08 | 3.49715E−07 | 8.59463E−08 | −1.89531E−06 |
| A14= | | −2.55772E−10 | −5.11216E−11 | −3.44143E−10 | 9.66649E−08 |
| A16= | | | | −1.69568E−10 | −8.50450E−11 |

In the 5th embodiment, the equation of the aspheric surface is the same as 1st embodiment. Further, the definition of the parameters of the following table is the same as 1st embodiment, and will not be defined again.

Moreover, in the following Table 5C, these parameters can be calculated from Table 5A and Table 5B as the following values and satisfy the following conditions:

TABLE 5C

5th Embodiment

| | | | |
|---|---|---|---|
| f [mm] | 6.26 | T12/(T23 + T34 + T45) | 0.61 |
| Fno | 1.30 | TD/ΣCT | 1.21 |
| HFOV [degrees] | 26.4 | (R3 + R4)/(R3 − R4) | −4.31 |
| Nmax | 1.744 | ([f/f1] + \|f/f2\|)/\|f/f3\| | 0.59 |
| V5 | 19.5 | Y11/Y52 | 0.84 |
| Vdmin | 18.4 | SL/TL | 1.00 |
| CT1/CT3 | 0.75 | TD [mm] | 10.17 |
| CT2/T12 | 2.77 | Ds/ImgH | 1.61 |
| CT2/CT4 | 1.78 | Ds/TD | 0.47 |
| T12/ATmax | 0.98 | CRAmax | 20.39 |
| CT3/CT5 | 5.62 | Yc3/f | 0.48 |
| CT3/BL | 1.29 | Yc4/f | 0.30 |
| CT3/CTmin | 5.62 | Yc5/f | 0.10 |

Further, the aforementioned Table 5C of the 5th embodiment, a vertical distance between the inflection point closest to an optical axis on one of the m-side or r-side surfaces of the third lens element E3 and the optical axis is Yc3, a vertical distance between the inflection point closest to the optical axis on one of the m-side or r-side surfaces of the fourth lens element E4 and the optical axis is Yc4, and a vertical distance between the inflection point closest to the optical axis on one of the m-side or r-side surfaces of the fifth lens element E5 and the optical axis is Yc5.

Furthermore, please refer to the following Table 5D, in the optical lens assembly 5 according to the 5th embodiment, when a vertical distance between the inflection point closest to the optical axis on each of m-side or r-side surfaces of the first lens element E1 to the fifth lens element E5 and the optical axis is Yc, and the focal length of the optical lens assembly 5 is f, the following conditions are satisfied:

TABLE 5D

| Yc/f | | | | | |
|---|---|---|---|---|---|
| | First lens element | Second lens element | Third lens element | Fourth lens element | Fifth lens element |
| M-side surface | 0.19 | 0.46 | — | 0.37 | 0.21 |
| R-side surface | — | — | 0.48 | 0.30 | 0.10 |

Figure 19:
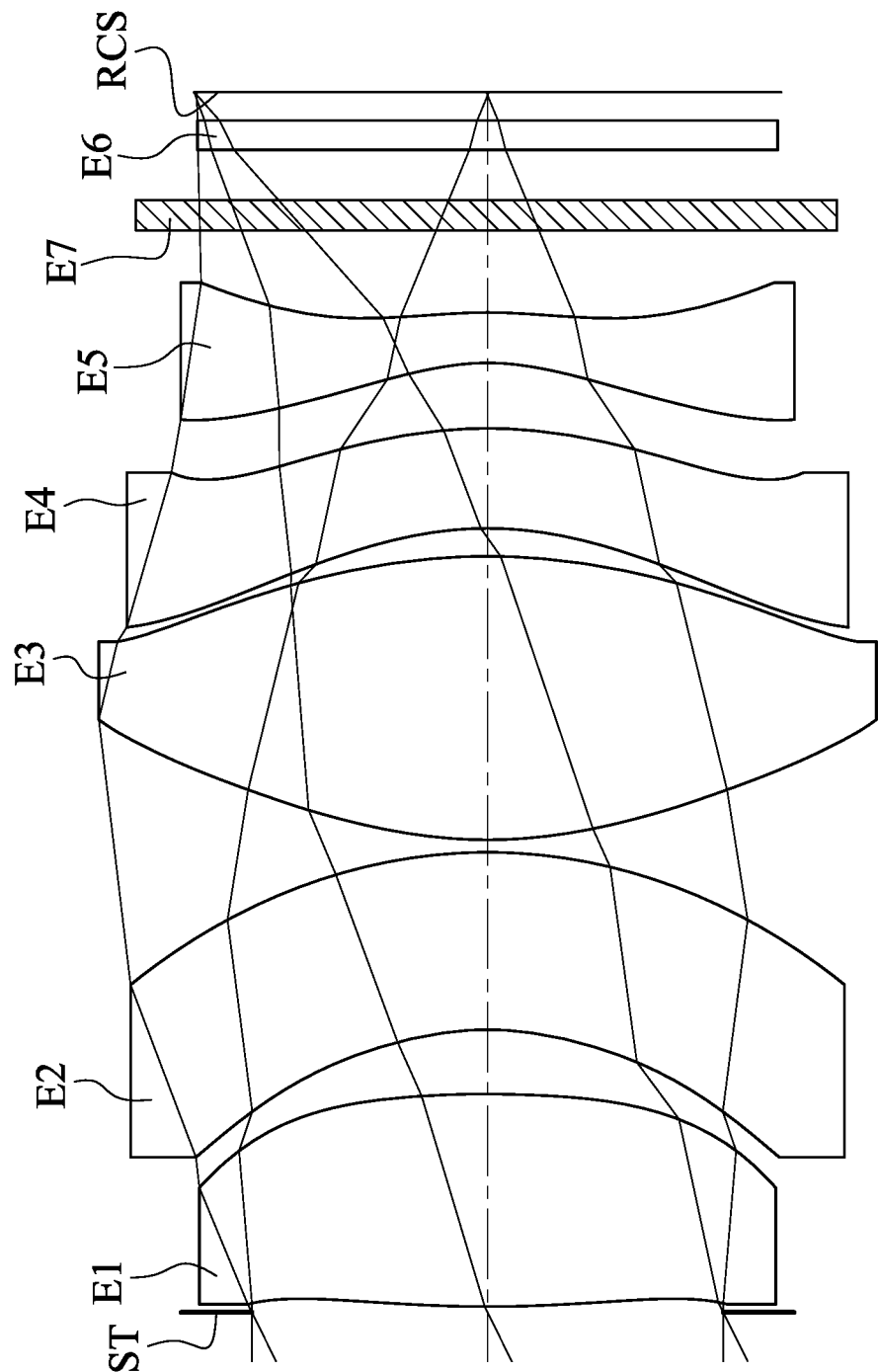
FIG. 19 is a schematic view of an optical lens assembly with a meta lens element according to the 5th embodiment.

FIG. 19 is a schematic view of the optical lens assembly 5 with a meta lens element E7 according to the 5th embodiment. In FIG. 19, when optical lens assembly 5 applied on a projection lens assembly, the optical lens assembly 5 can further include an element included a meta surface. In detail, the optical lens assembly 5 further includes the meta lens element E7 disposed between the fifth lens element E5 and the filter E6.

6th Embodiment

Figure 11:
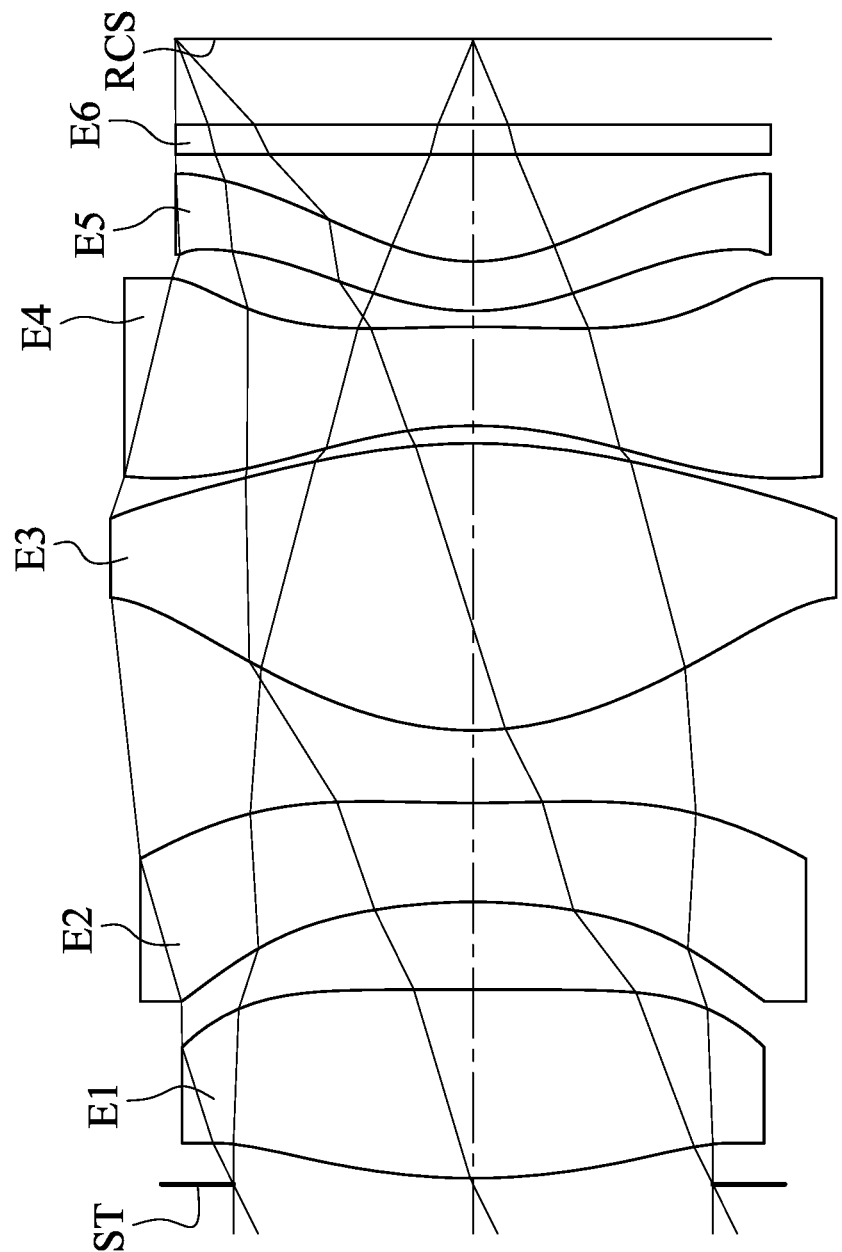
FIG. 11 is a schematic view of an optical lens assembly according to the 6th embodiment of the present disclosure.

FIG. 11 is a schematic view of an optical lens assembly 6 according to the 6th embodiment of the present disclosure.

Figure 12:
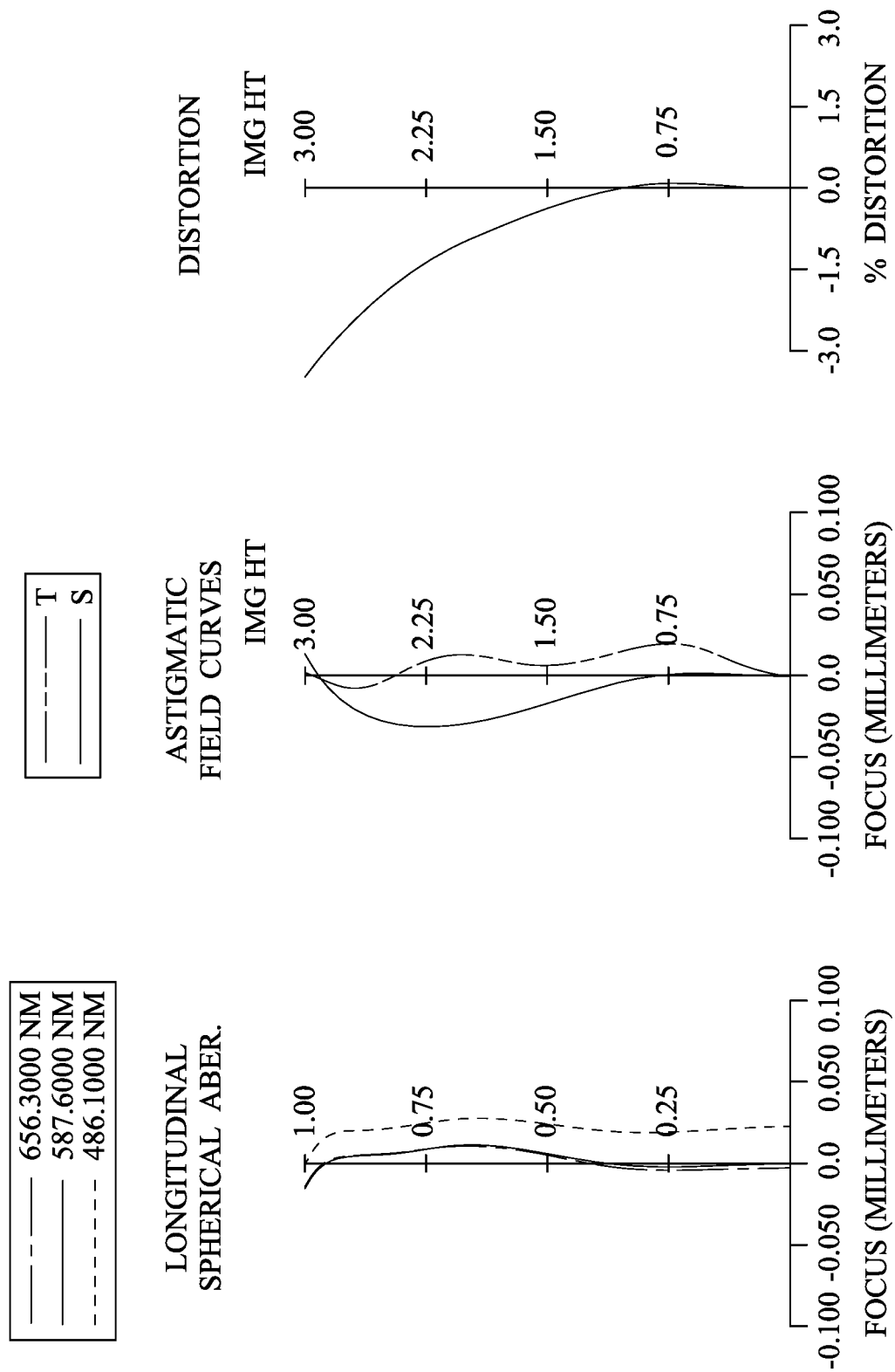
FIG. 12 shows spherical aberration curves, astigmatic field curves and a distortion curve of the optical lens assembly according to the 6th embodiment.

FIG. 12 shows spherical aberration curves, astigmatic field curves and a distortion curve of the optical lens assembly 6 according to the 6th embodiment. In FIG. 11, the optical lens assembly 6 includes, in order from a magnification side to a reduction side, an aperture stop ST, a first lens element E1, a second lens element E2, a third lens element E3, a fourth lens element E4, a fifth lens element E5, a filter E6 and an r-side conjugate surface RCS. The optical lens assembly 6 includes five lens elements (E1, E2, E3, E4, E5) without additional one or more lens elements inserted between the first lens element E1 and the fifth lens element E5.

The first lens element E1 with positive refractive power has an m-side surface being convex in a paraxial region thereof and an r-side surface being convex in a paraxial region thereof. The first lens element E1 is made of plastic material, and has the m-side surface and the r-side surface being both aspheric. Further, the m-side surface of the first lens element E1 includes an inflection point.

The second lens element E2 with negative refractive power has an m-side surface being concave in a paraxial region thereof and an r-side surface being concave in a paraxial region thereof. The second lens element E2 is made of plastic material, and has the m-side surface and the r-side surface being both aspheric. Further, the m-side surface of the second lens element E2 includes an inflection point, and the r-side surface of the second lens element E2 includes an inflection point.

The third lens element E3 with positive refractive power has an m-side surface being convex in a paraxial region thereof and an r-side surface being convex in a paraxial region thereof. The third lens element E3 is made of glass material, and has the m-side surface and the r-side surface being both aspheric. Further, the m-side surface of the third lens element E3 includes an inflection point.

The fourth lens element E4 with negative refractive power has an m-side surface being concave in a paraxial region thereof and an r-side surface being convex in a paraxial region thereof. The fourth lens element E4 is made of plastic material, and has the m-side surface and the r-side surface being both aspheric. Further, the m-side surface of the fourth lens element E4 includes an inflection point, and the r-side surface of the fourth lens element E4 includes two inflection points.

The fifth lens element E5 with negative refractive power has an m-side surface being convex in a paraxial region thereof and an r-side surface being concave in a paraxial region thereof. The fifth lens element E5 is made of plastic material, and has the m-side surface and the r-side surface being both aspheric. Further, the m-side surface of the fifth lens element E5 includes an inflection point, and the r-side surface of the fifth lens element E5 includes an inflection point.

The filter E6 is made of glass material, which is located between the fifth lens element E5 and the r-side conjugate surface RCS, and will not affect the focal length of the optical lens assembly 6.

The detailed optical data of the 6th embodiment are shown in Table 6A and the aspheric surface data are shown in Table 6B below.

TABLE 6A

6th Embodiment
f = 6.26 mm, Fno= 1.29, HFOV = 26.4 deg.

| Surface # | | Curvature Radius | | Thickness | Material | Index | Abbe # | Focal Length |
|---|---|---|---|---|---|---|---|---|
| 0 | m-side surface | Plano | | Infinity | | | | |
| 1 | Ape. Stop | Plano | | 0.060 | | | | |
| 2 | Lens 1 | 6.5970 | ASP | 1.907 | Plastic | 1.544 | 56.0 | 12.03 |
| 3 | | −750.5494 | ASP | 0.885 | | | | |
| 4 | Lens 2 | −6.4200 | ASP | 1.000 | Plastic | 1.686 | 18.4 | −6.96 |
| 5 | | 19.8037 | ASP | 0.734 | | | | |
| 6 | Lens 3 | 3.2426 | ASP | 2.900 | Glass | 1.749 | 35.3 | 3.30 |
| 7 | | −6.4371 | ASP | 0.179 | | | | |
| 8 | Lens 4 | −4.1508 | ASP | 1.000 | Plastic | 1.660 | 20.4 | −9.10 |
| 9 | | −14.7125 | ASP | 0.160 | | | | |
| 10 | Lens 5 | 2.5120 | ASP | 0.500 | Plastic | 1.669 | 19.5 | −18.65 |
| 11 | | 1.9242 | ASP | 1.081 | | | | |
| 12 | Filter | Plano | | 0.300 | Glass | 1.517 | 64.2 | |
| 13 | | Plano | | 0.865 | | | | |
| 14 | RCS | Plano | | — | | | | |

Reference wavelength is 587.6 nm (d-line).

TABLE 6B

Aspheric Coefficients

| Surface # | 2 | 3 | 4 | 5 | 6 |
|---|---|---|---|---|---|
| k= | −1.69253E−01 | 5.00000E+01 | 2.71094E+00 | −5.00000E+01 | −1.24186E+00 |
| A4= | −1.06754E−03 | −1.32288E−03 | 1.86457E−03 | −9.57405E−03 | −4.10814E−03 |
| A6= | −4.36797E−04 | −1.04006E−03 | −1.64227E−03 | −1.18487E−05 | 4.71417E−04 |
| A8= | 5.70612E−05 | 3.19481E−05 | 1.62237E−04 | 5.56281E−05 | −4.21615E−05 |
| A10= | −7.85024E−06 | 2.77702E−07 | −1.49870E−06 | −2.46946E−06 | 8.73443E−07 |

| Surface # | 7 | 8 | 9 | 10 | 11 |
|---|---|---|---|---|---|
| k= | 6.70711E−01 | −2.23337E+00 | −5.00000E+01 | −4.33346E+00 | −2.82128E+00 |
| A4= | 3.02751E−03 | 5.40555E−03 | 1.58131E−02 | 1.43772E−03 | −6.73011E−03 |
| A6= | 7.23411E−05 | 2.13830E−05 | −1.05172E−03 | −2.19188E−03 | 2.28703E−04 |
| A8= | −9.93011E−06 | −6.36626E−06 | 1.19537E−04 | 3.37608E−04 | −1.29455E−04 |
| A10= | 1.94701E−07 | 2.76617E−07 | −1.02063E−05 | −5.61021E−05 | 1.64825E−05 |
| A12= | | −1.47444E−08 | 2.24703E−08 | 7.67677E−06 | 3.53695E−07 |
| A14= | | | | −4.20288E−07 | −9.49997E−08 |

In the 6th embodiment, the equation of the aspheric surface is the same as 1st embodiment. Further, the definition of the parameters of the following table is the same as 1st embodiment, and will not be defined again.

Moreover, in the following Table 6C, these parameters can be calculated from Table 6A and Table 6B as the following values and satisfy the following conditions:

TABLE 6C

6th Embodiment

| f [mm] | 6.26 | T12/(T23 + T34 + T45) | 0.82 |
|---|---|---|---|
| Fno | 1.29 | TD/ΣCT | 1.27 |
| HFOV [degrees] | 26.4 | (R3 + R4)/(R3 − R4) | −0.51 |
| Nmax | 1.749 | (\|f/f1\| + \|f/f2\|)/\|f/f3\| | 0.75 |
| V5 | 19.5 | Y11/Y52 | 0.87 |
| Vdmin | 18.4 | SL/TL | 1.01 |
| CT1/CT3 | 0.66 | TD [mm] | 9.27 |
| CT2/T12 | 1.13 | Ds/ImgH | 1.61 |
| CT2/CT4 | 1.00 | Ds/TD | 0.52 |
| T12/ATmax | 1.00 | CRAmax | 20.59 |
| CT3/CT5 | 5.80 | Yc3/f | 0.41 |

TABLE 6C-continued

6th Embodiment

| CT3/BL | 1.29 | Yc4/f | 0.09 |
|---|---|---|---|
| CT3/CTmin | 5.80 | Yc5/f | 0.23 |

Further, the aforementioned Table 6C of the 6th embodiment, a vertical distance between the inflection point closest to an optical axis on one of the m-side or r-side surfaces of the third lens element E3 and the optical axis is Yc3, a vertical distance between the inflection point closest to the optical axis on one of the m-side or r-side surfaces of the fourth lens element E4 and the optical axis is Yc4, and a vertical distance between the inflection point closest to the optical axis on one of the m-side or r-side surfaces of the fifth lens element E5 and the optical axis is Yc5.

Furthermore, please refer to the following Table 6D, in the optical lens assembly 6 according to the 6th embodiment, when a vertical distance between the inflection point closest to the optical axis on each of m-side or r-side surfaces of the first lens element E1 to the fifth lens element E5 and the optical axis is Yc, and the focal length of the optical lens assembly 6 is f, the following conditions are satisfied:

TABLE 6D

| | Yc/f | | | | |
|---|---|---|---|---|---|
| | First lens element | Second lens element | Third lens element | Fourth lens element | Fifth lens element |
| M-side surface | 0.30 | 0.44 | 0.41 | 0.27 | 0.23 |
| R-side surface | — | 0.10 | — | 0.09 | 0.23 |

7th Embodiment

Figure 13:
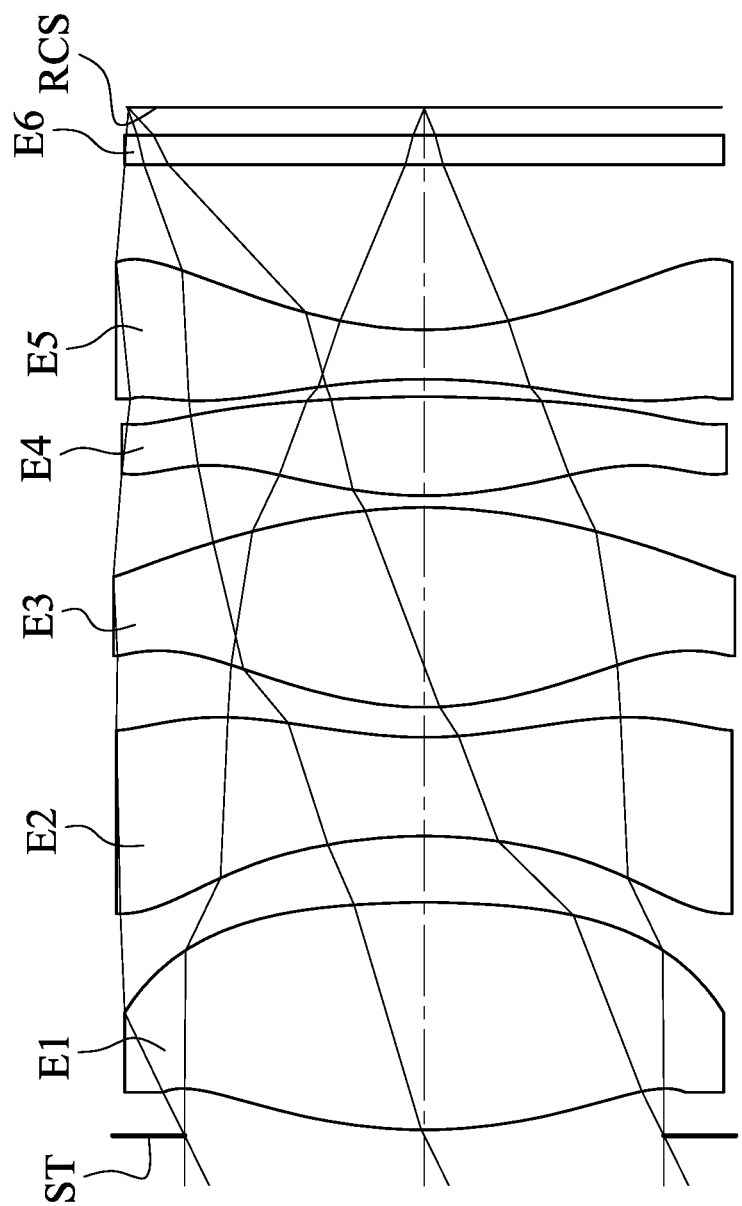
FIG. 13 is a schematic view of an optical lens assembly according to the 7th embodiment of the present disclosure.
Figure 14:
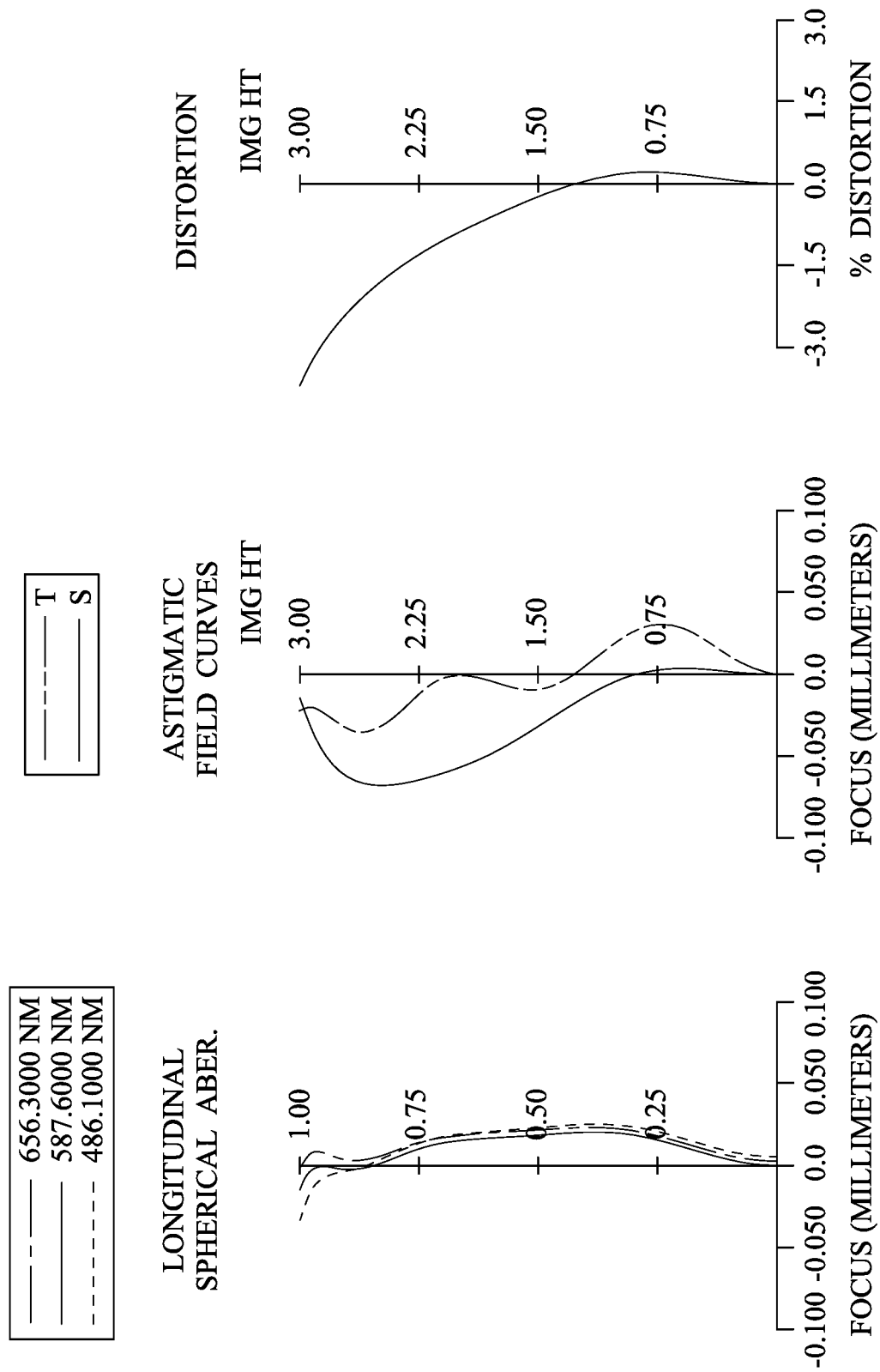
FIG. 14 shows spherical aberration curves, astigmatic field curves and a distortion curve of the optical lens assembly according to the 7th embodiment.

FIG. 13 is a schematic view of an optical lens assembly 7 according to the 7th embodiment of the present disclosure. FIG. 14 shows spherical aberration curves, astigmatic field curves and a distortion curve of the optical lens assembly 7 according to the 7th embodiment. In FIG. 13, the optical lens assembly 7 includes, in order from a magnification side to a reduction side, an aperture stop ST, a first lens element E1, a second lens element E2, a third lens element E3, a fourth lens element E4, a fifth lens element E5, a filter E6 and an r-side conjugate surface RCS. The optical lens assembly 7 includes five lens elements (E1 E2, E3, E4, E5) without additional one or more lens elements inserted between the first lens element E1 and the fifth lens element E5.

The first lens element E1 with positive refractive power has an m-side surface being convex in a paraxial region thereof and an r-side surface being convex in a paraxial region thereof. The first lens element E1 is made of plastic material, and has the m-side surface and the r-side surface being both aspheric. Further, the m-side surface of the first lens element E1 includes an inflection point.

The second lens element E2 with negative refractive power has an m-side surface being concave in a paraxial region thereof and an r-side surface being concave in a paraxial region thereof. The second lens element E2 is made of plastic material, and has the m-side surface and the r-side surface being both aspheric. Further, the m-side surface of the second lens element E2 includes an inflection point, and the r-side surface of the second lens element E2 includes two inflection points.

The third lens element E3 with positive refractive power has an m-side surface being convex in a paraxial region thereof and an r-side surface being convex in a paraxial region thereof. The third lens element E3 is made of plastic material, and has the m-side surface and the r-side surface being both aspheric. Further, the m-side surface of the third lens element E3 includes two inflection points, and the r-side surface of the third lens element E3 includes an inflection point.

The fourth lens element E4 with positive refractive power has an m-side surface being convex in a paraxial region thereof and an r-side surface being convex in a paraxial region thereof. The fourth lens element E4 is made of plastic material, and has the m-side surface and the r-side surface being both aspheric. Further, the m-side surface of the fourth lens element E4 includes two inflection points, and the r-side surface of the fourth lens element E4 includes an inflection point.

The fifth lens element E5 with negative refractive power has an m-side surface being concave in a paraxial region thereof and an r-side surface being concave in a paraxial region thereof. The fifth lens element E5 is made of plastic material, and has the m-side surface and the r-side surface being both aspheric. Further, the m-side surface of the fifth lens element E5 includes two inflection points, and the r-side surface of the fifth lens element E5 includes an inflection point.

The filter E6 is made of glass material, which is located between the fifth lens element E5 and the r-side conjugate surface RCS, and will not affect the focal length of the optical lens assembly 7.

The detailed optical data of the 7th embodiment are shown in Table 7A and the aspheric surface data are shown in Table 7B below.

TABLE 7A

7th Embodiment
f = 6.26 mm, Fno = 1.29, HFOV = 26.4 deg.

| Surface # | | Curvature Radius | | Thickness | Material | Index | Abbe # | Focal Length |
|---|---|---|---|---|---|---|---|---|
| 0 | m-side surface | Plano | | Infinity | | | | |
| 1 | Ape. Stop | Plano | | 0.060 | | | | |
| 2 | Lens 1 | 5.3010 | ASP | 2.300 | Plastic | 1.544 | 56.0 | 6.57 |
| 3 | | −9.3053 | ASP | 0.667 | | | | |
| 4 | Lens 2 | −5.6068 | ASP | 1.000 | Plastic | 1.686 | 18.4 | −3.64 |
| 5 | | 4.8222 | ASP | 0.304 | | | | |
| 6 | Lens 3 | 3.5862 | ASP | 2.018 | Plastic | 1.614 | 26.0 | 3.89 |
| 7 | | −5.6318 | ASP | 0.120 | | | | |
| 8 | Lens 4 | 4.3968 | ASP | 1.000 | Plastic | 1.660 | 20.4 | 5.38 |
| 9 | | −16.7045 | ASP | 0.176 | | | | |
| 10 | Lens 5 | −6.9429 | ASP | 0.500 | Plastic | 1.669 | 19.5 | −3.63 |
| 11 | | 3.8485 | ASP | 1.668 | | | | |
| 12 | Filter | Plano | | 0.300 | Glass | 1.517 | 64.2 | |
| 13 | | Plano | | 0.283 | | | | |
| 14 | RCS | Plano | | — | | | | |

Reference wavelength is 587.6 nm (d-line).

TABLE 7B

| Aspheric Coefficients | | | | | |
|---|---|---|---|---|---|
| Surface # | 2 | 3 | 4 | 5 | 6 |
| k= | 1.61374E−01 | −2.37685E+01 | 8.45288E−01 | −1.00089E+01 | −1.34954E+00 |
| A4= | −2.18564E−03 | −2.25021E−03 | 2.22072E−03 | −6.46422E−03 | −7.44145E−03 |
| A6= | 1.92540E−04 | −1.26110E−03 | −1.69965E−03 | −3.39688E−04 | 7.04829E−04 |
| A8= | −2.16876E−04 | 5.84861E−05 | 2.34230E−04 | 1.77876E−05 | −1.04192E−04 |
| A10= | 3.77802E−05 | 5.44534E−06 | −2.85784E−06 | 1.83601E−06 | −3.19019E−06 |
| A12= | −3.52234E−06 | −6.40235E−07 | −1.72473E−07 | 1.31664E−07 | 4.50742E−07 |
| A14= | | | −9.87414E−09 | −8.87949E−09 | 1.47948E−08 |

| Surface # | 7 | 8 | 9 | 10 | 11 |
|---|---|---|---|---|---|
| k= | 3.03018E−01 | −1.22416E+01 | 7.30657E+00 | 4.16272E+00 | −6.62515E+00 |
| A4= | 4.06662E−03 | 8.53814E−03 | 4.90880E−04 | 4.50115E−03 | 6.03839E−03 |
| A6= | −5.30715E−05 | −2.72643E−03 | −8.48201E−05 | 6.64432E−04 | −1.39423E−03 |
| A8= | −2.17525E−05 | −1.38094E−05 | −5.23069E−05 | 5.04082E−05 | 1.11477E−04 |
| A10= | 6.91647E−07 | 1.52897E−05 | 2.57468E−06 | −2.59199E−06 | 7.17519E−06 |
| A12= | 2.34415E−08 | 1.26152E−06 | 7.68682E−07 | −5.23748E−07 | −1.92828E−06 |
| A14= | 6.97852E−09 | −1.16087E−07 | −3.80773E−08 | −1.79023E−08 | 7.98211E−08 |
| A16= | | | | 4.83260E−09 | −6.89073E−10 |

In the 7th embodiment, the equation of the aspheric surface is the same as 1st embodiment. Further, the definition of the parameters of the following table is the same as 1st embodiment, and will not be defined again.

Moreover, in the following Table 7C, these parameters can be calculated from Table 7A and Table 7B as the following values and satisfy the following conditions:

TABLE 7C

| 7th Embodiment | | | |
|---|---|---|---|
| f [mm] | 6.26 | T12/(T23 + T34 + T45) | 1.11 |
| Fno | 1.29 | TD/ΣCT | 1.19 |
| HFOV [degrees] | 26.4 | (R3 + R4)/(R3 − R4) | 0.08 |
| Nmax | 1.686 | (|f/f1| + |f/f2|)/|f/f3| | 1.66 |
| V5 | 19.5 | Y11/Y52 | 0.85 |
| Vdmin | 18.4 | SL/TL | 1.01 |
| CT1/CT3 | 1.14 | TD [mm] | 8.08 |
| CT2/T12 | 1.50 | Ds/ImgH | 1.61 |
| CT2/CT4 | 1.00 | Ds/TD | 0.60 |
| T12/ATmax | 1.00 | CRAmax | 19.96 |
| CT3/CT5 | 4.04 | Yc3/f | 0.28 |
| CT3/BL | 0.90 | Yc4/f | 0.22 |
| CT3/CTmin | 4.04 | Yc5/f | 0.23 |

Further, the aforementioned Table 7C of the 7th embodiment, a vertical distance between the inflection point closest to an optical axis on one of the m-side or r-side surfaces of the third lens element E3 and the optical axis is Yc3, a vertical distance between the inflection point closest to the optical axis on one of the m-side or r-side surfaces of the fourth lens element E4 and the optical axis is Yc4, and a vertical distance between the inflection point closest to the optical axis on one of the m-side or r-side surfaces of the fifth lens element E5 and the optical axis is Yc5.

Furthermore, please refer to the following Table 7D, in the optical lens assembly 7 according to the 7th embodiment, when a vertical distance between the inflection point closest to the optical axis on each of m-side or r-side surfaces of the first lens element E1 to the fifth lens element E5 and the optical axis is Yc, and the focal length of the optical lens assembly 7 is f, the following conditions are satisfied:

TABLE 7D

| | Yc/f | | | | |
|---|---|---|---|---|---|
| | First lens element | Second lens element | Third lens element | Fourth lens element | Fifth lens element |
| M-side surface | 0.29 | 0.37 | 0.28 | 0.22 | 0.23 |
| R-side surface | — | 0.18 | 0.45 | 0.39 | 0.35 |

8th Embodiment

Figure 15:
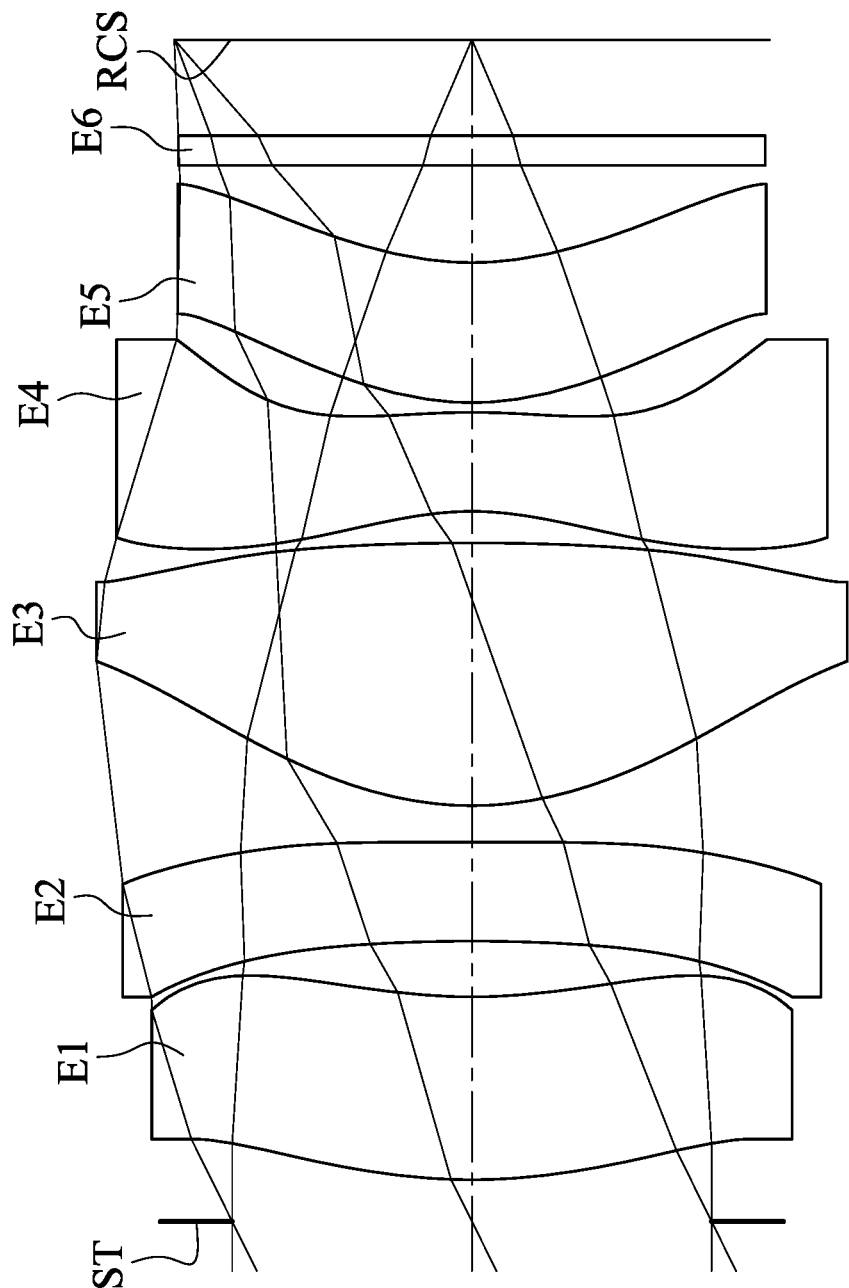
FIG. 15 is a schematic view of an optical lens assembly according to the 8th embodiment of the present disclosure.
Figure 16:
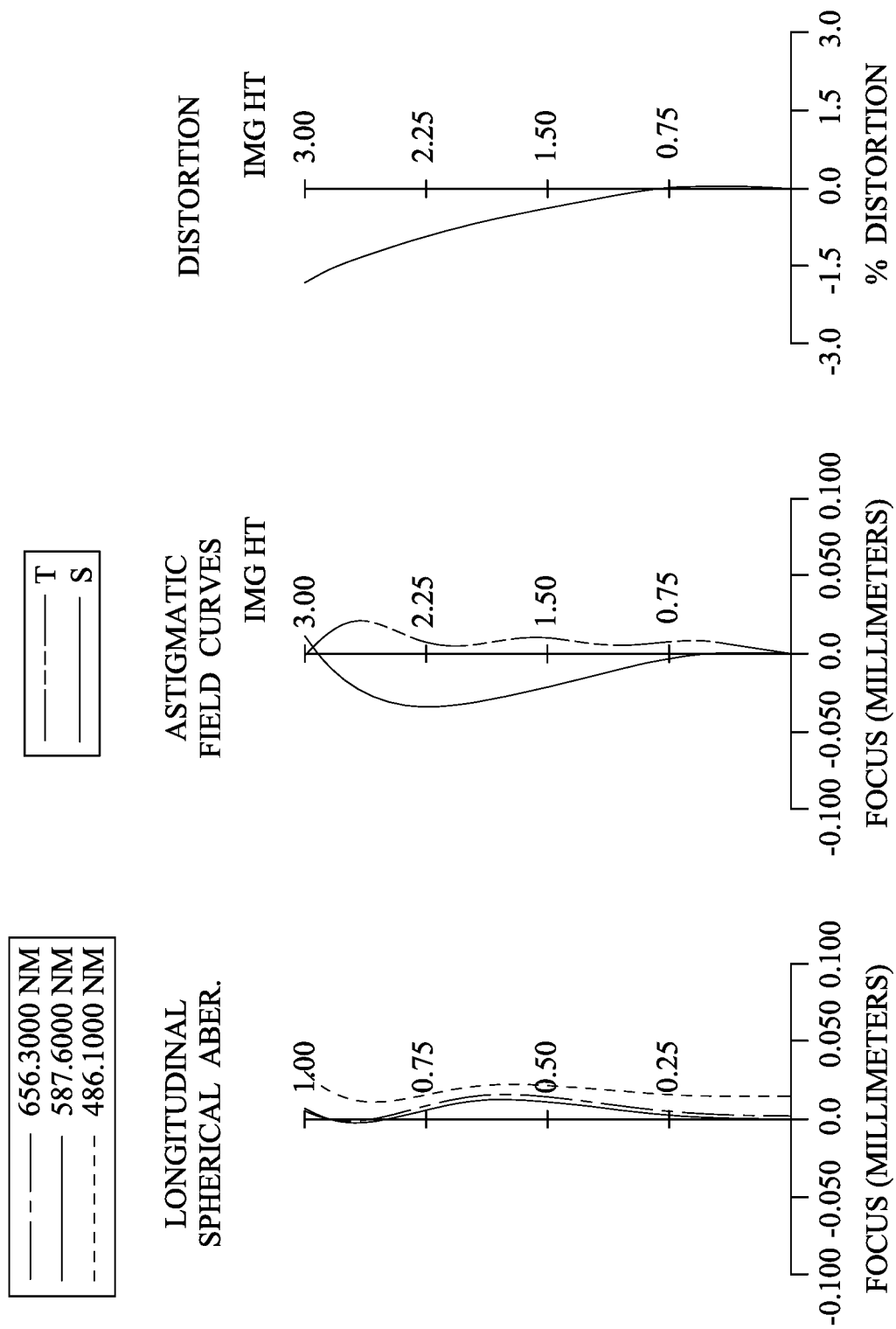
FIG. 16 shows spherical aberration curves, astigmatic field curves and a distortion curve of the optical lens assembly according to the 8th embodiment.

FIG. 15 is a schematic view of an optical lens assembly 8 according to the 8th embodiment of the present disclosure. FIG. 16 shows spherical aberration curves, astigmatic field curves and a distortion curve of the optical lens assembly 8 according to the 8th embodiment. In FIG. 15, the optical lens assembly 8 includes, in order from a magnification side to a reduction side, an aperture stop ST, a first lens element E1, a second lens element E2, a third lens element E3, a fourth lens element E4, a fifth lens element E5, a filter E6 and an r-side conjugate surface RCS. The optical lens assembly 8 includes five lens elements (E1, E2, E3, E4, E5) without additional one or more lens elements inserted between the first lens element E1 and the fifth lens element E5.

The first lens element E1 with positive refractive power has an m-side surface being convex in a paraxial region thereof and an r-side surface being concave in a paraxial region thereof. The first lens element E1 is made of plastic material, and has the m-side surface and the r-side surface being both aspheric. Further, the m-side surface of the first lens element E1 includes an inflection point, and the r-side surface of the first lens element E1 includes an inflection point.

The second lens element E2 with negative refractive power has an m-side surface being concave in a paraxial region thereof and an r-side surface being concave in a paraxial region thereof. The second lens element E2 is made of plastic material, and has the m-side surface and the r-side surface being both aspheric. Further, the r-side surface of the second lens element E2 includes an inflection point.

The third lens element E3 with positive refractive power has an m-side surface being convex in a paraxial region thereof and an r-side surface being convex in a paraxial region thereof. The third lens element E3 is made of glass material, and has the m-side surface and the r-side surface being both aspheric. Further, the m-side surface of the third lens element E3 includes an inflection point, and the r-side surface of the third lens element E3 includes an inflection point.

The fourth lens element E4 with negative refractive power has an m-side surface being concave in a paraxial region thereof and an r-side surface being convex in a paraxial region thereof. The fourth lens element E4 is made of plastic material, and has the m-side surface and the r-side surface being both aspheric. Further, the m-side surface of the fourth lens element E4 includes an inflection point, and the r-side surface of the fourth lens element E4 includes two inflection points.

The fifth lens element E5 with positive refractive power has an m-side surface being convex in a paraxial region thereof and an r-side surface being concave in a paraxial region thereof. The fifth lens element E5 is made of glass material, and has the m-side surface and the r-side surface being both aspheric. Further, the m-side surface of the fifth lens element E5 includes an inflection point, and the r-side surface of the fifth lens element E5 includes an inflection point.

The filter E6 is made of glass material, which is located between the fifth lens element E5 and the r-side conjugate surface RCS, and will not affect the focal length of the optical lens assembly 8.

The detailed optical data of the 8th embodiment are shown in Table 8A and the aspheric surface data are shown in Table 8B below.

TABLE 8A

8th Embodiment
f= 6.17 mm, Fno = 1.27, HFOV = 26.4 deg.

| Surface # | | Curvature Radius | | Thickness | Material | Index | Abbe # | Focal Length |
|---|---|---|---|---|---|---|---|---|
| 0 | m-side surface | Plano | | Infinity | | | | |
| 1 | Ape. Stop | Plano | | 0.422 | | | | |
| 2 | Lens 1 | 6.0900 | ASP | 1.848 | Plastic | 1.544 | 56.0 | 108.96 |
| 3 | | 6.0615 | ASP | 0.562 | | | | |
| 4 | Lens 2 | −19.1883 | ASP | 1.000 | Plastic | 1.713 | 12.4 | −24.39 |
| 5 | | 189.7410 | ASP | 0.370 | | | | |
| 6 | Lens 3 | 3.4232 | ASP | 2.655 | Glass | 1.744 | 44.8 | 4.28 |
| 7 | | −30.5389 | ASP | 0.319 | | | | |
| 8 | Lens 4 | −3.1216 | ASP | 1.000 | Plastic | 1.660 | 20.4 | −8.79 |
| 9 | | −7.6231 | ASP | 0.100 | | | | |
| 10 | Lens 5 | 3.0609 | ASP | 1.415 | Glass | 1.731 | 40.5 | 16.77 |
| 11 | | 3.2837 | ASP | 0.982 | | | | |
| 12 | Filter | Plano | | 0.300 | Glass | 1.517 | 64.2 | |
| 13 | | Plano | | 0.967 | | | | |
| 14 | RCS | Plano | | — | | | | |

Reference wavelength is 587.6 nm (d-line).

TABLE 8B

Aspheric Coefficients

| Surface # | 2 | 3 | 4 | 5 | 6 |
|---|---|---|---|---|---|
| k= | −1.77885E+00 | −1.21810E+01 | 2.26421E+01 | 5.00000E+01 | −1.03977E+00 |
| A4= | −2.34823E−03 | −1.61695E−03 | −5.18382E−04 | −4.10634E−03 | −3.40438E−03 |
| A6= | −6.02322E−05 | −6.50826E−04 | −5.87335E−04 | −2.67111E−04 | 2.93929E−04 |
| A8= | 3.34579E−06 | 4.53027E−05 | 8.79557E−05 | 7.69259E−05 | −3.21158E−05 |
| A10= | −1.12198E−06 | −3.67063E−06 | −5.34013E−06 | −5.06885E−06 | 8.79355E−07 |
| A12= | −6.48710E−08 | 1.05090E−07 | 9.67999E−08 | 9.70349E−08 | 5.35176E−09 |

| Surface# | 7 | 8 | 9 | 10 | 11 |
|---|---|---|---|---|---|
| k= | 4.85149E+01 | −7.55336E+00 | −5.00000E+01 | −6.73154E−01 | −4.11304E+00 |
| A4= | −2.11082E−03 | 8.63389E−03 | 1.70535E−02 | −9.39669E−03 | 2.84384E−04 |
| A6= | 1.80902E−04 | −4.52053E−04 | −1.73794E−04 | −2.27836E−04 | 1.76798E−04 |
| A8= | −1.32922E−05 | −4.37924E−06 | 1.09058E−04 | 3.02270E−04 | −1.02890E−04 |
| A10= | 5.98695E−07 | 1.88939E−06 | −2.49983E−05 | −7.31518E−05 | 9.12046E−06 |
| A12= | 1.50965E−09 | −8.88243E−08 | 8.24004E−07 | 7.65641E−06 | −1.09219E−07 |
| A14= | | 2.20989E−09 | 2.51355E−08 | −3.17343E−07 | −2.19824E−08 |

In the 8th embodiment, the equation of the aspheric surface is the same as 1st embodiment. Further, the definition of the parameters of the following table is the same as 1st embodiment, and will not be defined again.

Moreover, in the following Table 8C these parameters can be calculated from Table 8A and Table 8B as the following values and satisfy the following conditions:

TABLE 8C

8th Embodiment

| | | | |
|---|---|---|---|
| f [mm] | 6.17 | T12/(T23 + T34 + T45) | 0.71 |
| Fno | 1.27 | TD/ΣCT | 1.17 |
| HFOV [degrees] | 26.4 | (R3 + R4)/(R3 − R4) | −0.82 |
| Nmax | 1.744 | (|f/f1| + |f/f2|)/|f/f3| | 0.21 |
| V5 | 40.5 | Y11/Y52 | 0.96 |
| Vdmin | 12.4 | SL/TL | 1.04 |
| CT1/CT3 | 0.70 | TD [mm] | 9.27 |
| CT2/T12 | 1.78 | Ds/ImgH | 1.61 |
| CT2/CT4 | 1.00 | Ds/TD | 0.52 |
| T12/ATmax | 1.00 | CRAmax | 20.58 |
| CT3/CT5 | 1.88 | Yc3/f | 0.43 |
| CT3/BL | 1.18 | Yc4/f | 0.10 |
| CT3/CTmin | 2.65 | Yc5/f | 0.33 |

Further, the aforementioned Table 8C of the 8th embodiment, a vertical distance between the inflection point closest to an optical axis on one of the m-side or r-side surfaces of the third lens element E3 and the optical axis is Yc3, a vertical distance between the inflection point closest to the optical axis on one of the m-side or r-side surfaces of the fourth lens element E4 and the optical axis is Yc4, and a vertical distance between the inflection point closest to the optical axis on one of the m-side or r-side surfaces of the fifth lens element E5 and the optical axis is Yc5.

Furthermore, please refer to the following Table 8D, in the optical lens assembly 8 according to the 8th embodiment, when a vertical distance between the inflection point closest to the optical axis on each of m-side or r-side surfaces of the first lens element E1 to the fifth lens element E5 and the optical axis is Yc, and the focal length of the optical lens assembly 8 is f, the following conditions are satisfied:

TABLE 8D

| Yc/f | | | | | |
|---|---|---|---|---|---|
| | First lens element | Second lens element | Third lens element | Fourth lens element | Fifth lens element |
| M-side surface | 0.31 | — | 0.43 | 0.19 | 0.35 |
| R-side surface | 0.22 | 0.05 | 0.51 | 0.10 | 0.33 |

9th Embodiment

Figure 17:
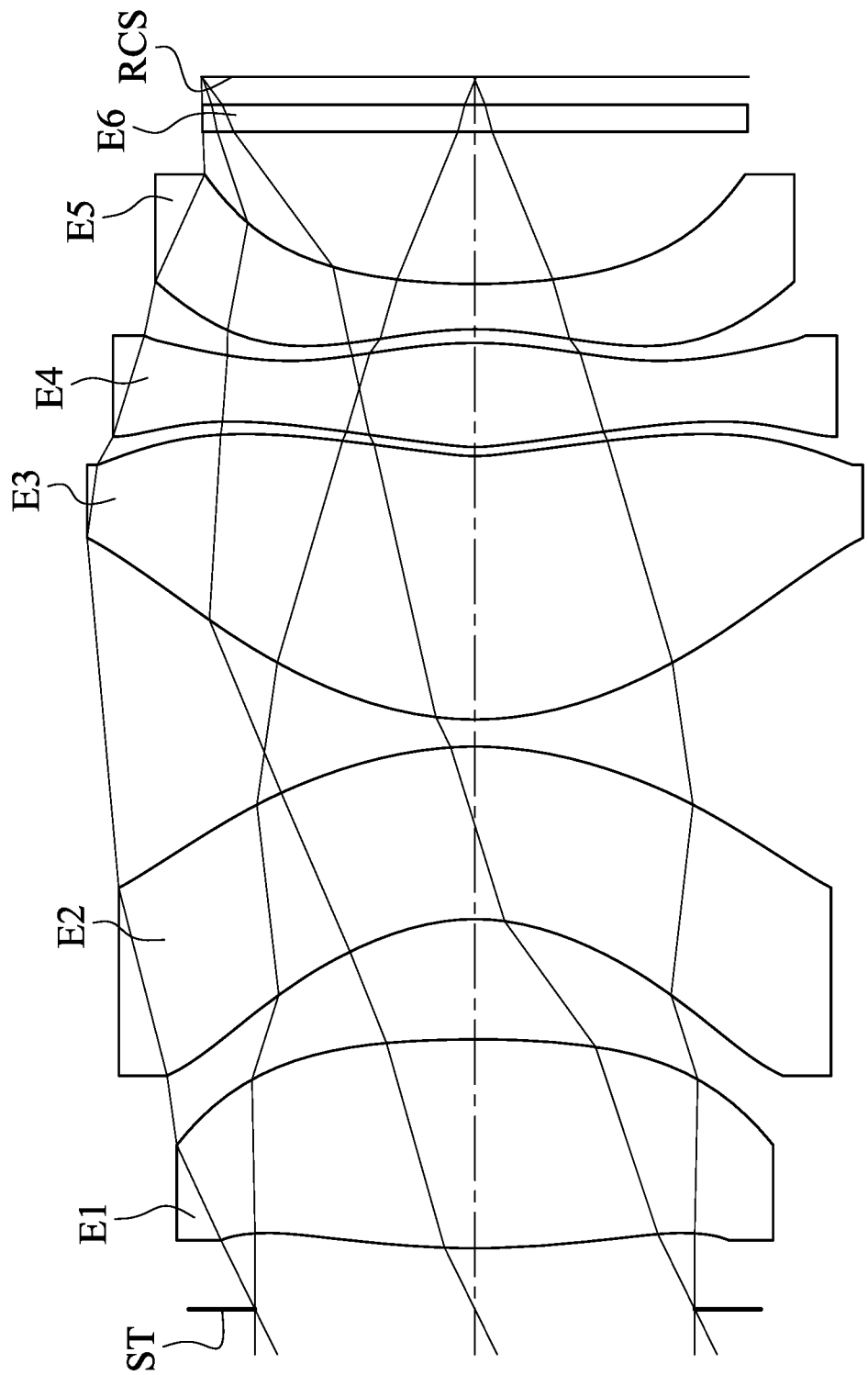
FIG. 17 is a schematic view of an optical lens assembly according to the 9th embodiment of the present disclosure.

FIG. 17 is a schematic view of an optical lens assembly 9 according to the 9th embodiment of the present disclosure.

Figure 18:
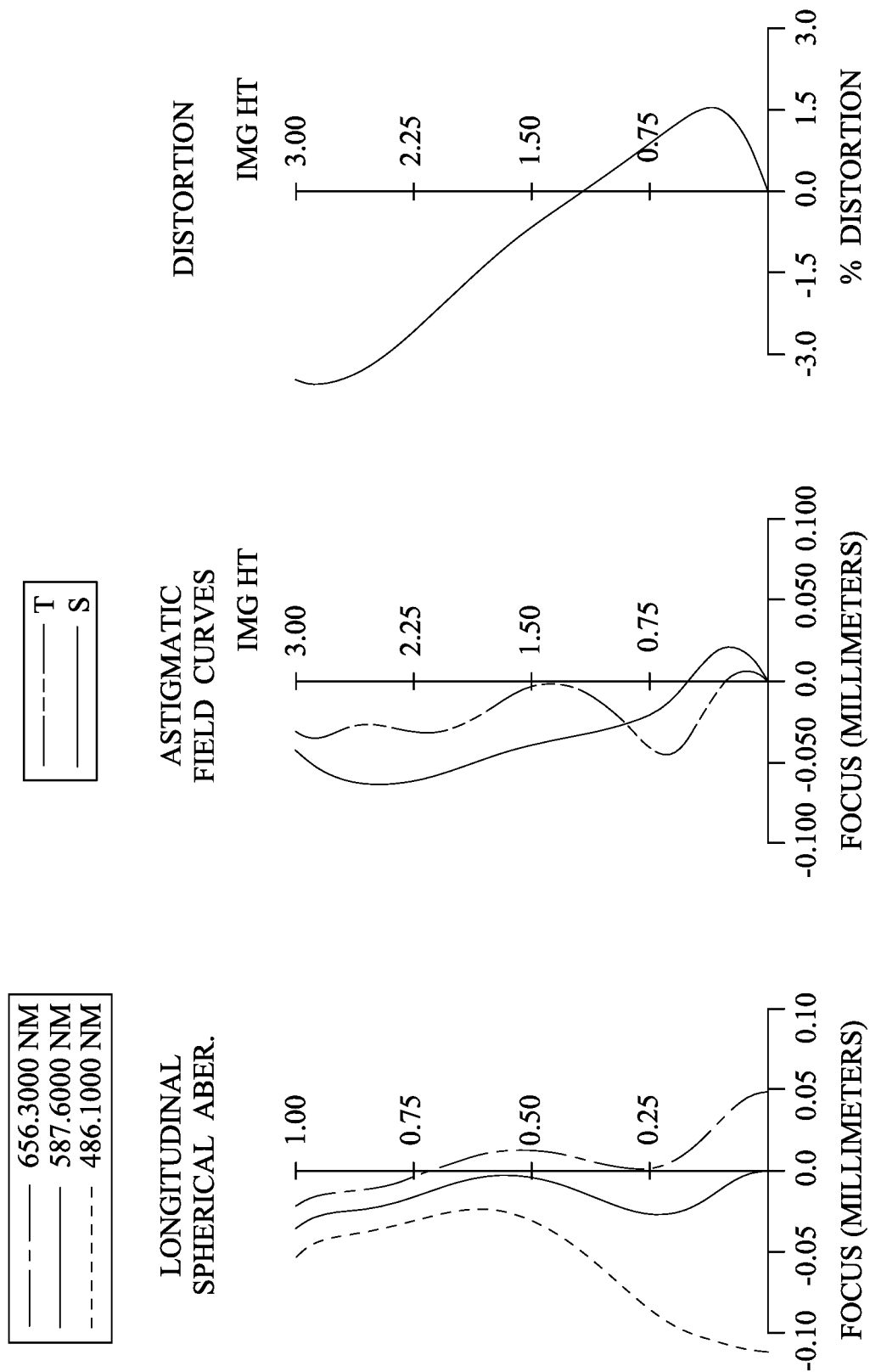
FIG. 18 shows spherical aberration curves, astigmatic field curves and a distortion curve of the optical lens assembly according to the 9th embodiment.

FIG. 18 shows spherical aberration curves, astigmatic field curves and a distortion curve of the optical lens assembly 9 according to the 9th embodiment. In FIG. 17, the optical lens assembly 9 includes, in order from a magnification side to a reduction side, an aperture stop ST, a first lens element E1, a second lens element E2, a third lens element E3, a fourth lens element E4, a fifth lens element E5, a filter E6 and an r-side conjugate surface RCS. The optical lens assembly 9 includes five lens elements (E1, E2, E3, E4, E5) without additional one or more lens elements inserted between the first lens element E1 and the fifth lens element E5.

The first lens element E1 with positive refractive power has an m-side surface being convex in a paraxial region thereof and an r-side surface being convex in a paraxial region thereof. The first lens element E1 is made of plastic material, and has the m-side surface and the r-side surface being both aspheric. Further, the m-side surface of the first lens element E1 includes an inflection point.

The second lens element E2 with negative refractive power has an m-side surface being concave in a paraxial region thereof and an r-side surface being convex in a paraxial region thereof. The second lens element E2 is made of plastic material, and has the m-side surface and the r-side surface being both aspheric. Further, the m-side surface of the second lens element E2 includes an inflection point, and the r-side surface of the second lens element E2 includes an inflection point.

The third lens element E3 with negative refractive power has an m-side surface being convex in a paraxial region thereof and an r-side surface being concave in a paraxial region thereof. The third lens element E3 is made of plastic material, and has the m-side surface and the r-side surface being both aspheric. Further, the m-side surface of the third lens element E3 includes an inflection point, and the r-side surface of the third lens element E3 includes two inflection points.

The fourth lens element E4 with positive refractive power has an m-side surface being convex in a paraxial region thereof and an r-side surface being convex in a paraxial region thereof. The fourth lens element E4 is made of plastic material, and has the m-side surface and the r-side surface being both aspheric. Further, the m-side surface of the fourth lens element E4 includes two inflection points, and the r-side surface of the fourth lens element E4 includes an inflection point.

The fifth lens element E5 with negative refractive power has an m-side surface being concave in a paraxial region thereof and an r-side surface being concave in a paraxial region thereof. The fifth lens element E5 is made of plastic material, and has the m-side surface and the r-side surface being both aspheric. Further, the m-side surface of the fifth lens element E5 includes an inflection point.

The filter E6 is made of glass material, which is located between the fifth lens element E5 and the r-side conjugate surface RCS, and will not affect the focal length of the optical lens assembly 9.

The detailed optical data of the 9th embodiment are shown in Table 9A and the aspheric surface data are shown in Table 9B below.

TABLE 9A

9th Embodiment
f = 6.31 mm, Fno = 1.30, HFOV = 26.2 deg.

| Surface # | | Curvature Radius | | Thickness | Material | Index | Abbe # | Focal Length |
|---|---|---|---|---|---|---|---|---|
| 0 | m-side surface | Plano | | Infinity | | | | |
| 1 | Ape. Stop | Plano | | 0.673 | | | | |
| 2 | Lens 1 | 9.7756 | ASP | 2.300 | Plastic | 1.544 | 56.0 | 10.44 |
| 3 | | −12.4297 | ASP | 1.322 | | | | |

TABLE 9A-continued

9th Embodiment
f = 6.31 mm, Fno = 1.30, HFOV = 26.2 deg.

| Surface # | | Curvature Radius | | Thickness | Material | Index | Abbe # | Focal Length |
|---|---|---|---|---|---|---|---|---|
| 4 | Lens 2 | −2.4169 | ASP | 1.900 | Plastic | 1.639 | 23.5 | −16.98 |
| 5 | | −4.0630 | ASP | 0.299 | | | | |
| 6 | Lens 3 | 3.5964 | ASP | 2.900 | Plastic | 1.629 | 58.6 | −10.79 |
| 7 | | 1.6189 | ASP | 0.100 | | | | |
| 8 | Lens 4 | 1.6662 | ASP | 1.146 | Plastic | 1.660 | 20.4 | 2.00 |
| 9 | | −4.6657 | ASP | 0.150 | | | | |
| 10 | Lens 5 | −3.9214 | ASP | 0.500 | Plastic | 1.705 | 14.0 | −3.75 |
| 11 | | 8.5164 | ASP | 1.674 | | | | |
| 12 | Filter | Plano | | 0.300 | Glass | 1.517 | 64.2 | |
| 13 | | Plano | | 0.306 | | | | |
| 14 | RCS | Plano | | — | | | | |

Reference wavelength is 587.6 nm (d-line).

TABLE 9B

Aspheric Coefficients

| Surface # | 2 | 3 | 4 | 5 | 6 |
|---|---|---|---|---|---|
| k= | 1.81702E+00 | −4.80529E−01 | −6.34779E−01 | −3.45873E+00 | −5.66682E−01 |
| A4= | −2.69588E−03 | −3.90377E−03 | 1.55934E−02 | 2.39519E−05 | −2.90261E−03 |
| A6= | −2.35701E−04 | −3.14553E−04 | −1.99938E−03 | −3.54361E−04 | 9.19099E−05 |
| A8= | 1.65992E−05 | 8.05532E−06 | 1.76792E−04 | 2.70557E−05 | −7.58688E−06 |
| A10= | −4.24276E−06 | 6.16111E−08 | −3.62046E−06 | −5.12800E−07 | 6.26519E−08 |

| Surface # | 7 | 8 | 9 | 10 | 11 |
|---|---|---|---|---|---|
| k= | −5.00000E+01 | −5.00000E+01 | −9.51697E+00 | −1.55001E+01 | 2.82434E+00 |
| A4= | −2.11821E−03 | −4.36537E−04 | 8.34036E−03 | 8.24501E−03 | 7.85415E−03 |
| A6= | 3.92982E−05 | −9.64679E−05 | 1.55260E−04 | 1.18368E−04 | −8.02542E−04 |
| A8= | −8.57754E−06 | −7.17943E−06 | −3.87839E−05 | 5.54486E−06 | 7.79316E−05 |
| A10= | 3.47402E−07 | 2.38211E−07 | −1.51202E−06 | −1.46952E−06 | 9.65606E−06 |
| A12= | | 1.79732E−08 | 1.63219E−07 | −5.54643E−08 | −8.26137E−07 |
| A14= | | | | 5.17070E−09 | −1.40660E−08 |

In the 9th embodiment, the equation of the aspheric surface is the same as 1st embodiment. Further, the definition of the parameters of the following table is the same as 1st embodiment, and will not be defined again.

Moreover, in the following Table 9C, these parameters can be calculated from Table 9A and Table 9B as the following values and satisfy the following conditions:

TABLE 9C

9th Embodiment

| f [mm] | 6.31 | T12/(T23 + T34 + T45) | 2.41 |
|---|---|---|---|
| Fno | 1.30 | TD/ΣCT | 1.21 |
| HFOV [degrees] | 26.2 | (R3 + R4)/(R3 − R4) | −3.94 |
| Nmax | 1.705 | (|f/f1| + |f/f2|)/|f/f3| | 1.67 |
| V5 | 14.0 | Y11/Y52 | 0.94 |
| Vdmin | 14.0 | SL/TL | 1.05 |
| CT1/CT3 | 0.79 | TD [mm] | 10.62 |
| CT2/T12 | 1.44 | Ds/ImgH | 1.61 |
| CT2/CT4 | 1.66 | Ds/TD | 0.46 |
| T12/ATmax | 1.00 | CRAmax | 18.41 |
| CT3/CT5 | 5.80 | Yc3/f | 0.12 |
| CT3/BL | 1.27 | Yc4/f | 0.15 |
| CT3/CTmin | 5.80 | Yc5/f | 0.15 |

Further, the aforementioned Table 9C of the 9th embodiment, a vertical distance between the inflection point closest to an optical axis on one of the m-side or r-side surfaces of the third lens element E3 and the optical axis is Yc3, a vertical distance between the inflection point closest to the optical axis on one of the m-side or r-side surfaces of the fourth lens element E4 and the optical axis is Yc4, and a vertical distance between the inflection point closest to the optical axis on one of the m-side or r-side surfaces of the fifth lens element E5 and the optical axis is Yc5.

Furthermore, please refer to the following Table 9D, in the optical lens assembly 9 according to the 9th embodiment, when a vertical distance between the inflection point closest to the optical axis on each of m-side or r-side surfaces of the first lens element E1 to the fifth lens element E5 and the optical axis is Yc, and the focal length of the optical lens assembly 9 is f, the following conditions are satisfied:

TABLE 9D

| | Yc/f | | | | |
|---|---|---|---|---|---|
| | First lens element | Second lens element | Third lens element | Fourth lens element | Fifth lens element |
| M-side surface | 0.24 | 0.42 | 0.53 | 0.15 | 0.15 |
| R-side surface | — | 0.53 | 0.12 | 0.17 | — |

10th Embodiment

Figure 20A:
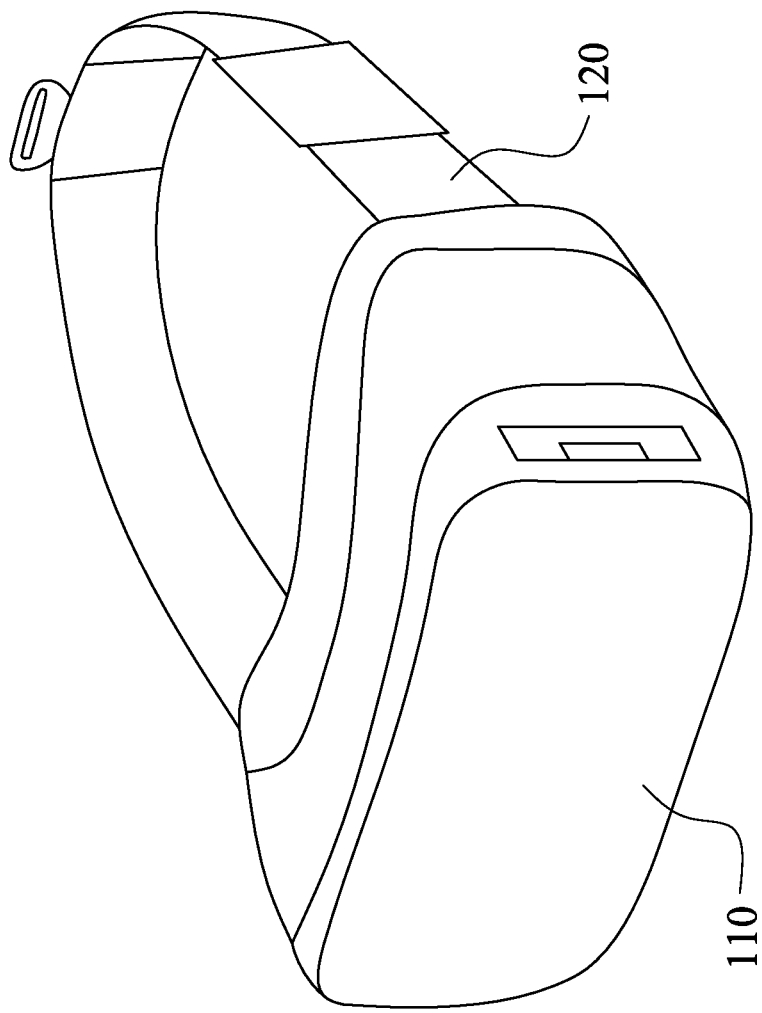
FIG. 20A is a schematic view of a head-mounted device according to the 10th embodiment of the present disclosure.
Figure 20B:
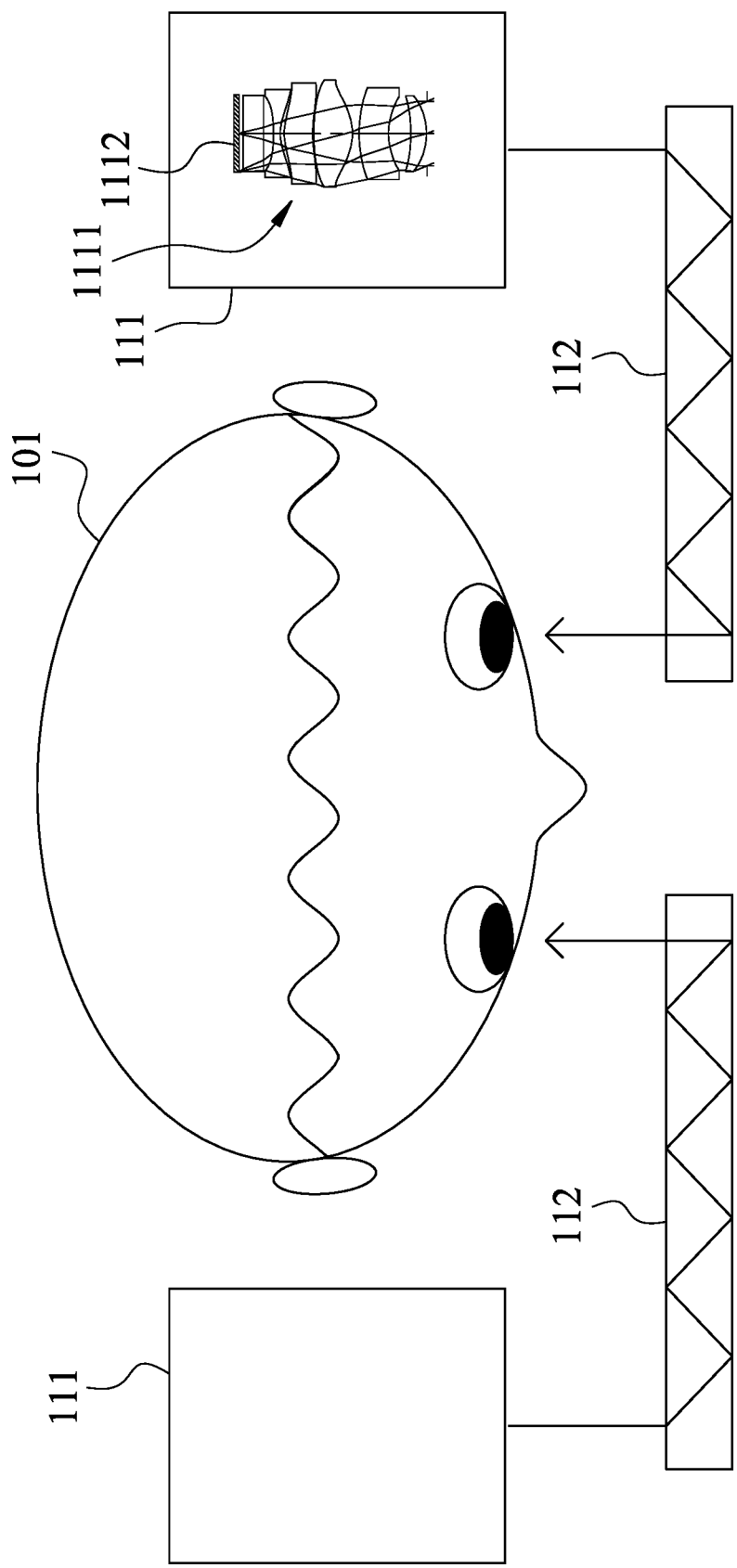
FIG. 20B is a system schematic view of the head-mounted device of FIG. 20A.

FIG. 20A is a schematic view of a head-mounted device 100 according to the 10th embodiment of the present disclosure. FIG. 20B is a system schematic view of the head-mounted device 100 of FIG. 20A. In FIG. 20A and FIG. 20B, the head-mounted device 100 includes a display system 110, and can include a positioning strap 120, which is for positioning the display system 110 in front of the eyes of a user 101 so as to provide a 3D image for the user 101.

The display system 110 can include two sides, and each of the two sides includes a projecting module 111 and an image transmitting module 112. Each projecting module 111 includes at least one projection lens assembly. The projection lens assembly includes an optical lens assembly 1111 and an image source 1112. In the 10th embodiment, the optical lens assembly 1111 can be any optical lens assembly of the aforementioned 1st to 9th embodiments. The image source 1112 can be DLP or LCD. The image transmitting module 112 can be a waveguide element, but the present disclosure is not limited thereto.

Therefore, the head-mounted device 100 is favorable for providing the user 101 with a comfortable visual experience and achieving a lightweight volume.

11th Embodiment

Figure 21:
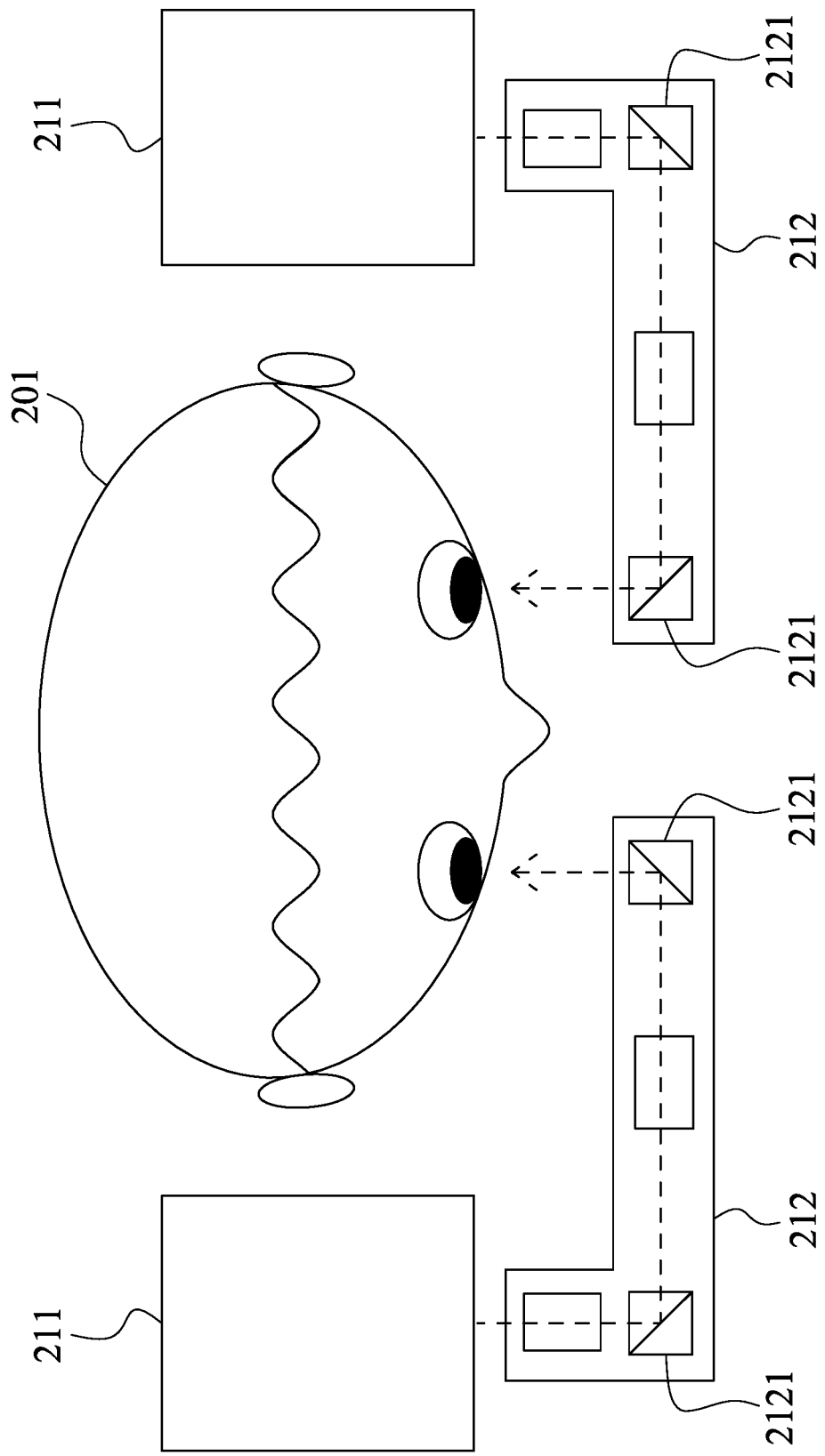
FIG. 21 is a system schematic view of a head-mounted device according to the 11th embodiment of the present disclosure.

FIG. 21 is a system schematic view of a head-mounted device according to the 11th embodiment of the present disclosure. In FIG. 21, the head-mounted device (its reference number is omitted) includes a display system (its reference number is omitted) for a user 201 to view an image. The display system can include two sides, and each of the two sides includes a projecting module 211 and an image transmitting module 212. Each projecting module 211 includes at least one projection lens assembly, and the projection lens assembly includes an optical lens assembly and an image source. The projecting module 211 in the 11th embodiment can be similar or the same to the projecting module 111 in the 10th embodiment, but the present disclosure is not limited thereto. It should be noted that the image transmitting module 212 in the 11th embodiment includes a plurality of light path folding elements 2121, but the present disclosure is not limited thereto.

12th Embodiment

Figure 22A:
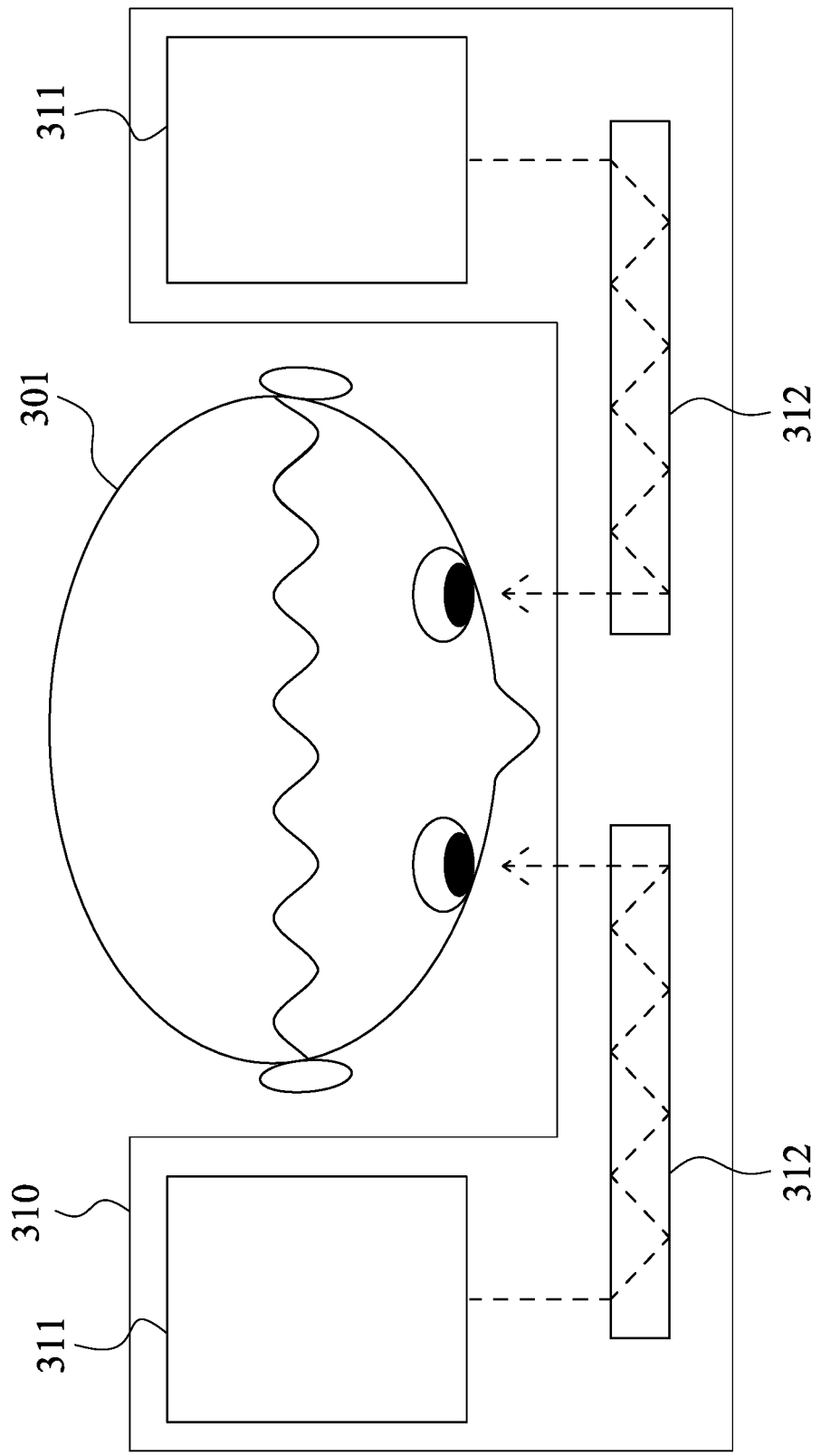
FIG. 22A is a system schematic view of a head-mounted device according to the 12th embodiment of the present disclosure.
Figure 22B:
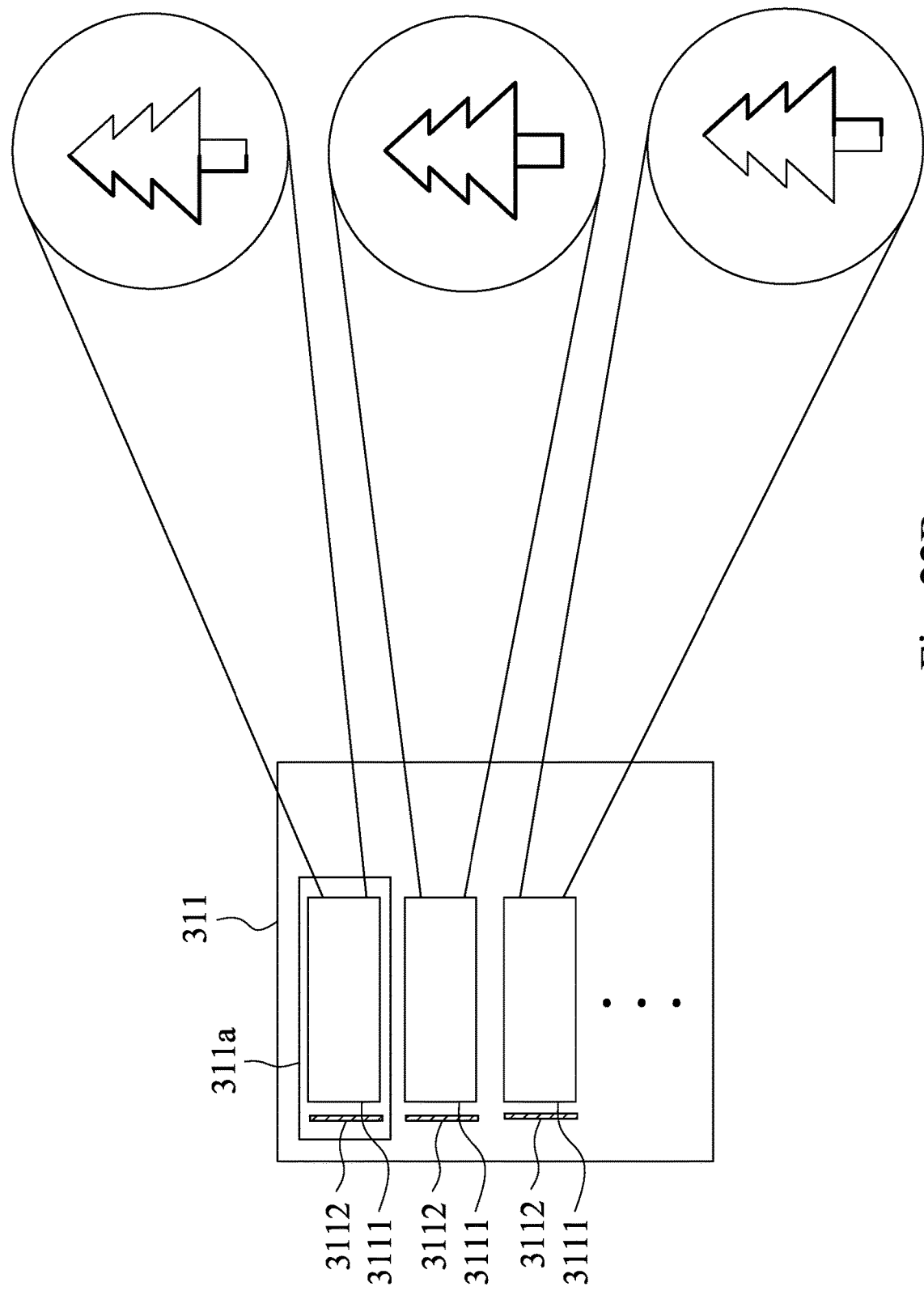
FIG. 22B is a schematic view of a projecting module of the head-mounted device of FIG. 22A.

FIG. 22A is a system schematic view of a head-mounted device according to the 12th embodiment of the present disclosure. FIG. 22B is a schematic view of a projecting module 311 of the head-mounted device of FIG. 22A. The head-mounted device includes a light field display system 310 for a user 301 to view an image. The light field display system 310 can include two sides, and each of the two sides includes a projecting module 311 and an image transmitting module 312.

In detail, each projecting module 311 includes at least three projection lens assemblies 311a, and each projection lens assembly 311a includes an optical lens assembly 3111 and an image source 3112. Further, a number of the projection lens assemblies 311a of the projecting module 311 of the light field display system 310 is at least 5 and at most 15. Therefore, it is favorable for providing a better image display.

Each optical lens assembly 3111 can include at least three lens elements, one of the lens elements of the optical lens assembly 3111 can be made of plastic material and has a surface being aspheric. In the 12th embodiment, the optical lens assemblies 3111 can be any optical lens assembly in the aforementioned 1st to 9th embodiments, and the image sources 3112 can be DLP or LCD, but the present disclosure is not limited thereto.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly comprising five lens elements, the five lens elements being, in order from a magnification side to a reduction side:
  a first lens element, a second lens element, a third lens element, a fourth lens element and a fifth lens element; each of the five lens elements having an m-side surface facing towards the magnification side and an r-side surface facing towards the reduction side;
  wherein the m-side surface of the second lens element is concave in a paraxial region thereof; the fifth lens element has negative refractive power; at least one of the m-side and r-side surfaces of the five lens elements comprises at least one inflection point;
  wherein the optical lens assembly further comprises an aperture stop, an axial distance between the aperture stop and an r-side conjugate surface is SL, a curvature radius of the m-side surface of the second lens element is R3, a curvature radius of the r-side surface of the second lens element is R4, an axial distance between the m-side surface of the first lens element and the r-side conjugate surface is TL, a central thickness of the second lens element is CT2, a central thickness of the third lens element is CT3, a central thickness of the fourth lens element is CT4, a minimum central thickness of the five lens elements of the optical lens assembly is CTmin, an axial distance between the r-side surface of the fifth lens element and the r-side conjugate surface is BL, an effective diameter of the aperture stop of the optical lens assembly is Ds, a maximum image height of the optical lens assembly is ImgH, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following conditions are satisfied:

$(R3+R4)/(R3-R4)<0.50;$ $0.98<SL/TL<2.50;$ $0.65<CT2/CT4<4.50;$ $1.60<CT3/CT\text{min}<10.0;$ $0.55<CT3/BL;$ $1.0 < Ds/ImgH < 3.0$; and $0.25 < T12/(T23+T34+T45) < 9.0$.

2. The optical lens assembly of claim 1, wherein the fourth lens element has negative refractive power.

3. The optical lens assembly of claim 1, wherein the m-side surface of the first lens element is convex in a paraxial region thereof, the r-side surface of the first lens element is convex in a paraxial region thereof; the r-side surface of the second lens element is convex in a paraxial region thereof; the r-side surface of the third lens element is convex in a paraxial region thereof.

4. The optical lens assembly of claim 1, wherein the r-side surface of the fifth lens element is concave in a paraxial region thereof; at least one of the m-side and r-side surfaces of the fifth lens element comprises at least one inflection point.

5. The optical lens assembly of claim 1, wherein at least one of the m-side and r-side surfaces of the third lens element comprises at least one inflection point, a vertical distance between an inflection point closest to an optical axis on one of the m-side or r-side surfaces of the third lens element and the optical axis is Yc3, a focal length of the optical lens assembly is f, and the following condition is satisfied:

$0.05 < Yc3/f < 5.0$.

6. The optical lens assembly of claim 1, wherein a minimum Abbe number of the lens elements of the optical lens assembly is Vdmin, and the following condition is satisfied:

$5.0 < Vd\,min < 21.0$.

7. The optical lens assembly of claim 1, wherein a maximum refractive index of the lens elements of the optical lens assembly is Nmax, an f-number of the optical lens assembly is Fno, and the following conditions are satisfied:

$1.70 < N\,max < 1.80$; and $0.80 < Fno < 2.0$.

8. The optical lens assembly of claim 1, wherein one surface of the third lens element comprises a maximum effective diameter among the m-side surfaces and the r-side surfaces of all the lens elements of the optical lens assembly.

9. An optical lens assembly comprising five lens elements, the five lens elements being, in order from a magnification side to a reduction side:
a first lens element, a second lens element, a third lens element, a fourth lens element and a fifth lens element; each of the five lens elements having an m-side surface facing towards the magnification side and an r-side surface facing towards the reduction side;
wherein the m-side surface of the second lens element is concave in a paraxial region thereof; the m-side surface of the third lens element is convex in a paraxial region thereof; the r-side surface of the fourth lens element is convex in a paraxial region thereof; the fifth lens element has negative refractive power; at least one of the m-side and the r-side surfaces of at least one lens element of the optical lens assembly comprises at least one inflection point;
wherein the optical lens assembly further comprises an aperture stop, an axial distance between the aperture stop and an r-side conjugate surface is SL, a curvature radius of the m-side surface of the second lens element is R3, a curvature radius of the r-side surface of the second lens element is R4, an axial distance between the m-side surface of the first lens element and the r-side conjugate surface is TL, a central thickness of the first lens element is CT1, a central thickness of the second lens element is CT2, a central thickness of the third lens element is CT3, a central thickness of the fourth lens element is CT4, a central thickness of the fifth lens element is CT5, an axial distance between the first lens element and the second lens element is T12, a maximum among each axial distance between adjacent lens elements of the optical lens assembly is ATmax, a maximum distance between an optical effective region of the m-side surface of the first lens element and an optical axis is Y11, a maximum distance between an optical effective region of the r-side surface of the fifth lens element and the optical axis is Y52, and the following conditions are satisfied:

$(R3+R4)/(R3-R4) < 0.25$;

$0.98 < SL/TL < 2.50$;

$0.40 < CT2/CT4 < 9.0$;

$0 < CT1/CT3 < 1.50$;

$1.20 < CT3/CT5 < 9.0$;

$0.90 < CT2/T12 < 5.0$;

$0.45 < T12/AT\,max \leq 1.0$; and $0.45 < Y11/Y52 < 2.0$.

10. The optical lens assembly of claim 9, wherein the first lens element has positive refractive power; the second lens element has negative refractive power; the third lens element has positive refractive power.

11. The optical lens assembly of claim 9, wherein the m-side surface of the fourth lens element is concave in a paraxial region thereof.

12. The optical lens assembly of claim 9, wherein at least one surface of the fourth lens element comprises at least one reflection point.

13. The optical lens assembly of claim 9, wherein an Abbe number of the fifth lens element is V5, and the following condition is satisfied:

$10.0 < V5 < 50.0$.

14. The optical lens assembly of claim 9, wherein a focal length of the optical lens assembly is f, a focal length of the first lens element is f1, a focal length of the second lens element is f2, a focal length of the third lens element is f3, and the following condition is satisfied:

$0.10 < (|f/f1|+|f/f2|)/|f/f3| < 1.70$.

15. The optical lens assembly of claim 9, wherein a maximum of chief ray angles of the optical lens assembly is CRAmax, and the following condition is satisfied:

$0\,degree \leq CRA\,max < 22.0\,degrees$.

16. The optical lens assembly of claim 9, wherein at least three lens elements of the optical lens assembly are made of plastic material; at least one lens element of the optical lens assembly is made of glass material.

17. The optical lens assembly of claim 9, wherein an absolute value of a focal length of the third lens element is a minimum among absolute values of focal lengths of the lens elements of the optical lens assembly.

18. The optical lens assembly of claim 9, wherein the axial distance between the first lens element and the second lens element is the maximum among each axial distance of adjacent lens elements of the optical lens assembly.

19. A head-mounted device comprising:
a display system comprising two sides, wherein each of the two sides comprises a projecting module and an image transmitting module;
wherein each of the projecting modules comprises at least one projection lens assembly; the projection lens assembly comprises the optical lens assembly of claim 9 and an image source.

20. A head-mounted device comprising:
a light field display system comprising two sides, wherein each of the two sides comprises a projecting module and an image transmitting module;
wherein each of the projecting modules comprises at least three projection lens assemblies; each of the projection lens assemblies comprises an optical lens assembly and an image source; the optical lens assembly comprises at least three lens elements, the at least three lens elements comprising, in an order from a magnification side to a reduction side, a first lens element and a last lens element; each of the lens elements has an m-side surface facing towards the magnification side and an r-side surface facing towards the reduction side;
wherein at least one of the lens elements of each of the optical lens assemblies is made of plastic material and has a surface being aspheric;
wherein each of the optical lens assemblies further comprises an aperture stop, an axial distance between the aperture stop and an r-side conjugate surface is SL, an axial distance between the m-side surface of the first lens element and the r-side surface of the last lens element is TD, an f-number of the optical lens assembly is Fno, an axial distance between the m-side surface of the first lens element and the r-side conjugate surface is TL, and the following conditions are satisfied:

$0.50 \text{ mm} < TD < 50.0 \text{ mm}$;

$0.80 < Fno < 2.50$; and $0.95 < SL/TL < 4.0$.

21. The head-mounted device of claim 20, wherein the axial distance between the m-side surface of the first lens element and the r-side surface of the last lens element is TD, a sum of central thicknesses of the lens elements of the optical lens assembly is ΣCT, and the following condition is satisfied:

$1.0 < TD/\Sigma CT < 1.40$.

22. The head-mounted device of claim 20, wherein an effective diameter of the aperture stop of the optical lens assembly is Ds, the axial distance between the m-side surface of the first lens element and the r-side surface of the last lens element is TD, and the following condition is satisfied:

$0.45 < Ds/TD < 1.0$.

23. The head-mounted device of claim 20, wherein each of the optical lens assemblies further comprises a fourth lens element disposed at a reduction side of the first lens element, a vertical distance between an inflection point closest to an optical axis on one of the m-side or r-side surfaces of the fourth lens element and the optical axis is Yc4, a vertical distance between an inflection point closest to the optical axis on one of the m-side or r-side surfaces of the last lens element and the optical axis is Yc5, a focal length of the optical lens assembly is f, a minimum Abbe number of the lens elements of the optical lens assembly is Vdmin, and the following conditions are satisfied:

$0.05 < Yc4/f < 5.0$;

$0.05 < Yc5/f < 5.0$; and $5.0 < Vd\min < 21.0$.

24. The head-mounted device of claim 20, wherein the at least three lens elements of each of the optical lens assemblies has an Abbe number greater than 10.0 and less than 50.0.

25. The head-mounted device of claim 20, wherein at least one surface of at least one lens element of each of the optical lens assemblies comprises at least one reflection point; the image transmitting module comprises a waveguide element.

26. The head-mounted device of claim 20, wherein each of the at least three projection lens assemblies comprises an element with a meta surface.

27. The head-mounted device of claim 20, wherein a number of the projection lens assemblies of the projecting module of the light field display system is at least 5 and at most 15.

* * * * *